(12) United States Patent
Yamagata et al.

(10) Patent No.: US 11,800,208 B2
(45) Date of Patent: Oct. 24, 2023

(54) IMAGE CAPTURING APPARATUS THAT IS REDUCED IN SIZE AND HAS HIGH OPERABILITY, AND OPERATION MEMBER

(71) Applicant: CANON KABUSHIKI KAISHA, Tokyo (JP)

(72) Inventors: Kenji Yamagata, Kanagawa (JP); Yoshinobu Shibayama, Kanagawa (JP); Manabu Abe, Tokyo (JP); Koichi Shigeta, Kanagawa (JP); Yuko Teruya, Kanagawa (JP); Hideki Toichi, Tokyo (JP); Masato Ito, Kanagawa (JP); Hayato Mano, Tokyo (JP); Yusuke Mogi, Kanagawa (JP); Masato Yokosawa, Tokyo (JP); Yosaku Endo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/678,615

(22) Filed: Feb. 23, 2022

(65) Prior Publication Data
US 2022/0272236 A1    Aug. 25, 2022

(30) Foreign Application Priority Data
Feb. 25, 2021    (JP) .................. 2021-028815

(51) Int. Cl.
*H04N 23/51*    (2023.01)
*G03B 5/00*    (2021.01)
(Continued)

(52) U.S. Cl.
CPC ............... *H04N 23/51* (2023.01); *G03B 5/00* (2013.01); *H04N 23/52* (2023.01);
(Continued)

(58) Field of Classification Search
CPC .............. G03B 5/00; G03B 2205/0046; G03B 2217/007; G03B 17/55; G03B 17/02;
(Continued)

(56) References Cited

U.S. PATENT DOCUMENTS

| 11,314,154 B2 * | 4/2022 | Schmit | G03B 17/55 |
| 2006/0256230 A1 * | 11/2006 | Maeda | H04N 23/00 |
| | | | 348/E5.025 |

(Continued)

FOREIGN PATENT DOCUMENTS

JP    2012-129782 A    7/2012

*Primary Examiner* — Timothy J Henn
(74) *Attorney, Agent, or Firm* — Cowan, Liebowitz & Latman, P.C.

(57) ABSTRACT

An image sensor converts an optical image formed by an imaging optical system to video signals. A heat dissipation section discharges heat generated in an image sensor to the outside. The imaging optical system, the image sensor, the heat dissipation section, and a battery chamber are arranged on an extension line of an axis of the system in the mentioned order. The battery chamber has an upper surface tilted forward in a direction in which the image sensor is disposed with respect to the axis by a predetermined angle. A projected shadow of a portion, close to the heat dissipation section, of an upper end portion of the battery chamber, which is projected from an upper surface side of the image capturing apparatus, overlaps the heat dissipation section.

11 Claims, 135 Drawing Sheets

(51) Int. Cl.
   *H04N 23/52*   (2023.01)
   *H04N 23/54*   (2023.01)
   *H04N 23/62*   (2023.01)
   *H04N 23/53*   (2023.01)

(52) U.S. Cl.
   CPC .......... *H04N 23/531* (2023.01); *H04N 23/54* (2023.01); *H04N 23/62* (2023.01); *G03B 2205/0046* (2013.01)

(58) Field of Classification Search
   CPC ...... H04N 23/52; H04N 23/531; H04N 23/54; H04N 23/62; H04N 23/57; H04N 23/60
   See application file for complete search history.

(56) References Cited

U.S. PATENT DOCUMENTS

| | | | | |
|---|---|---|---|---|
| 2008/0018782 | A1* | 1/2008 | Terakado | H04N 23/51 |
| | | | | 348/E5.026 |
| 2008/0100712 | A1* | 5/2008 | Hayes | H04N 23/661 |
| | | | | 348/E5.025 |
| 2009/0002549 | A1* | 1/2009 | Kobayashi | H04N 23/52 |
| | | | | 348/374 |
| 2009/0060465 | A1* | 3/2009 | Igarashi | H04N 5/77 |
| | | | | 386/224 |
| 2014/0055671 | A1* | 2/2014 | Kawamura | H04N 5/64 |
| | | | | 348/374 |
| 2016/0295095 | A1* | 10/2016 | Jannard | H05K 7/20172 |
| 2018/0275493 | A1* | 9/2018 | Hirota | H04N 23/51 |
| 2018/0376037 | A1* | 12/2018 | Arai | H05K 7/20172 |
| 2019/0285970 | A1* | 9/2019 | Mano | H04N 23/52 |
| 2019/0289183 | A1* | 9/2019 | Yamagata | G03B 17/02 |

* cited by examiner

FIRST STATE

SECOND STATE

THIRD STATE

FOURTH STATE

FIFTH STATE

SIXTH STATE

*FIG. 50*

| DISPLAY UNIT STATE | ROTATION DETECTION SWITCH | FIRST MAGNETIC SENSOR | SECOND MAGNETIC SENSOR | DISPLAY IMAGE |
|---|---|---|---|---|
| RETRACTED STATE (FIRST STATE) | OFF | ON | ON | NO IMAGE |
| OPENED STATE (SECOND STATE) | OFF | OFF | OFF | NORMAL POSITION |
| IN-USE STATE (THIRD STATE) | OFF | OFF | OFF | NORMAL POSITION |
| HIGH-ANGLE TATE (FOURTH STATE) | OFF | OFF | OFF | NORMAL POSITION |
| SELF-PORTRAIT STATE (FIFTH STATE) | ON | OFF | OFF | 180-DEGREE INVERTED |
| INVERSELY RETRACTED STATE (SIXTH STATE) | OFF | OFF | ON | 180-DEGREE INVERTED |

IMAGE CAPTURING APPARATUS THAT IS REDUCED IN SIZE AND HAS HIGH OPERABILITY, AND OPERATION MEMBER

BACKGROUND OF THE INVENTION

Field of the Invention

The present invention relates to an image capturing apparatus that is reduced in size and has high operability, and an operation member equipped in the image capturing apparatus.

Description of the Related Art

In on-the-spot media reporting, although photographing has been conventionally performed by a photographing crew (camera crew) formed of a plurality of members, in recent years, the trend of manpower saving has been accelerated, and the number of photographing crew members is often reduced to one. Therefore, users strongly desire size reduction of the image capturing apparatus. To meet the demand by users, there have been proposed a variety of inventions that realize size reduction of the image capturing apparatus. For example, Japanese Laid-Open Patent Publication (Kokai) No. 2012-129782 describes the configuration in which a camera unit and a battery are arranged across a control circuit board such that the camera unit and the battery overlap one upon the other in a height direction and are displaced in a front-rear direction, and a control circuit is mounted on a surface, opposed to the camera unit, of the control circuit board, while a power supply circuit is mounted on a surface, opposed to the battery, of the same. This enables effective use of space inside the image capturing apparatus to thereby reduce the size of the image capturing apparatus.

However, in the technique described in Japanese Laid-Open Patent Publication (Kokai) No. 2012-129782, the components are arranged in a vertically stacked state, and hence the overall height of the image capturing apparatus is increased. In view of this problem, if increase in size of the image capturing apparatus in the height direction is suppressed, there is brought about, for example, a new problem of lowered operability.

SUMMARY OF THE INVENTION

The present invention provides an image capturing apparatus that realizes size reduction and has high operability.

In a first aspect of the present invention, there is provided an image capturing apparatus including an imaging optical system, an image sensor that converts an optical image formed by the imaging optical system to video signals, a heat dissipation section configured to discharge heat generated in the image sensor to an outside, and a battery mounting section to and from which a battery can be mounted and removed, wherein the imaging optical system, the image sensor, the heat dissipation section, and the battery mounting section are arranged on a extension line of an axis of the imaging optical system in the mentioned order, wherein the battery mounting section has an upper surface tilted forward in a direction in which the image sensor is disposed with respect to the axis by a predetermined angle, and wherein a shadow of an upper end portion, which is close to the heat dissipation section, of the battery mounting section, projected from an upper surface side the image capturing apparatus, overlaps the heat dissipation section.

In a second aspect of the present invention, there is provided an image capturing apparatus including a body including an image sensor and a wireless communication section, and a handle mounted on the body, wherein the handle includes a front leg portion that extends upward from a top surface of the body, a rear leg portion that extends upward from the top surface of the body, and a grasping portion that connects between the front leg portion and the rear leg portion substantially in parallel to a direction orthogonal to an imaging surface of the image sensor with a predetermined spacing from the top surface of the body, and wherein the wireless communication section includes a first antenna substantially linearly arranged along a first direction on a mounting surface of a wireless communication board, and a substantially linear second antenna erected on the mounting surface of the wireless communication board along a second direction substantially orthogonal to the first direction, and wherein at least one of the first direction and the second direction advances toward a space formed by the top surface of the body, the front leg portion, the rear leg portion, and the grasping portion.

In a third aspect of the present invention, there is provided an image capturing apparatus including a body including an imaging optical system and an image sensor, a display section that has a display surface and is configured to be capable of shifting between a first state in which the display surface faces the body and a second state in which the display surface turns a back thereof to the body, and a detection section configured to detect a posture of the display section, wherein an angle at which the detection section detects that the display section has been shifted from a predetermined state to the first state and an angle at which the detection section detects that the display section has been shifted from the predetermined state to the second state are different.

In a fourth aspect of the present invention, there is provided an operation member including a base portion containing a rotary variable resistor, a key member rotatably mounted on the base portion in a seesaw fashion, a rotating member that rotatably supports the variable resistor, and an elastic member that is interposed between the key member and the rotating member, in a state brought into contact therewith, and wherein when a load for rotating the key member is applied, the rotating member rotates while the elastic member maintains the state in contact with the key member and the rotating member In a fifth aspect of the present invention, there is provided an image capturing apparatus including an imaging optical system, and the operation member, wherein the operation member is operated, whereby a predetermined optical element included in the imaging optical system is operated.

According to the present invention, it is possible to realize the image capturing apparatus that realizes size reduction and has high operability.

Further features of the present invention will become apparent from the following description of exemplary embodiments (with reference to the attached drawings).

BRIEF DESCRIPTION OF THE DRAWINGS

FIG. 50 is a diagram useful in explaining display control based on signals output from the sensors that detect a state of the display unit.

DESCRIPTION OF THE EMBODIMENTS

The present invention will now be described in detail below with reference to the accompanying drawings showing embodiments thereof.

Figure 1:
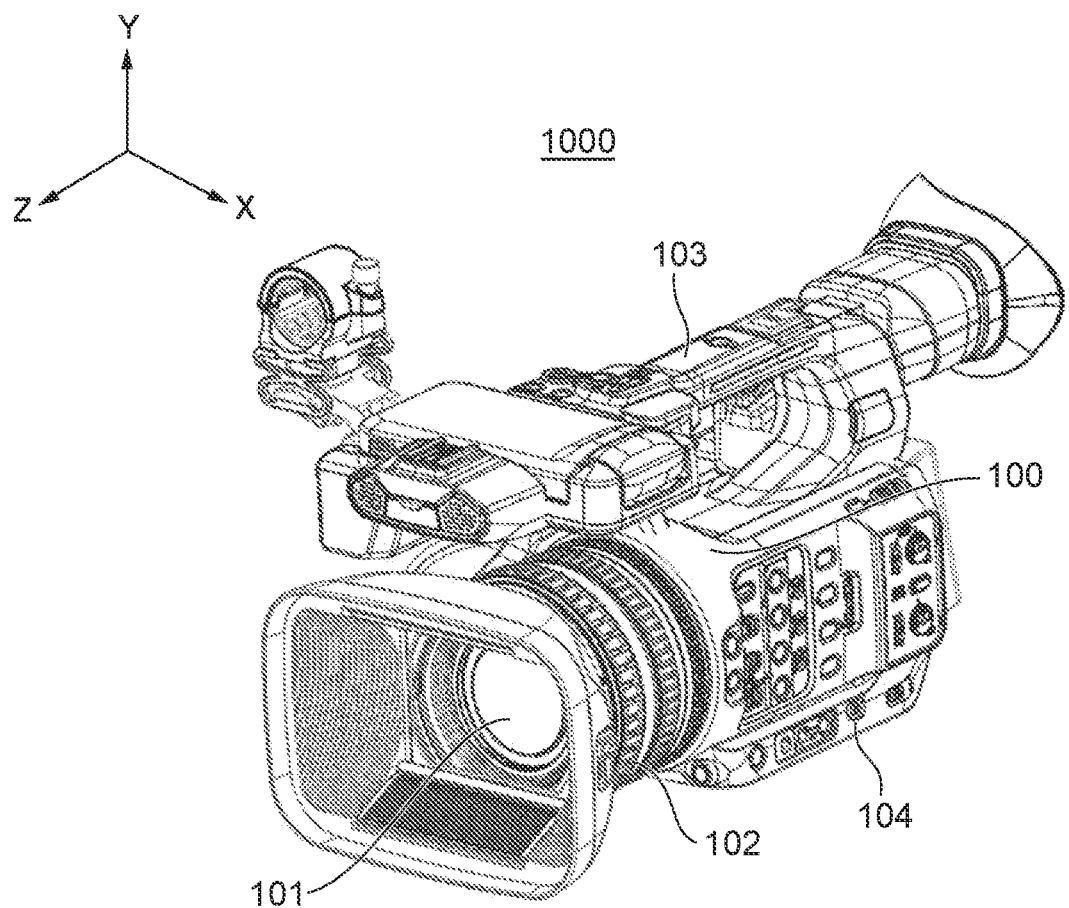
FIG. 1 is a first perspective view of the appearance of an image capturing apparatus according to an embodiment.
Figure 2:
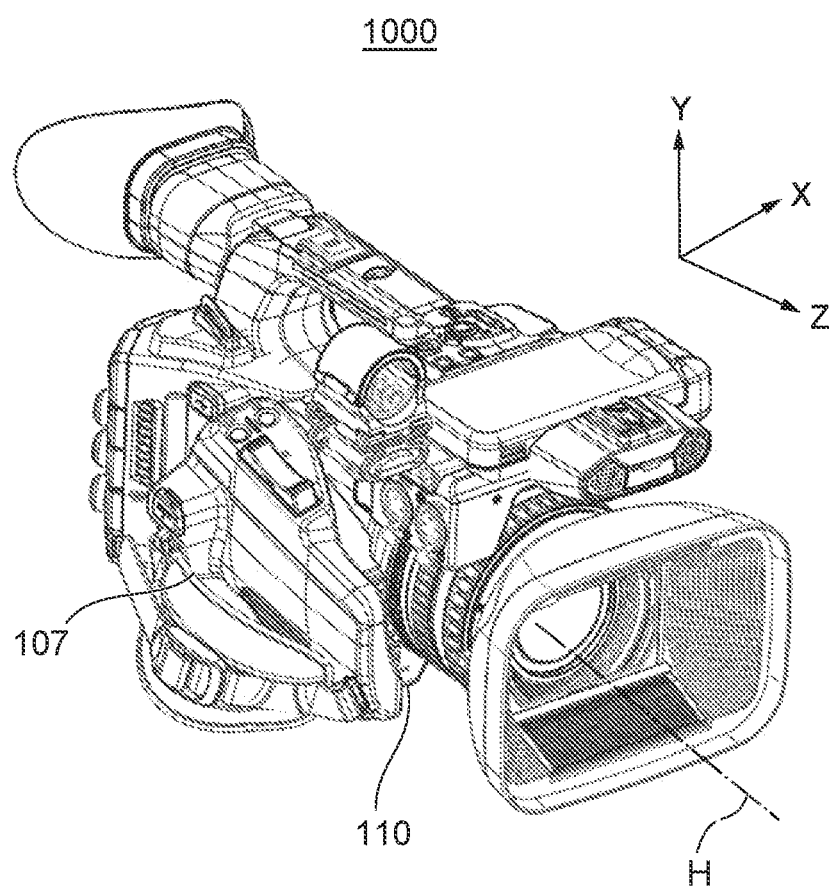
FIG. 2 is a second perspective view of the appearance of the image capturing apparatus.
Figure 3:
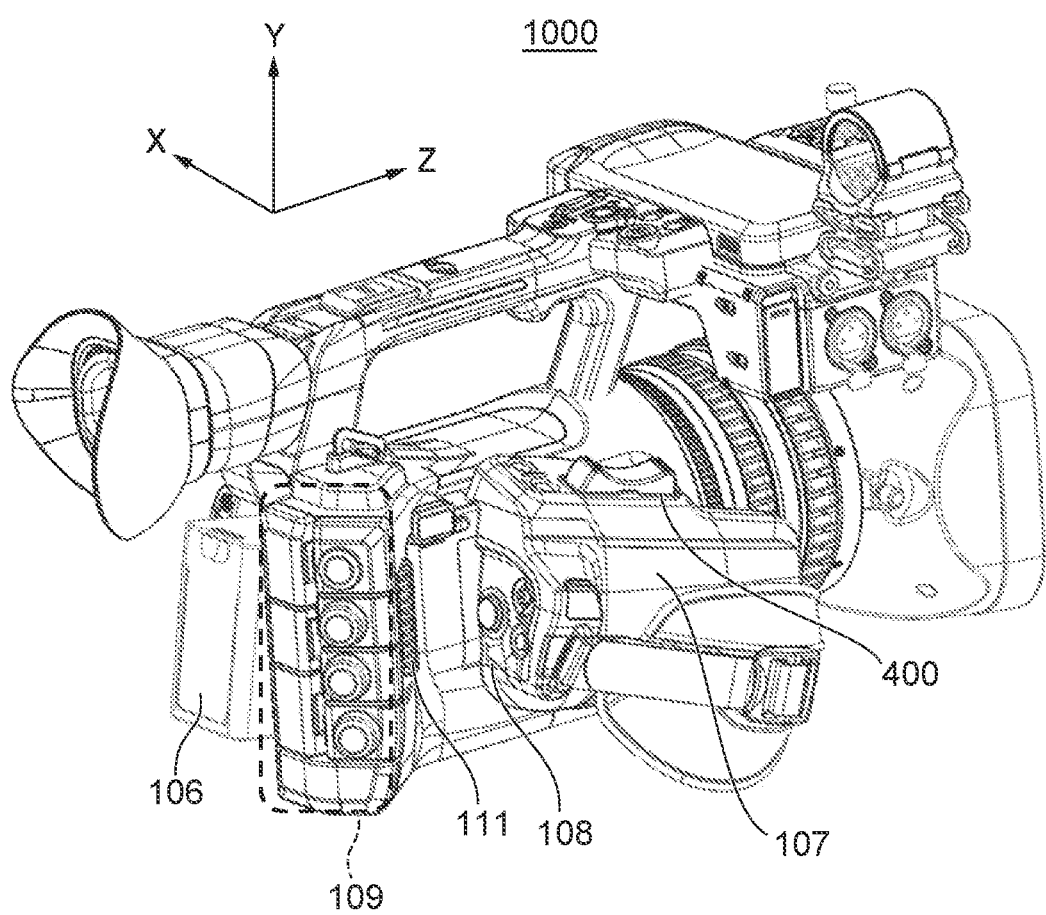
FIG. 3 is a third perspective view of the appearance of the image capturing apparatus.
Figure 4:
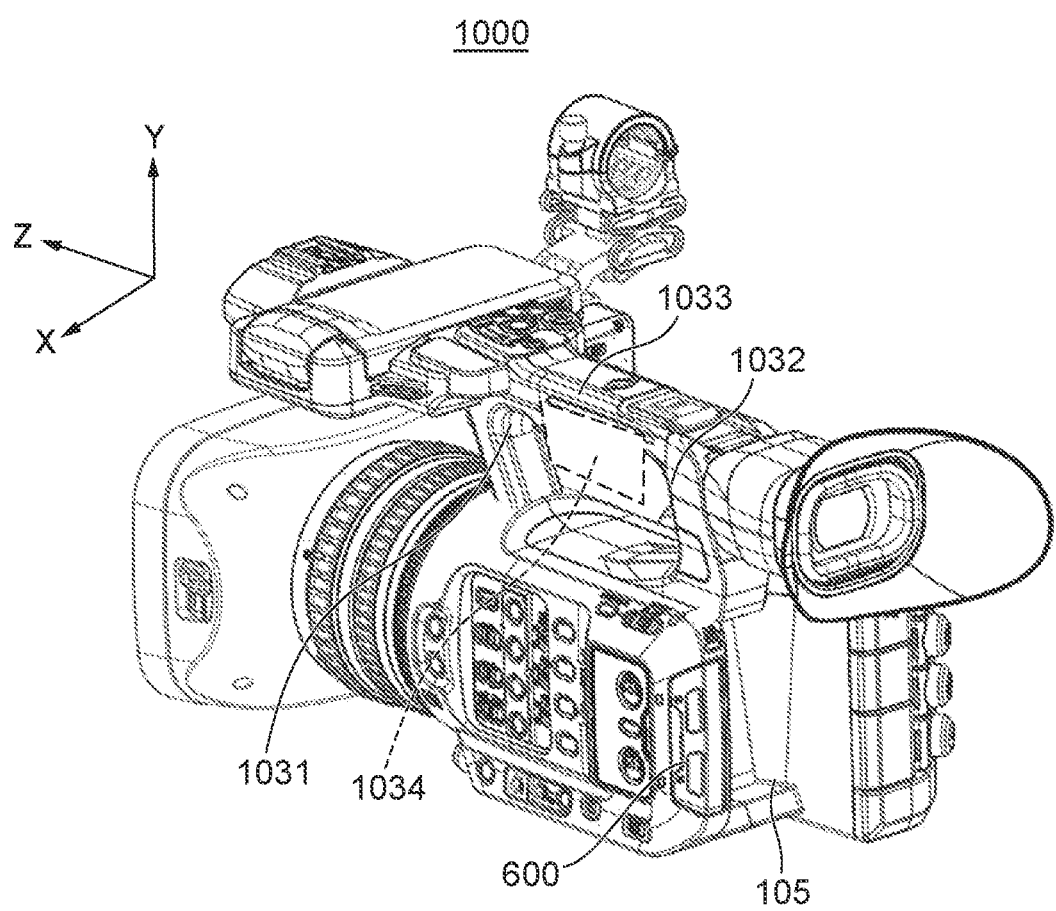
FIG. 4 is a fourth perspective view of the appearance of the image capturing apparatus.

FIG. 1 is a first perspective view of an image capturing apparatus 1000 according to an embodiment of the present invention. FIG. 2 is a second perspective view of the image capturing apparatus 1000. FIG. 3 is a third perspective view of the image capturing apparatus 1000. FIG. 4 is a fourth perspective view of the image capturing apparatus 1000.

As shown in FIGS. 1 to 3, a front-rear direction, a left-right direction, and a height direction of the image capturing apparatus 1000 are defined as a Z direction, a X direction, and a Y direction, respectively, for convenience of explanation. Note that the Z direction is parallel to an axis H of the image capturing apparatus 1000, and a direction from the image capturing apparatus 1000 toward an object, not shown, is referred to as frontward (+Z), and a direction opposite thereto is referred to as rearward (−Z). The left-right direction (X direction) is parallel to a horizontal plane in a case where the front-rear direction (Z direction) is parallel to the horizontal plane and the height direction (Y direction) is parallel to a vertical direction, and upward, downward, rightward, and leftward directions are defined based on the directions in a case where the image capturing apparatus 1000 in this state is viewed from the front (+Z side).

Therefore, FIG. 1 is a perspective view of the image capturing apparatus 1000 as viewed from substantially the front right, FIG. 2 is a perspective view of the image capturing apparatus 1000 as viewed from substantially the front upper left, and FIG. 3 is a perspective view of the image capturing apparatus 1000 as viewed from substantially the rear left.

The image capturing apparatus 1000 includes an image capturing apparatus body 100 (hereinafter referred to as the "body 100"). A front side of the body 100 is provided with a photographic lens 101 having an objective surface arranged in a state exposed toward an object. The photographic lens 101 includes an imaging optical system formed by a plurality of movable optical elements, such as a lens group formed by a plurality of lenses and a diaphragm, and actuators for driving the optical elements. By driving these actuators to move a predetermined lens group in an optical axis direction, it is possible to perform zooming for changing an angle of field of a photographed image, focusing for adjusting focus on an object, light amount adjustment for an image sensor 128 (see FIG. 9A) using an aperture mechanism, and so forth. Note that the optical axis direction refers to a direction parallel to the axis H, which is the Z direction.

An operation ring 102 is arranged around (on an outer periphery of) the photographic lens 101. The operation ring 102 is a ring-shaped operation member configured to be rotatable about the axis H of the photographic lens 101 and is formed by three operation rings. The three operation rings are operation members which enable the zoom, focus, and aperture of the photographic lens 101 to be adjusted independently of each other according to respective associated rotational operations thereof by a photographer (user).

A handle 103 is arranged on an upper side of the image capturing apparatus 1000. The handle 103 is a portion having an annular shape and formed integrally with the upper surface of the body 100, for the photographer to grasp when performing photographing by setting the image capturing apparatus 1000 to a position lower than a line of sight of (low-angle photographing), and when carrying the image capturing apparatus 1000.

The handle 103 is roughly comprised of a handle front leg portion 1031, a handle rear leg portion 1032, and a handle grasping portion 1033. The handle front leg portion 1031 is a columnar portion extending upward from slightly forward of the central portion of the upper surface of the body 100. The handle rear leg portion 1032 is a columnar portion extending upward from the vicinity of the rear end of the upper surface of the body 100. The handle grasping portion 1033 is a portion connecting between the handle front leg portion 1031 and the handle rear leg portion 1032 substantially in parallel to the axis H of the photographic lens 101. A handle holding space 1034 is formed between the upper surface of the body 100 and the handle grasping portion 1033 to provide a predetermined spacing between the upper surface of the body 100 and the handle grasping portion 1033 so as to enable the photographer to grasp the handle grasping portion 1033 by hand.

A right side of the body 100 is provided with an operation system arrangement section 104. On the operation system arrangement section 104, a plurality of operation members, such as operation buttons, are arranged, and by operating respective associated predetermined operation members, the photographer can perform a variety of operations, such as switching-on/off of power supply of the image capturing apparatus 1000, adjustment of a photographed image, and adjustment of sound. Further, on the right side of the body 100, there is disposed a lamp member (indicator) indicating an operation status of the image capturing apparatus 1000.

A rear surface (surface on the rear side) of the body 100 is provided with a battery chamber 105 (battery mounting section) which opens rearward and is formed in a recess shape. The battery chamber 105 is formed such that a battery 106 for supplying power to the image capturing apparatus 1000 can be mounted/removed. FIG. 4 is a perspective view of the image capturing apparatus 1000, as viewed from the rear right, in a state which the battery 106 has been removed therefrom.

A grip portion 107 is arranged in the vicinity of the center of a left side of the body 100. The grip portion 107 is a portion that enables the photographer to hold the image capturing apparatus 1000 at a level of the line of sight of the photographer by gripping (grasping) the grip portion 107 by single hand. Note that when using the image capturing apparatus 1000 by gripping the same by single hand, by gripping the image capturing apparatus 1000 by a dominant hand, the stability of the image capturing apparatus 1000 is increased and further, the usability of the same is made excellent. In general, right-handed people are more, and hence in the image capturing apparatus 1000, the grip portion 107 is formed integrally with the body 100 on the left side of the body 100, so as to enable the photographer to grip the grip portion 107 by the right hand.

As shown in FIG. 3, the grip portion 107 has a photographing start button 108 disposed on a rear surface thereof, and further, a seesaw switch 400 disposed on an upper surface thereof. The photographing start button 108 is disposed at a lower location of the rear surface of the grip portion 107 so as to enable the photographer to operate the photographing start button 108 with the thumb in a state gripping the grip portion 107 with the right hand. On the other hand, the seesaw switch 400 is disposed on the upper surface of the grip portion 107 so as to enable the photographer to operate the seesaw switch 400 with the forefinger and the middle finger in a state gripping the grip portion 107 with the right hand.

The seesaw switch 400 is used e.g. for the zoom adjustment operation of the photographic lens 101. In this case, a lens driving actuator, not shown, for moving the photographic lens 101 in the optical axis direction is driven according to an operation of the seesaw switch 400, whereby it is possible to desirably change the photographing view angle between a telephoto (TELE) side and a wide angle (WIDE) side. The photographer can adjust the photographing view angle by pressing down a front side or rear side of the seesaw switch 400, start photographing by pressing the photographing start button 108 in accordance with the photographing timing, and terminate the photographing by pressing the photographing start button 108 again. Details of the seesaw switch 400 will be described hereinafter.

On a left side of the battery chamber 105, an external connection terminal 109 is provided such that the external connection terminal 109 protrudes toward the rear left with terminals thereof facing rear leftward. The external connection terminal 109 is a portion where a plurality of connectors, such as a wired LAN connector and an HDMI (registered trademark) connector, are arranged in line, and a variety of kinds of cables associated with the connectors, respectively, can be connected thereto. Thus, it is possible to exchange a variety of data between the body 100 and an external device via the cables.

On a right side of the battery chamber 105, a medium slot section 600 which opens rearward is disposed. In a recording medium (not shown) inserted in the medium slot section 600, it is possible to record, for example, data of a moving image captured through the photographic lens 101. Note that details of the medium slot section 600 will be described hereinafter.

<Description of the Seesaw Switch 400>

Figure 5:
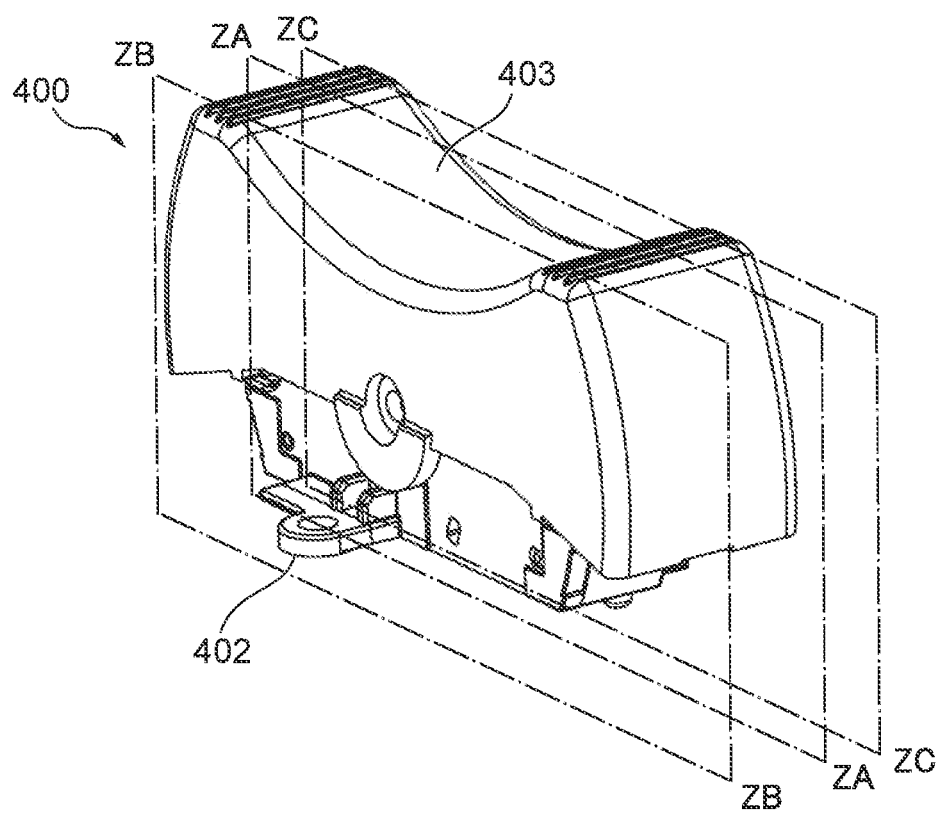
FIG. 5 is a perspective view of a seesaw switch included in the image capturing apparatus.
Figure 6A:
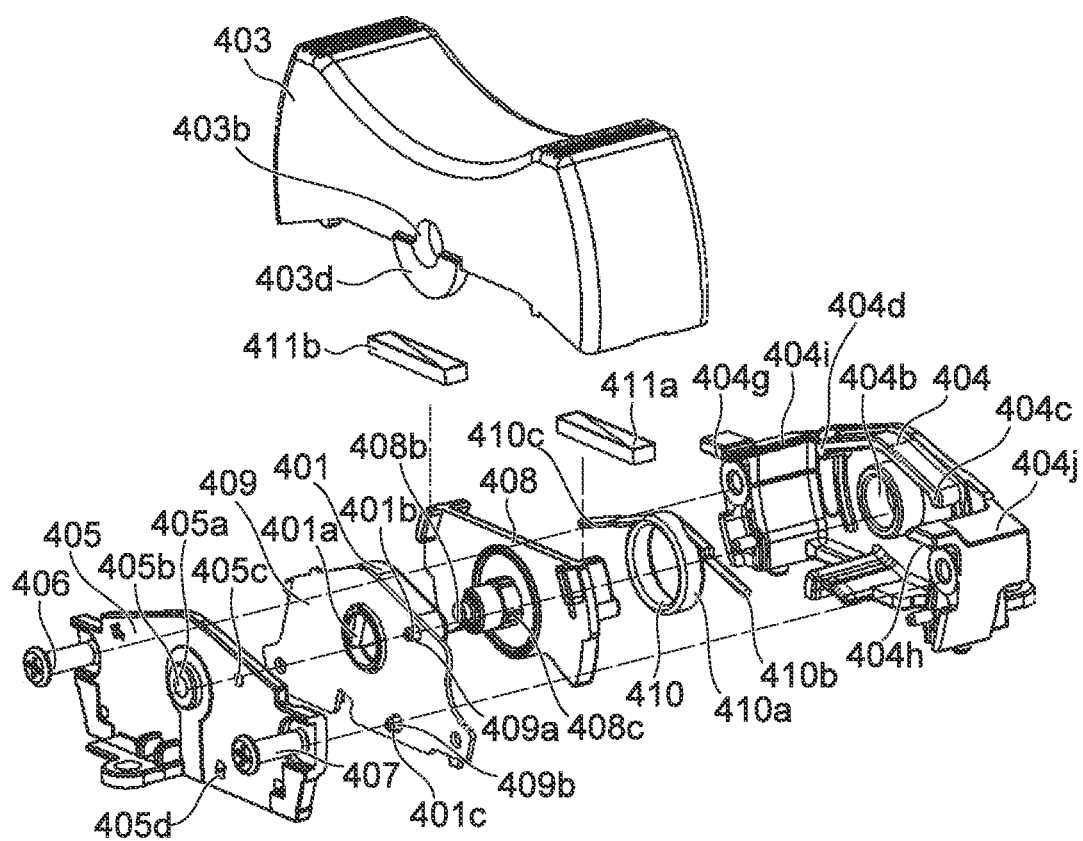
FIGS. 6A and 6B are exploded perspective views of the seesaw switch.
Figure 6B:
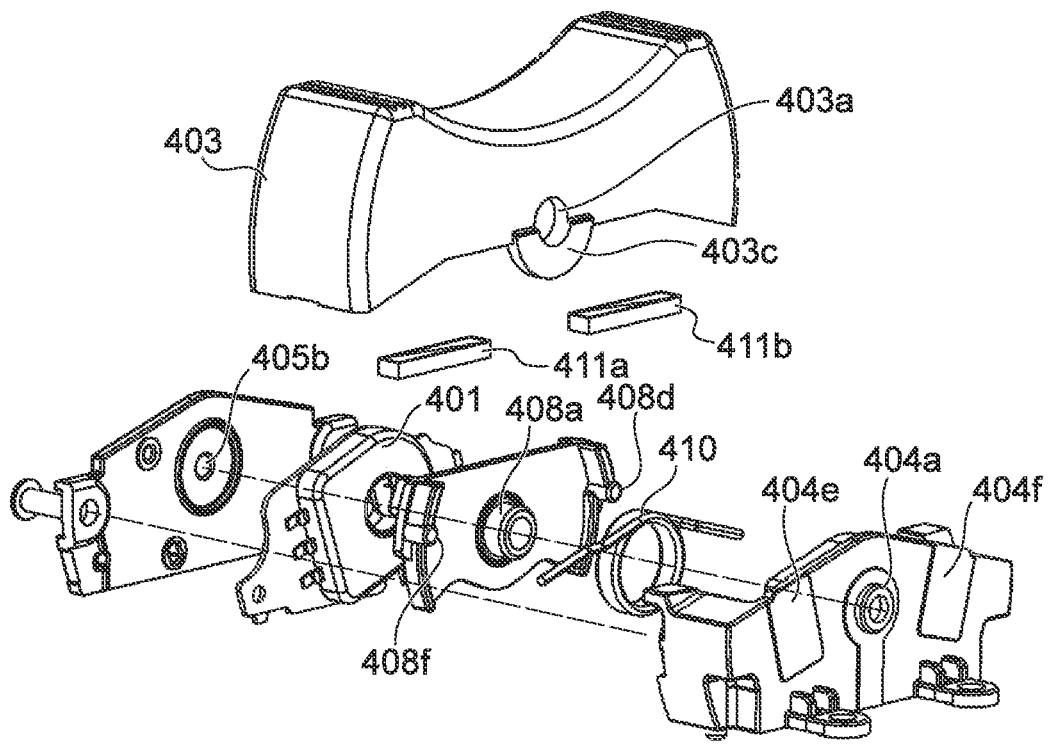

FIG. 5 is a perspective view of the seesaw switch 400. FIGS. 6A and 6B are exploded perspective views of the seesaw switch 400. Note that FIG. 6A and FIG. 6B differ from each other in the direction of viewing the seesaw switch 400. The seesaw switch 400 includes a zoom base 402 (base portion) containing a rotary-type variable resistor 401, and a zoom key 403 (key member) mounted on the zoom base 402 such that the zoom key 403 is pivotable like a seesaw.

The zoom base 402 includes a base member 404 which is open at one end, and a cover member 405 disposed to close the opening of the base member 404. The base member 404 and the cover member 405 are fixed to each other with screws 406 and 407. The cover member 405 has a shaft portion 405a protruding outward of the zoom base 402 and a fitting hole 405b formed in the center of the shaft portion 405a. The base member 404 has a fitting hole 404b formed in a boss protruding inward of the zoom base 402 and a shaft portion 404a protruding outward from a rear surface around the fitting hole 404b (outward of the zoom base 402).

The zoom key 403 has a box shape open on one side and has a fitting hole 403a which is slidably fitted on the shaft portion 404a and a fitting hole 403b which is slidably fitted on the shaft portion 405a. Thus, the zoom key 403 is pivotably supported by the base member 404 and the cover member 405. On respective lower sides of the fitting hole 403a and the fitting hole 403b, a thick portion 403c and a thick portion 403d are provided to increase the mechanical strength of portions around the fitting hole 403a and the fitting hole 403b.

The variable resistor 401 has a rotatable rotary fitting hole 401a having a D-cut shape in the central portion thereof, and protruding portions 401b and 401c protruding toward the cover member 405. The variable resistor 401 is mounted on a zoom board 409, and the zoom board 409 has fitting holes 409a and 409b which are fitted on the protruding portions 401b and 401c. Further, the cover member 405 has fitting holes 405c and 405d which are fitted on the protruding portions 401b and 401c.

An arc-shaped rotating member 408 is accommodated inside the zoom base 402. The rotating member 408 includes a shaft portion 408a inserted in the fitting hole 404b of the base member 404, a shaft portion 408b inserted in the fitting hole 405b of the cover member 405, and a shaft portion 408c having a D-cut shape inserted in the rotary fitting hole 401a of the variable resistor 401.

The shaft portion 408a is rotatably inserted in the fitting hole 404b of the base member 404, and the shaft portion 408b protruding toward the cover member 405 is rotatably inserted in the fitting hole 405b of the cover member 405. Thus, the rotating member 408 is rotatably supported by the base member 404 and the cover member 405. Further, the shaft portion 408c is inserted in the rotary fitting hole 401a of the variable resistor 401. With this, the variable resistor 401 is supported by the rotating member 408 such that the variable resistor 401 is rotatable about the rotary fitting hole 401a.

A coil spring 410 for returning the rotary fitting hole 401a of the variable resistor 401 to its original position is disposed between the base member 404 and the rotating member 408. The coil spring 410 is a twisted coil spring and has a coil portion 410a, and arm portions 410b and 410c linearly formed to extend from the coil portion 410a.

Figure 7A:
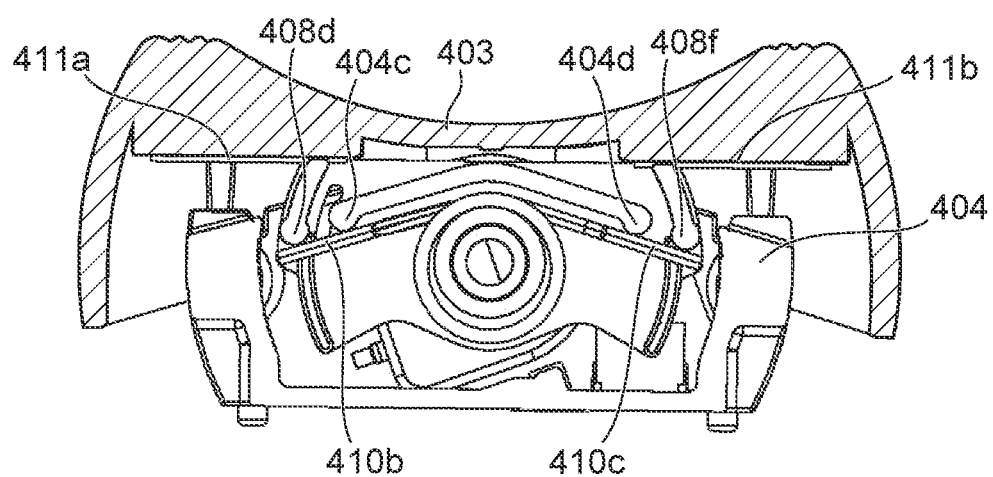
FIGS. 7A to 7C are cross-sectional views taken along a Z-A plane, a Z-B plane, and a Z-C plane in FIG. 5, respectively.
Figure 7B:
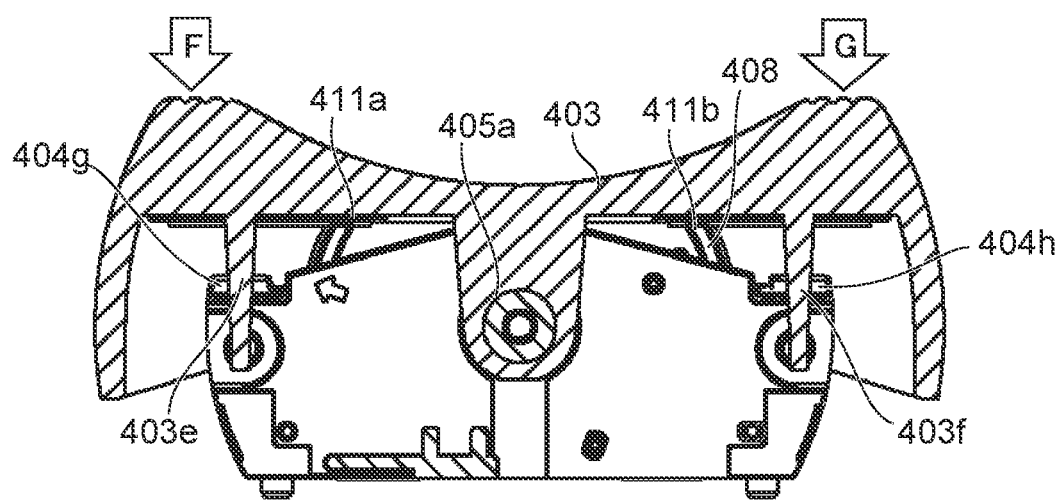
Figure 7C:
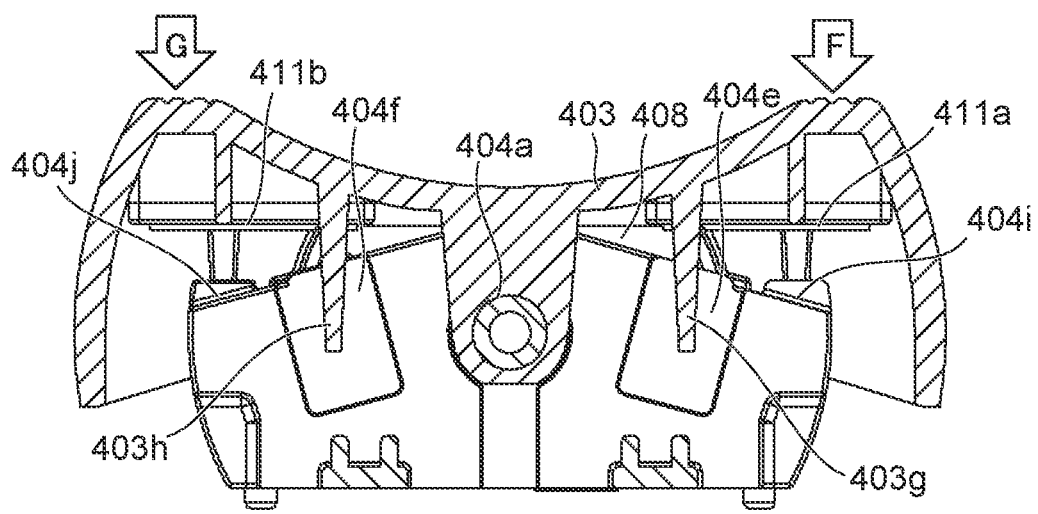

FIG. 7A is a cross-sectional view of the seesaw switch 400 taken along a Z-A plane in FIG. 5. FIG. 7B is a cross-sectional view of the same taken along a Z-B plane in FIG. 5. FIG. 7C is a cross-sectional view of the same taken along a Z-C plane in FIG. 5.

As shown in FIG. 7A, the coil spring 410 is mounted on the base member 404 in a state in which the arm portions 410b and 410c are pressed by protruding portions 404c and 404d of the base member 404. The rotating member 408 is mounted on the base member 404 via the coil spring 410 in a state in which protruding portions 408d and 408f of the rotating member 408 are in contact with the arm portions 410b and 410c. Elastic members 411a and 411b for reducing looseness are interposed between the zoom key 403 and the rotating member 408 in a state brought into contact with these components. The elastic members 411a and 411b are cushioning materials and are affixed to the zoom key 403.

The seesaw switch 400 is operated in the following manner: The zoom key 403 is positioned in the original position in a no-load state, and this state is shown in FIG. 7A. At this time, the coil spring 410 is held in a state brought into contact with the base member 404, the rotating member 408 is supported in a state brought into contact with the coil spring 410, and the elastic members 411a and 411b are supported in a state brought into contact with the rotating member 408. Further, the zoom key 403 is supported in the original position via the elastic members 411a and 411b, and the rotary fitting hole 401a of the variable resistor 401 is supported in the original position in a state in contact with the rotating member 408.

Let it be assumed that a load F or a load G indicated by an arrow is applied to the zoom key 403, as shown in FIGS. 7B and 7C. In this case, the zoom key 403 is rotated about the shaft portion 404a and the shaft portion 405a while being slid on sliding portions 404e and 404f and sliding protruding portions 404g and 404h of the base member 404. In accordance with this, the rotating member 408 is rotated while maintaining the state in contact with the zoom key 403 via the elastic members 411a and 411b, and as the rotating member 408 is rotated, the rotary fitting hole 401a of the variable resistor 401 is rotated to change a resistance value of the variable resistor 401. Then, when the zoom key 403 is brought into abutment with a flat portion 404i or 404j of the base member 404 via the elastic member 411a or 411b, the rotation of the zoom key 403 is stopped.

When the load F or the load G applied to the zoom key 403 is removed, the rotating member 408 is pushed back to the original position by an urging force of the coil spring 410. In accordance with this, the zoom key 403 also returns to the original position. Further, as the rotating member 408 is rotated, the rotary fitting hole 401a of the variable resistor 401 is rotated to change the resistance value of the variable resistor 401 to the original value.

In the seesaw switch 400, the elastic members 411a and 411b for reducing looseness are provided between the zoom key 403 and the rotating member 408 as mentioned above. Therefore, when the load F or the load G is applied to the zoom key 403, the zoom key 403 is brought into abutment with the flat portion 404i or 404j of the base member 404 via the elastic member 411a or 411b. That is, the one elastic member 411a plays a roll of suppressing occurrence of looseness of the zoom key 403 in the original position and suppressing generation of an abutment sound of the zoom key 403 when the load is applied, and the other elastic member 411b also plays the same roll. Thus, it is possible to reduce a conventionally required space for arranging an elastic member for suppressing the abutment sound.

Further, in the seesaw switch 400, the sliding portions 404e and 404f and the sliding protruding portions 404g and 404h are integrally molded with the base member 404 into a one-piece component. When the load F or the load G is applied to the zoom key 403, the sliding portions 404e and 404f and the sliding protruding portions 404g and 404h slide while being in contact with slid portions 403e, 403f, 403g, and 403h of the zoom key 403. The slid portions 403e, 403f, 403g, and 403h are molded into a one-piece component such that the slid portions 403e, 403f, 403g, and 403h support the two surfaces of the box shape of the zoom key 403 opposed in a longitudinal direction at this time. This makes it possible to suppress occurrence of looseness between the base member 404 and the zoom key 403 (unstable spacing between the fitted portions thereof) and reduce a conventionally required space between the fitted portions.

<Description of Air Inlet/Outlet Ports>

The body 100 has a forced cooling structure section using a fan and a duct for cooling a heat source by effectively discharging heat generated therein to the outside. The body 100 is provided with an air inlet port 110 between the grip portion 107 and the operation ring 102 at a location inward from a tip end of the grip portion 107. The air inlet port 110 is provided at such a location as not to be covered even when the photographer operates the operation ring 102 by the left hand while gripping the grip portion 107 with the right hand, and therefore, is capable of stably sucking air.

A left side wall of the external connection terminal 109 is provided with an air outlet port 111 which is open obliquely toward the rear left. That is, the air outlet port 111 is provided at a location behind the grip portion 107 and opens in an intermediate direction between the rearward direction and the rightward direction. This prevents exhaust wind from blowing against the right hand and the face of the photographer when using the image capturing apparatus 1000, and hence the photographer is prevented from being made uncomfortable by the exhaust wind. Note that details of the forced cooling structure section including the air inlet port 110 and the air outlet port 111 will be described hereinafter.

<Description of the Internal Structure (Outline) of the Body 100>

Figure 8:
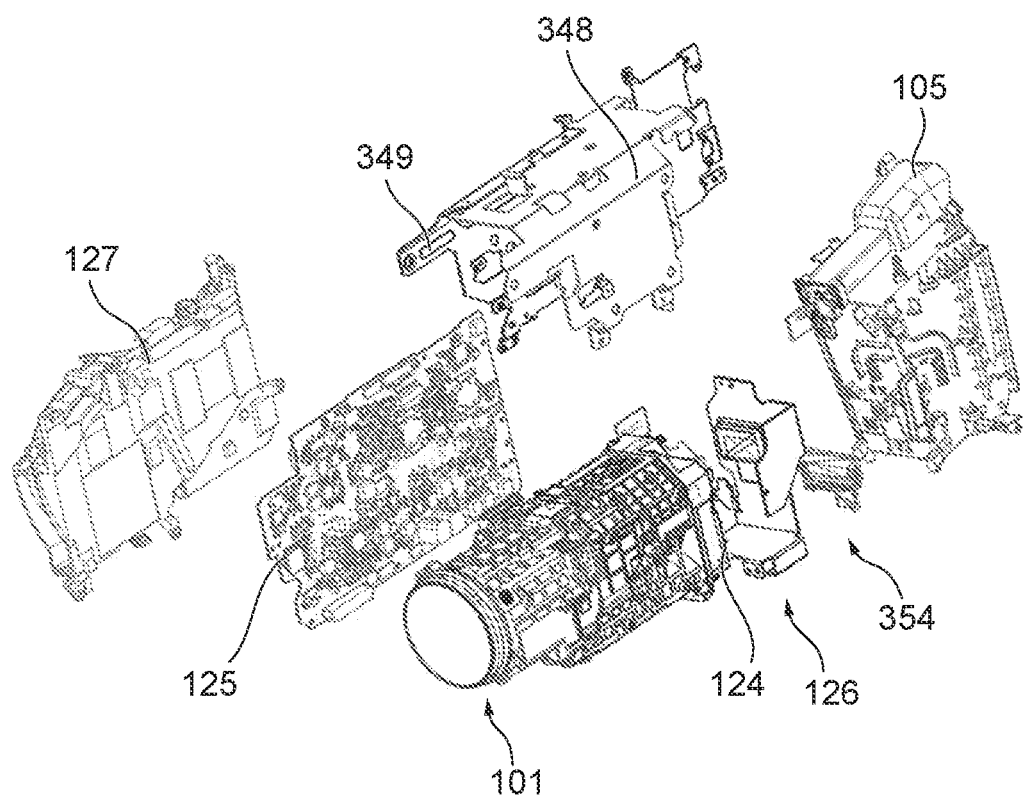
FIG. 8 is an exploded perspective view of the image capturing apparatus.

FIG. 8 is an exploded perspective view of the body 100. The body 100 includes the photographic lens 101, an image capturing sensor board 124, a lens upper right surface heat dissipation member 348, a lens left surface heat dissipation member 349, a control circuit board 125, an image capturing sensor heat dissipation section 126, a heat dissipation duct 127, and a gyro board 354.

Light incident through the photographic lens 101 forms an image on the image sensor 128 mounted on the image capturing sensor board 124. The lens upper right surface heat dissipation member 348 and the lens left surface heat dissipation member 349 are members (sheet metal members) each formed of a material having a high thermal conductivity, such as aluminum, and are arranged such that the members are connected with each other to surround the periphery of the photographic lens 101 and are fixed to the photographic lens 101. The control circuit board 125 is a substantially rectangular substrate on which a central processing unit (CPU) that controls the overall operation of the image capturing apparatus 1000 and the like are mounted, and is disposed on the left side of the photographic lens 101 such that its longitudinal direction becomes the front-rear direction.

Heat generation elements (such as the image sensor 128, the CPU and an image processing semiconductor device) required to be cooled are mounted on the image capturing sensor board 124 and the control circuit board 125. The image capturing sensor heat dissipation section 126 is a portion for dissipating heat generated in the image capturing sensor board 124, and will be described hereinafter in detail. The gyro board 354 detects an amount of hand shake generated when the photographer is performing photographing while gripping the image capturing apparatus 1000 (the grip portion 107), as an angular velocity. The arrangement and the like of the gyro board 354 will be described separately hereinafter.

<Description of the Image Capturing Sensor Board 124>

Figure 9A:
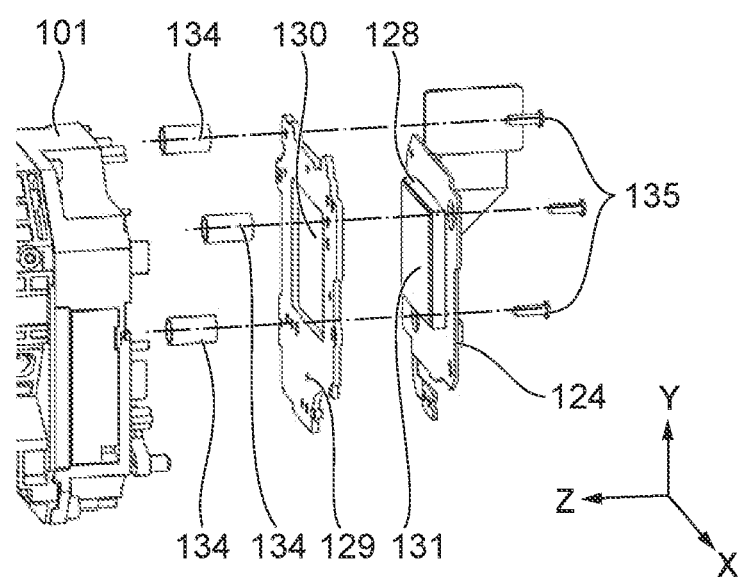
FIGS. 9A and 9B are exploded perspective views showing an image capturing sensor board and components associated therewith.
Figure 9B:
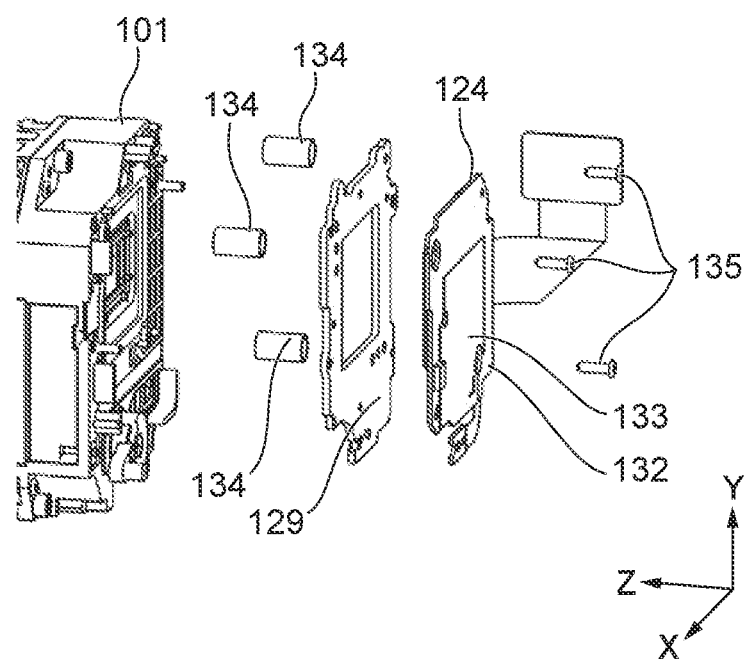

FIGS. 9A and 9B are exploded perspective views showing the image capturing sensor board 124 and components associated therewith. FIG. 9A and FIG. 9B differ from each other in the direction of viewing the image capturing sensor board 124. The image sensor 128 is mounted on a front side (+Z side) of the image capturing sensor board 124. The image sensor 128 photoelectrically converts an optical image formed on an imaging surface of the image sensor 128 by the photographic lens 101 to generate video signals. The temperature of the image capturing sensor board 124 is increased by heat generated when the image sensor 128 generates video signals by photoelectric conversion.

A sensor fixing sheet metal 129 is disposed in front of the image capturing sensor board 124, and an imaging surface protection member 131 of the image sensor 128 is exposed from a rectangular opening 130 of the sensor fixing sheet metal 129 toward the +Z side. The sensor fixing sheet metal 129 is fixed to the image capturing sensor board 124 with an adhesive, after adjusting the relative position thereof to the image sensor 128 with high accuracy.

An image capturing sensor heat dissipation surface 133 is provided in an area of an image sensor non-mounting surface 132 of the image capturing sensor board 124 which is a reverse surface of the same (surface opposite from the surface on which the image sensor 128 is mounted), in which a shadow of the image sensor 128 is projected from the front side (area in which the shadow of the image sensor 128 is projected in the Z direction). The image capturing sensor heat dissipation surface 133 is formed by eliminating a conductor insulating protective film from the board surface and exposing the conductor of the image capturing sensor board 124, and no other electric components are mounted thereon.

Here, the focus position of the photographic lens 101 and the tilt of the axis H include individual variation, and hence the image sensor 128 is required to be disposed at a proper location with a suitable tilt dependent the individual variation of the photographic lens 101. The sensor fixing sheet metal 129 is supported in a floating state with coil springs 134 which generate an urging force for separating the sensor fixing sheet metal 129 from the photographic lens 101 in the Z direction (optical axis direction), and position adjustment screws 135. By properly tightening the position adjustment screws 135 to adjust the position of the image sensor 128 in the front-rear direction and the tilt of the same with respect to the axis H, it is possible to dispose the image sensor 128 at a desired location with a desired tilt. Adjustment of the position with respect to the photographic lens 101 and the tilt of the image capturing sensor board 124 is performed for each individual of the body 100, and therefore, the position and tilt of the image capturing sensor board 124 are different for each individual of the body 100.

<Heat Dissipation Structure of the Image Capturing Sensor Board 124>

Figure 10A:
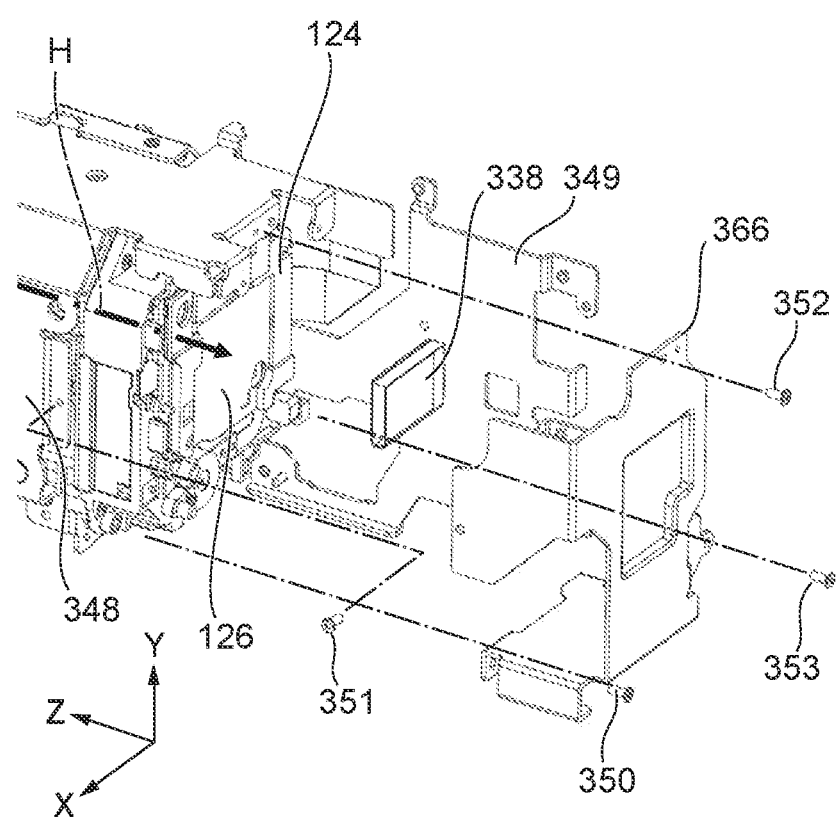
FIGS. 10A and 10B are exploded perspective views showing a structure of an image capturing sensor heat dissipation section and components associated therewith.
Figure 10B:
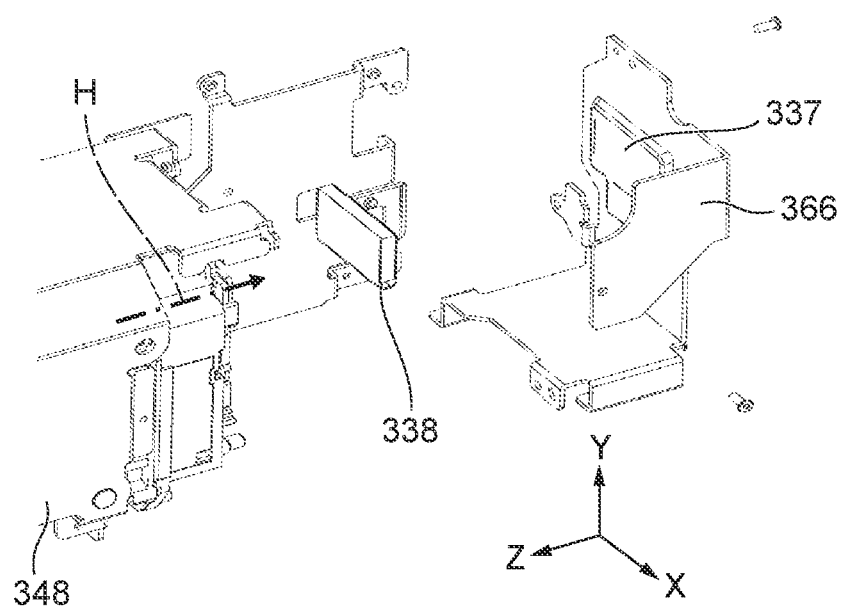

FIGS. 10A and 10B are exploded perspective views showing the image capturing sensor heat dissipation section 126 and essential parts associated therewith. Note that FIG. 10A and FIG. 10B differ from each other in the direction of viewing the image capturing sensor heat dissipation section 126. An image capturing sensor heat dissipation sheet metal 366 is disposed at a location rearward of the image capturing sensor board 124, a protruding portion 337 protruding forward is provided in a central surface of the image capturing sensor heat dissipation sheet metal 366, and a heat-conductive member 338 is fixed to the protruding portion 337 e.g. with a double-sided tape. The heat-conductive member 338 is formed of an elastic material having elasticity at low load in the optical axis direction and is disposed in a state in contact with both of the image capturing sensor board 124 and the image capturing sensor heat dissipation sheet metal 366. Thus, a heat transfer path from the image capturing sensor board 124 to the image capturing sensor heat dissipation sheet metal 366 is formed via the heat-conductive member 338.

Figure 11A:
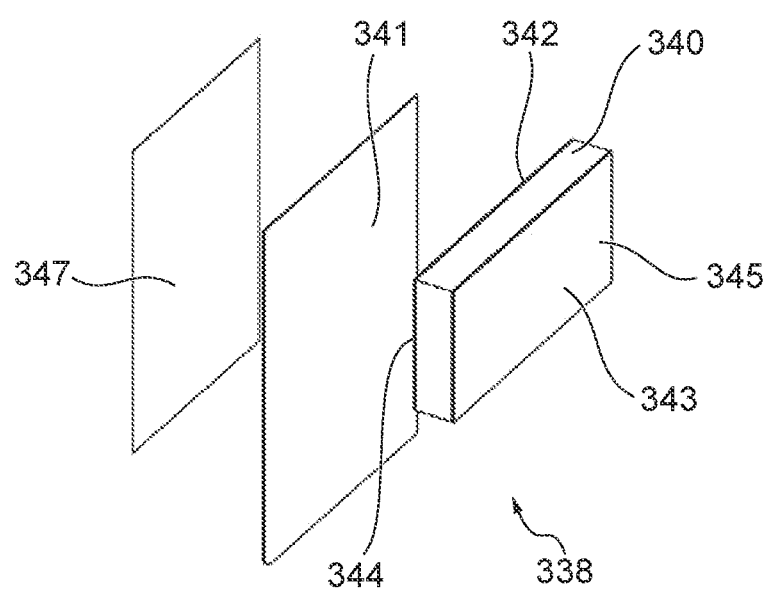
FIGS. 11A and 11B are views showing the configuration of a heat-conductive member.
Figure 11B:
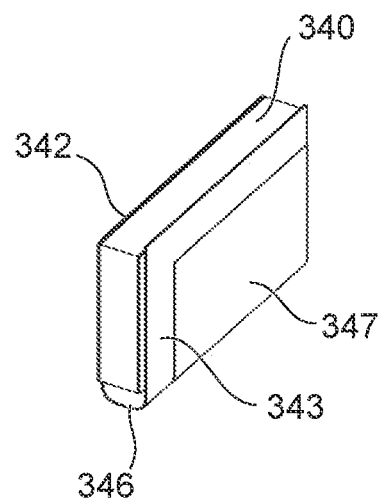

FIG. 11A is an exploded perspective view showing the configuration of the heat-conductive member 338. FIG. 11B is a perspective view showing an appearance configuration of the heat-conductive member 338. As shown in FIG. 11A, the heat-conductive member 338 includes an elastic member 340 having elasticity at low load and a heat conduction sheet 341 which is thin and has a rectangular shape. The elastic member 340 has a flat rectangular parallelepiped shape, and opposite surfaces having the largest area are defined as a first main flat surface 342 and a second main flat surface 343.

A first double-sided tape 344 is affixed to the first main flat surfacer 342, and a second double-sided tape 345 is affixed to the second main flat surfacer 343. The heat conduction sheet 341 is affixed to the elastic member 340 in a state bent to form a heat transfer path 346 from the first main flat surface 342 to the second main flat surface 343. Further, a double-sided tape 347 is affixed to the heat conduction sheet 341. A side of the double-sided tape 347 toward the first main flat surface 342 is affixed to the image capturing sensor board 124, and a side of the same toward the second flat surface 343 is affixed to the image capturing sensor heat dissipation sheet metal 366. Thus, the heat-conductive member 338 is stably held between the image capturing sensor board 124 and the image capturing sensor heat dissipation sheet metal 366. Further, at this time, the elastic member 340 is surface-compressed, and can be positively brought into close contact with the image capturing sensor board 124 without applying an excessive load to the image capturing sensor board 124. Note that a compression amount of the elastic member 340 is an amount by which the elastic member 340 is positively brought into close contact with the image capturing sensor board 124 and the image capturing sensor heat dissipation sheet metal 366 even when the position of the image capturing sensor board 124 is different for each individual of the body 100 due to an adjustment amount of the focal length and the tilt with respect to the axis H.

Referring again to FIGS. 10A and 10B, the lens upper right surface heat dissipation member 348 and the lens left surface heat dissipation member 349, which are high heat conductive sheet metal members, are disposed around the photographic lens 101. The image capturing sensor heat dissipation sheet metal 366 is fixed at four points by fixing members 350, 351, 352, and 353 in a state brought into surface contact with the lens upper right surface heat dissipation member 348 and the lens left surface heat dissipation member 349. Heat generated in the image capturing sensor board 124 is transferred to the lens upper right surface heat dissipation member 348 and the lens left surface heat dissipation member 349 via the heat-conductive member 338 and the image capturing sensor heat dissipation sheet metal 366 and discharged therefrom.

<Description of the Control Circuit Board 125>

Figure 12A:
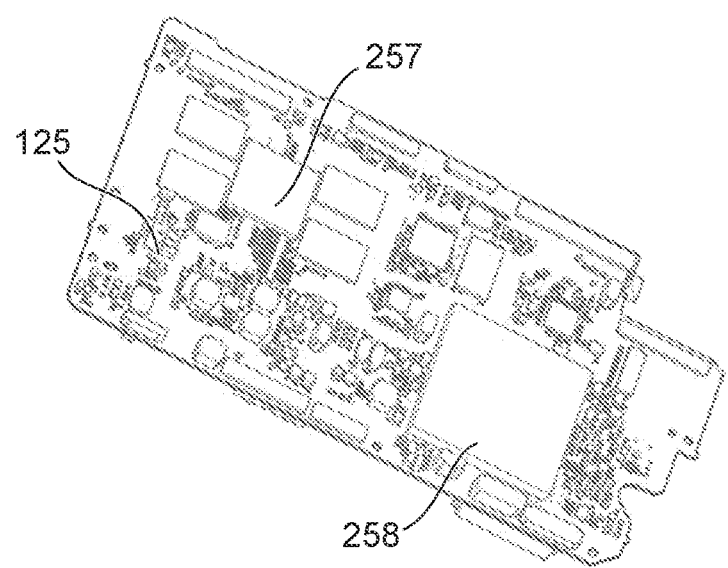
FIGS. 12A and 12B are perspective views of a control circuit board.
Figure 12B:
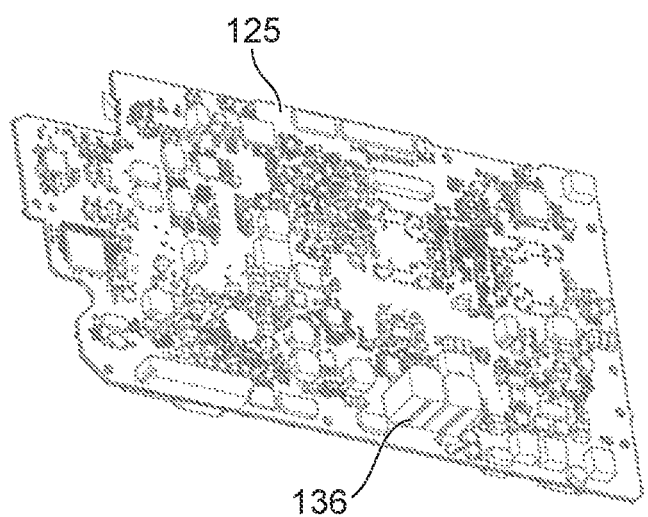

FIG. 12A is a perspective view showing a surface of the control circuit board 125, on which heat generating elements 257 and 258 are mounted. FIG. 12B is a perspective view showing a surface of the control circuit board 125, opposite from the surface on which the heat generating elements 257 and 258 are mounted.

The control circuit board 125 that controls the overall operation of the image capturing apparatus 1000 has a lot of ICs mounted thereon. For example, the control circuit board 125 has the ICs mounted thereon which are large in power consumption and generate heat, including a video signal processing element for processing video signals output from the image sensor 128. Referring to FIG. 12A, some of the ICs that are mounted on the control circuit board 125 and generate heat are indicated by the heat generating elements 257 and 258. As shown in FIG. 12A, the heat generating elements 257 and 258 are mounted on the same surface.

As shown in FIG. 12B, out of a variety of elements mounted on the control circuit board 125, tall elements 136 having a large protruding amount from the mounted surface are mounted on a surface of the control circuit board 125 opposite from the surface on which the heat generating elements are mounted. The body 100 includes the heat dissipation duct 127 (see FIG. 8) for discharging heat generated in the control circuit board 125 to the outside air. Although details are described hereinafter, the heat dissipation duct 127 is formed by mounting a rotary fan 264 (air blowing fan) on a member having a cavity therein. Heat generated in the control circuit board 125 is transferred to air within the cavity, and the air warmed within the heat dissipation duct 127 is discharged to the outside, by forcibly causing air to flow using the rotary fan 264.

<Description of the Battery Chamber 105>

Figure 13:
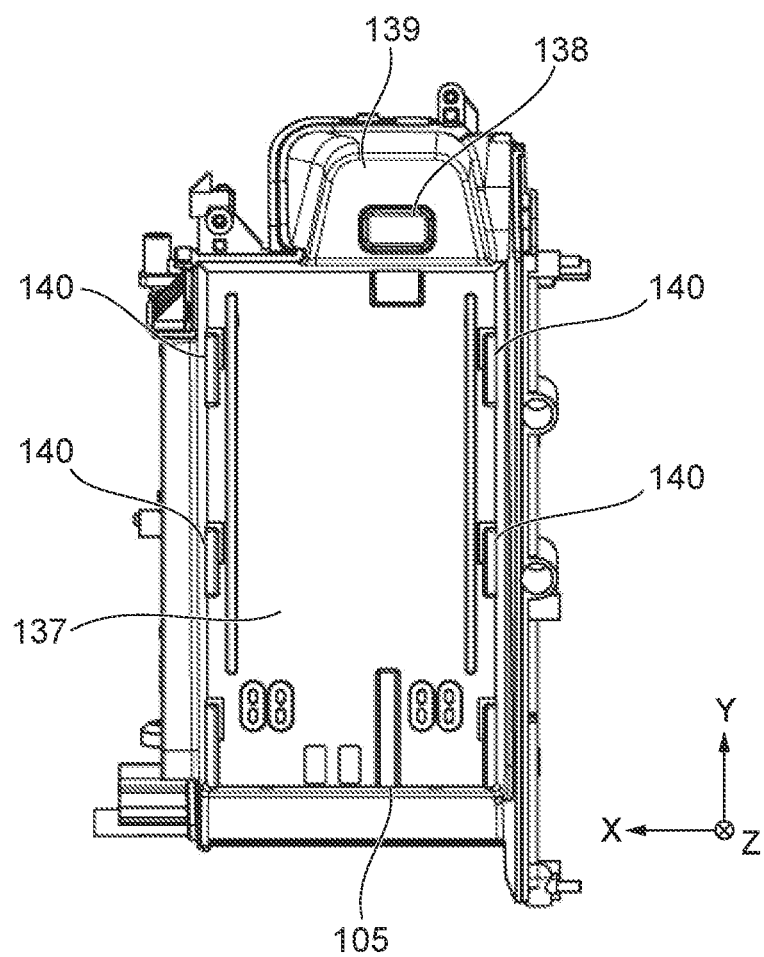
FIG. 13 is a rear view showing the configuration of a battery chamber.

FIG. 13 is a rear view showing the configuration of the battery chamber 105. The battery chamber 105 is a portion having a box shape that has an opening in the rear surface of the body 100 and has the Y direction as the longitudinal direction. The battery chamber 105 is formed such that the battery 106 can be mounted/removed and has a battery chamber cover 137 and a lock knob 138.

The battery chamber cover 137 is a cover forming the appearance of the rear side (rear surface) of the body 100 and is formed as a box-shaped body for accommodating the battery 106. A recess 139 protruding in an upward direction (+Y direction) is formed integrally with an upper side of the battery chamber cover 137. Further, the battery chamber cover 137 has a plurality of claw portions 140 (protruding shape portions) formed to protrude inward from side walls of the battery chamber cover 137. The claw portions 140 are integrally formed with the battery chamber cover 137.

The lock knob 138 is a protruding shape portion arranged inside the recess 139 provided on the upper side of the battery chamber cover 137, and is urged toward the outside (−Z direction) by a spring (urging member), not shown, provided inside the body 100. The lock knob 138 is retreated inside the body 100 when pressed in forward (in the +Z direction) by applying a force from the appearance side, and automatically returns to the original position by a reaction force of the spring when the pressing force is lost.

Figure 14A:
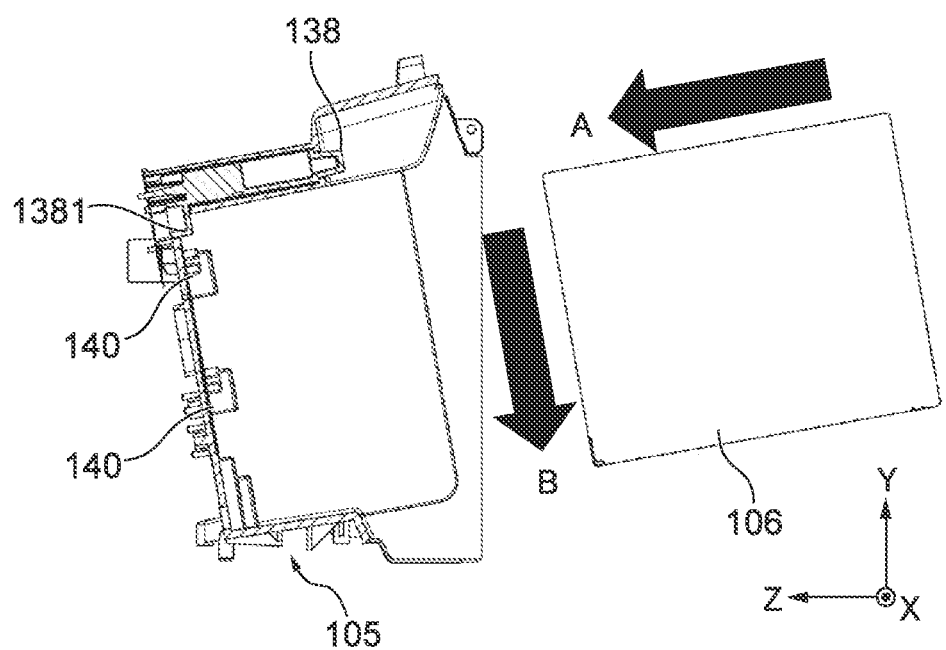
FIGS. 14A and 14B are views showing how to insert a battery into the battery chamber and the battery in a state inserted into the battery chamber.
Figure 14B:
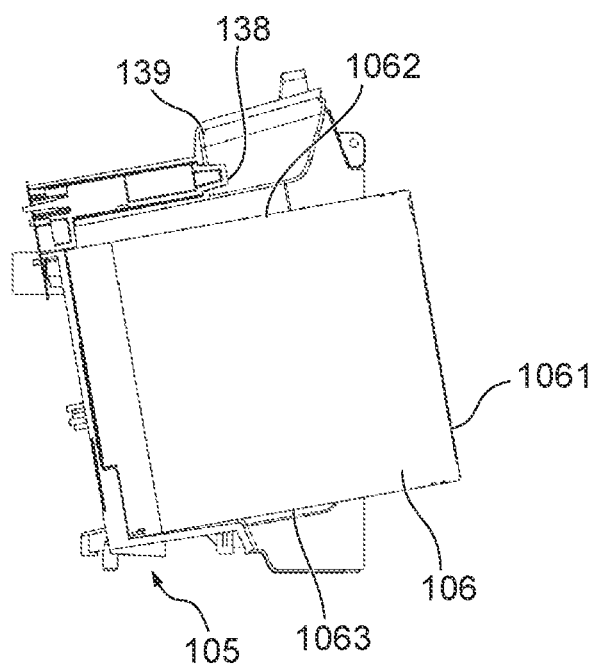

FIG. 14A is a schematic view showing how to insert the battery 106 into the battery chamber 105. FIG. 14B is a cross-sectional view of the battery 106 in a state mounted in the battery chamber 105. When mounting the battery 106 in the battery chamber 105, as shown in FIG. 14A, first, the body of the battery 106 pushes in the lock knob 138 from the rear side of the body 100 in a direction indicated by an arrow A to thereby cause the lock knob 138 to retreat inside the body 100.

After that, the battery 106 is inserted along a direction indicated by an arrow B which goes from the upper side toward the bottom side of the battery chamber 105 while being guided by the claw portions 140 until the battery 106 is completely mounted. When the battery 106 has been inserted up to the attachment position, the lock knob 138 having retreated inside the body 100 is returned to the original position, and an upper surface 1062 of the battery 106 is held by a lower end 1381 of the lock knob 138. This prevents the battery 106 from being removed in a −B direction.

Note that as shown in FIG. 14B, the battery 106 is mounted in the battery chamber 105 such that its rear surface 1061 is positioned rearward of the recess 139. Therefore, when removing the battery 106, a finger is inserted in the recess 139 to push the lock knob 138, and simultaneously, the ball of the finger can be positively brought into contact with the upper surface 1062 of the battery 106. Further, the battery chamber 105 has an open lower side opposed to the recess 139, and hence a lower surface 1063 of the battery 106 is exposed to the outside in a state in which the battery 106 is mounted. Therefore, the photographer can insert and remove the battery 106 in a state in which the photographer firmly holds the upper and lower surfaces of the battery 106 with the fingers.

Figure 15A:
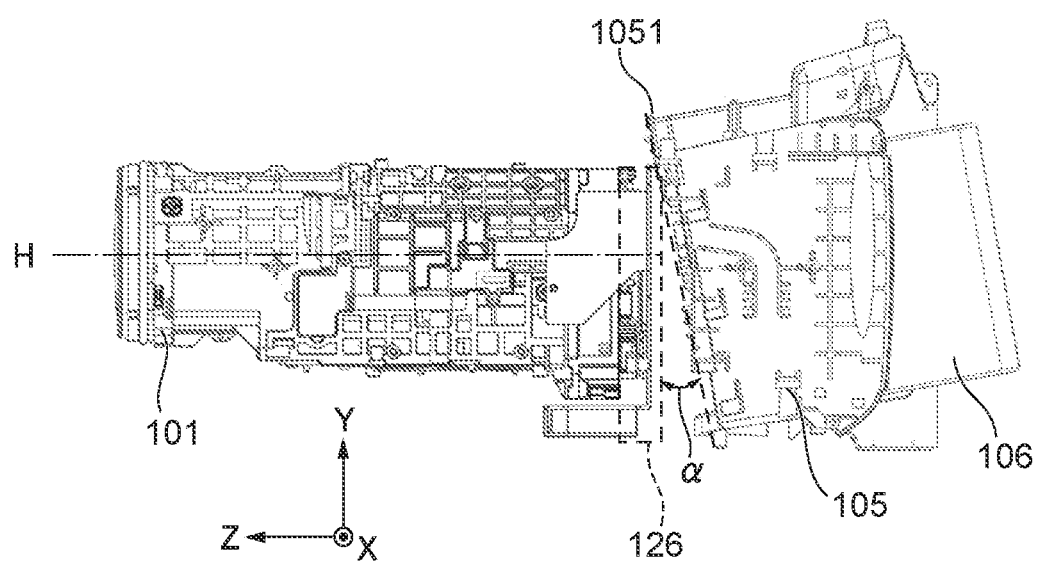
FIGS. 15A and 15B are views showing a position where the battery chamber is disposed in the image capturing apparatus.
Figure 15B:
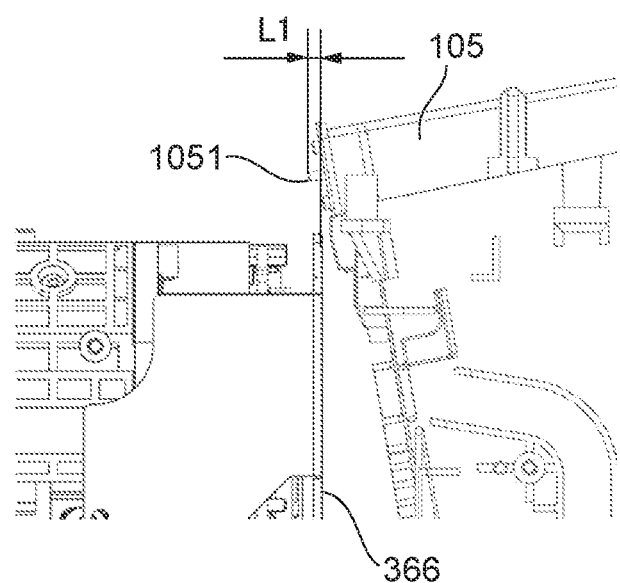

FIG. 15A is a views showing a positional relationship between the photographic lens 101 and the battery chamber 105 in a state in which the battery 106 has been mounted. FIG. 15B is a partially enlarged view of the boundary between the photographic lens 101 and the battery chamber 105 (rear portion of the photographic lens 101 and a tip end portion 1051 of the battery chamber 105).

As is clear from the above-described configuration, the photographic lens 101, the image sensor 128, the image capturing sensor heat dissipation section 126, and the battery chamber 105 are arranged on a line extended from the axis H of the photographic lens 101 from the +Z side in the mentioned order. Further, as shown in FIG. 15A, in the body 100, the battery chamber 105 is formed such that its upper surface is tilted forward toward the image capturing sensor heat dissipation section 126 through a predetermined angle α with respect to the axis H of the photographic lens 101. As a result, as shown in FIG. 15B, a shadow of the tip end portion 1051 as the upper end portion of the front side of the battery chamber 105, projected from the top side of the body 100, overlaps the image capturing sensor heat dissipation section 126 by a distance L1 in the optical axis direction of the photographic lens 101. Thus, it is possible to reduce a useless space within the body 100 while securing a space for the image capturing sensor heat dissipation section 126, and further, it is possible to reduce the size of the body 100 by reducing the whole product length (length in the Z direction) of the body 100.

Figure 16:
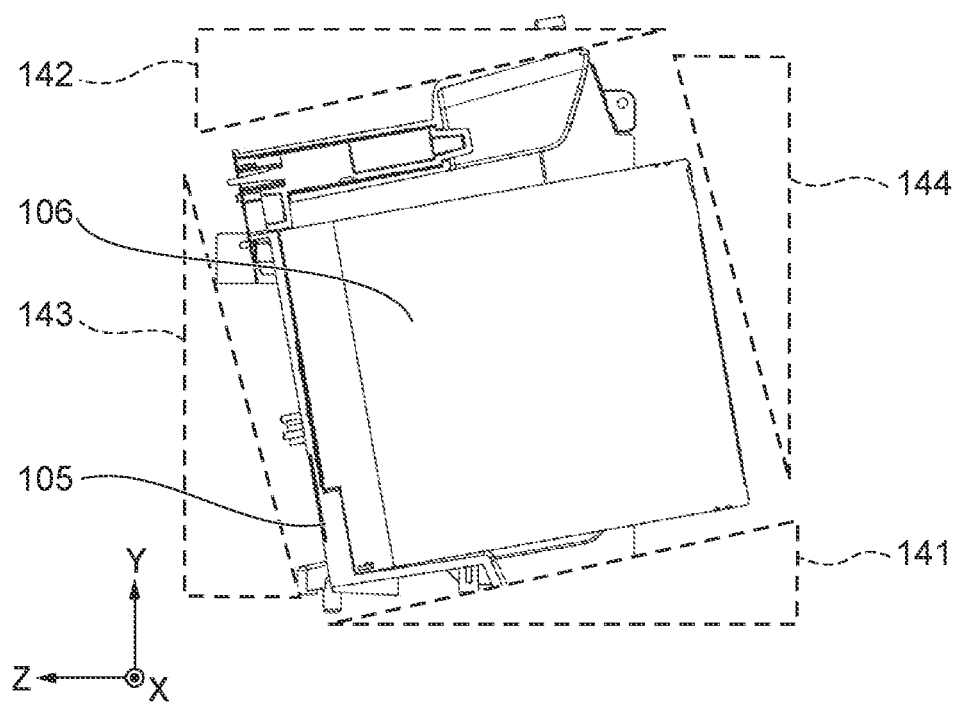
FIG. 16 is a side view of the battery chamber.

FIG. 16 is a side view of the battery chamber 105. As described above, the battery chamber 105 is provided such that the battery chamber 105 is tilted forward by the angle α with respect to the axis H of the photographic lens 101. For this reason, in a state in which the battery 106 has been mounted in the battery chamber 105, the position of the height of the battery 106 progressively becomes higher from the front toward the rear. As a result, as shown in FIG. 16, the four spaces of a battery lower side space 141, a battery upper side space 142, a battery front side space 143, and a battery rear side space 144 are formed around the battery chamber 105.

The battery lower side space 141 formed below the battery chamber 105 is a substantially triangular space which becomes wider in the height direction (Y direction) toward the rear of the battery 106, as viewed from the side (as viewed from the X direction). Therefore, even when the front end portion of the battery chamber 105 is made closer to the lower surface of the body 100, it is possible to secure an enough space in the height direction for a finger to be inserted in the lower side of the battery 106 in the vicinity of the rear end portion of the battery 106. With this, even in a case where the image capturing apparatus 1000 is used in a state placed on a tripod or a floor, it is possible to mount/remove the battery 106 by inserting a finger in the battery lower side space 141 to firmly grasp the battery 106 and sliding the battery 106. That is, even in a situation in which there is an obstacle below the image capturing apparatus 1000, it is possible to easily replace the battery 106 with another, which is very convent for users.

Figure 17:
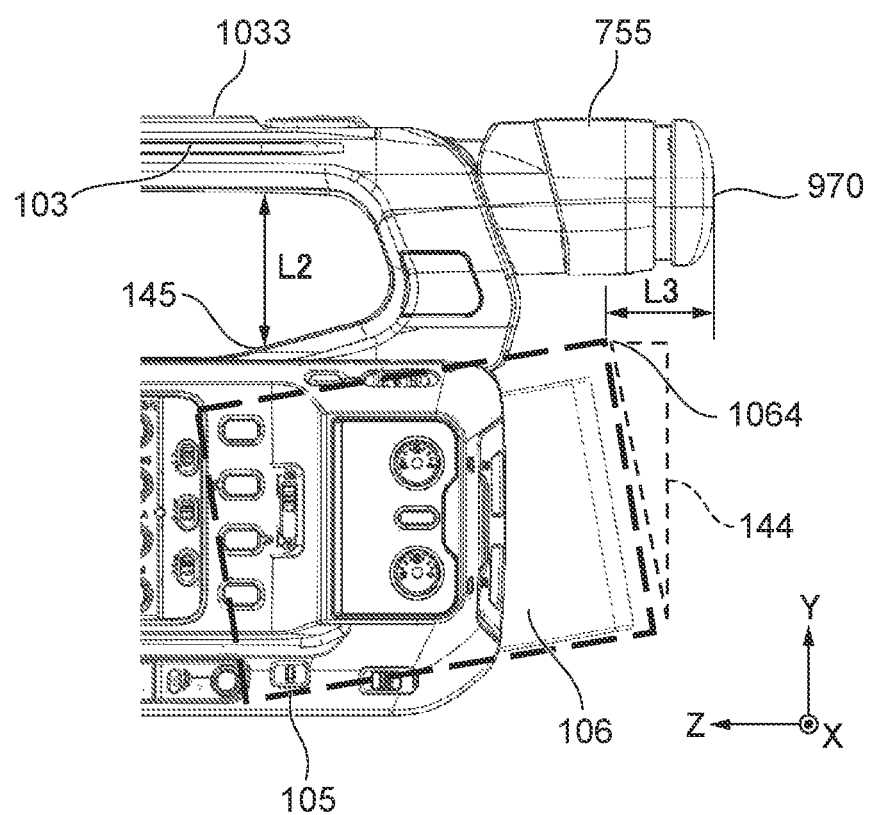
FIG. 17 is a side view of part of the image capturing apparatus where the battery chamber is provided.

The battery upper side space 142 formed above the battery chamber 105 is a substantially triangular space which becomes wider in the height direction toward the front of the battery 106, as viewed from the side. FIG. 17 is a side view of a portion of the body 100, where the battery chamber 105 is provided. Since the battery chamber 105 is formed to be tilted forward as described above, it is possible, as shown in FIG. 17, to provide a ceiling surface 145 of the body 100 at a low position on the upper side of the battery chamber 105. This makes it possible to form the handle holding space 1034 having a sufficiently large distance L2 without making high the position of the handle grasping portion 1033. Thus, the image capturing apparatus 1000 enables the photographer to easily insert the hand in the handle holding space 1034 when the photographer grasps the handle 103, which is very convenient for users.

Figure 18A:
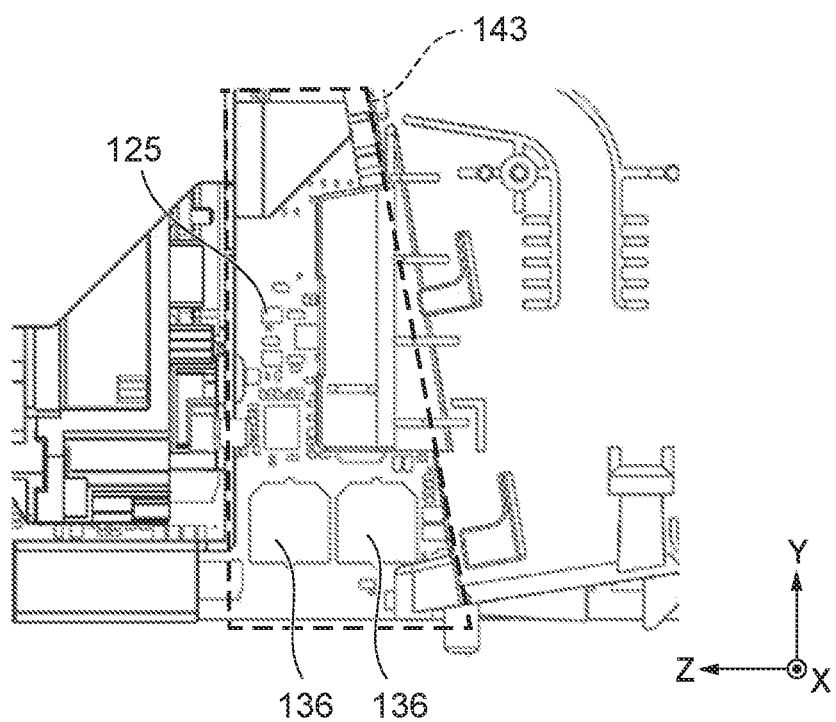
FIGS. 18A and 18B are enlarged views of a space in front of the battery.
Figure 18B:
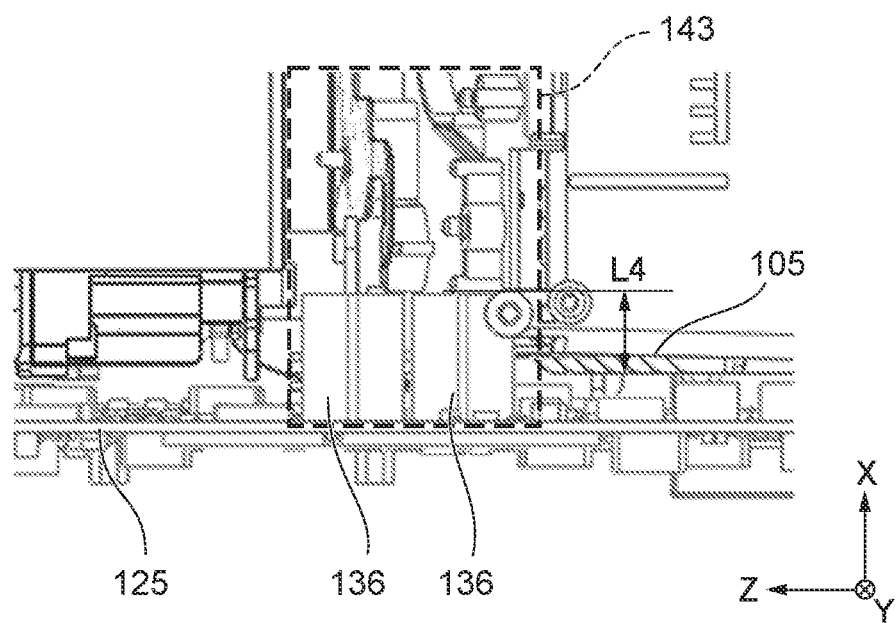
Figure 19:
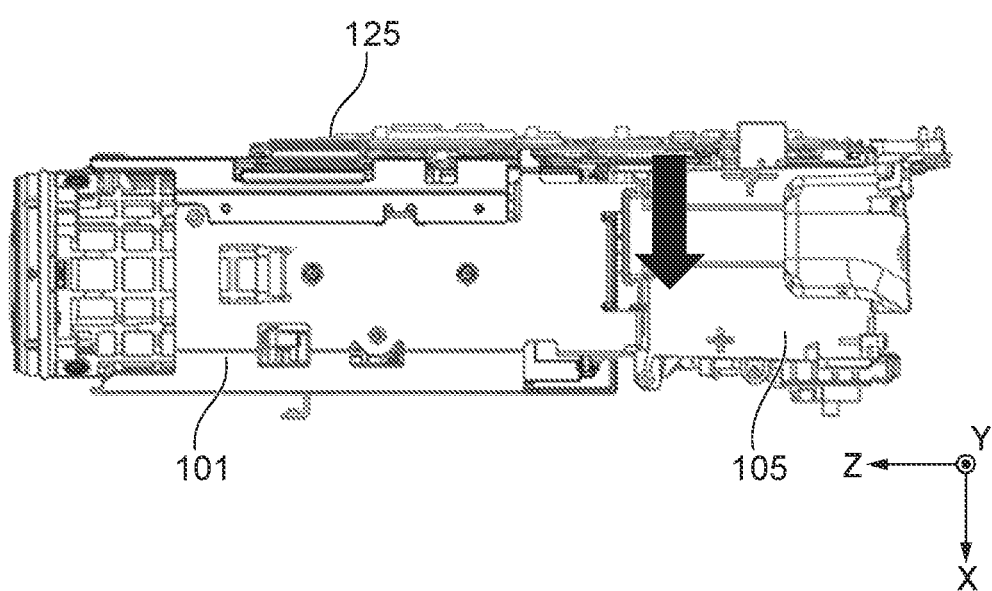
FIG. 19 is a view showing a position where the control circuit board is arranged, as viewed from the top side of the image capturing apparatus.

The battery front side space 143 formed on the front side of the battery chamber 105 is a substantially triangular space which becomes wider in width (length in the Z direction) toward the bottom of the battery 106, as viewed from the side. FIG. 18A is a side view showing the battery front side space 143 (as viewed from the +X side). FIG. 18B is a reverse side view showing the battery front side space 143 (as viewed from the −Y side). FIG. 19 is a view showing where the control circuit board 125 is disposed, as viewed from the above of the image capturing apparatus 1000.

In the body 100, the control circuit board 125 is disposed on the left side of the photographic lens 101 and the battery chamber 105. As described above, the tall elements 136 are mounted on the surface of the control circuit board 125 toward the photographic lens 101. As shown in FIGS. 18A and 18B, the tall elements 136 are mounted on the control circuit board 125 as if inserted into the battery front side space 143. By disposing the tall elements 136 at such a location, it is possible to cause a shadow of the tall elements 136 to overlap the battery chamber 105 by a distance L4 in the left-right direction. That is, as indicated by an arrow in FIG. 19, it is possible to dispose the control circuit board 125 at a location made closer to the battery chamber 105 by the distance L4. As a result, it is possible to reduce the length of the body 100 in the width direction and thereby reduce the size of the image capturing apparatus 1000.

As shown in FIG. 17, an electronic viewfinder 755 including a liquid crystal panel therein is disposed on the upper side of the battery chamber 105 and at the rear end of the handle 103. The photographer can confirm an object by moving the face (eye) closer to an eyepiece surface 970 of the electronic viewfinder 755 from the rear side and looking into the eyepiece surface 970.

When using the electronic viewfinder 755, the face of the photographer (more specifically, the nose and its vicinity) comes close to the lower side of the electronic viewfinder 755. Therefore, unless a space for escaping the face of the photographer is provided below the electronic viewfinder 755, the nose and its vicinity are brought into abutment with the body 100 when looking into the electronic viewfinder 755, which is inconvenient. To prevent this, as shown in FIG. 17, it is necessary to provide a space having a predetermined width L3 between the electronic viewfinder 755 and a portion below the electronic viewfinder 755.

As described hereinabove, since the battery chamber 105 of the body 100 is provided in a posture tilted forward, the battery rear side space 144 formed on the rear side of the battery chamber 105 is a substantially triangular space which becomes wider in width toward the top of the battery 106, as viewed from the side. Therefore, as the portion below the electronic viewfinder 755 is closer in the height direction toward the electronic viewfinder 755, the distance from the eyepiece surface 970 to the portion in the front-rear direction is larger, and hence as is clear from FIG. 17, it is possible to make wide the distance L3 between the eyepiece surface 970 and an upper side rear corner portion 1064 of the battery 106. Thus, the image capturing apparatus 1000 is configured such that even when the photographer looks into the electronic viewfinder 755, the nose and its vicinity are hardly brought into abutment with the body 100, and hence it is convenient for the photographer.

<Description of the Gyro Board 354>

Figure 20:
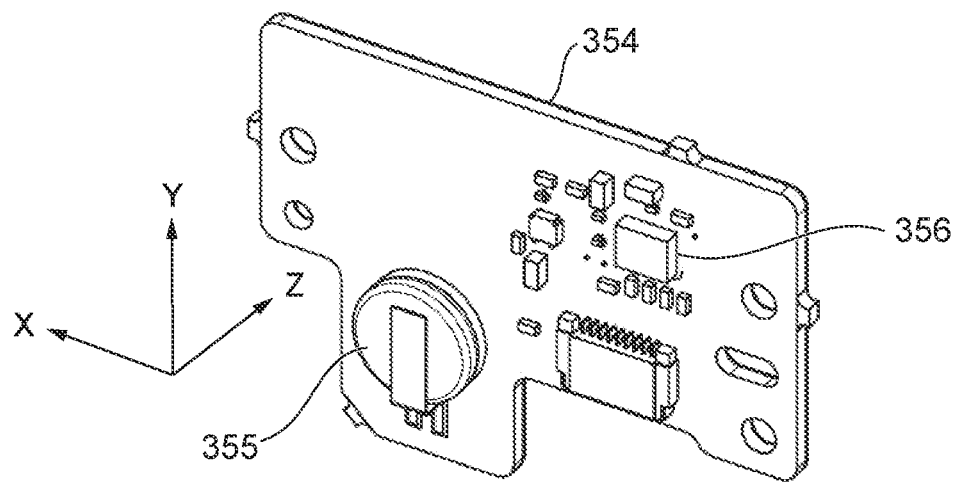
FIG. 20 is a perspective view showing the configuration of a gyro board.

FIG. 20 is a perspective view showing the configuration of the gyro board 354. A gyro 355 and a secondary battery 356 are mounted on the gyro board 354. The gyro 355 detects an amount of hand shake generated when photographing is performed by the photographer holding the image capturing apparatus 1000, as an angular velocity. It is desirable to dispose the gyro 355 such that a detection axis is parallel to one of the X direction, the Y direction, and the Z direction of the image capturing apparatus 1000, in the vicinity of the image sensor 128 mounted on the image capturing sensor board 124. The secondary battery 356 supplies electric power from inside the image capturing apparatus 1000 so as to save settings which can be changed by the photographer, in a case where no other electric power is supplied when the image capturing apparatus 1000 is not in operation. It is desirable that the secondary battery 356 is removably mounted on the gyro board 354 and is disposed in the vicinity of an exterior member of the body 100.

Figure 21A:
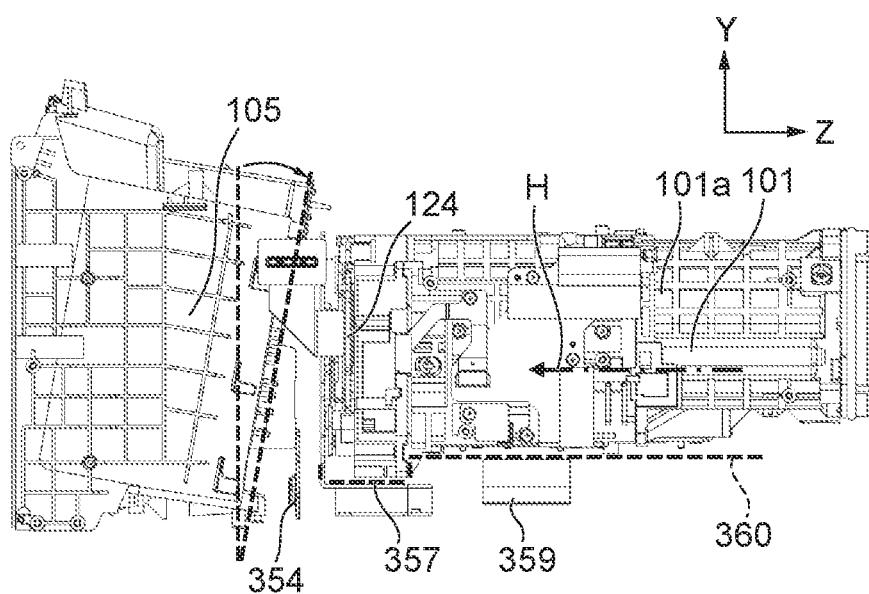
FIGS. 21A to 21C are views showing the configuration of the gyro board and components associated therewith.
Figure 21B:
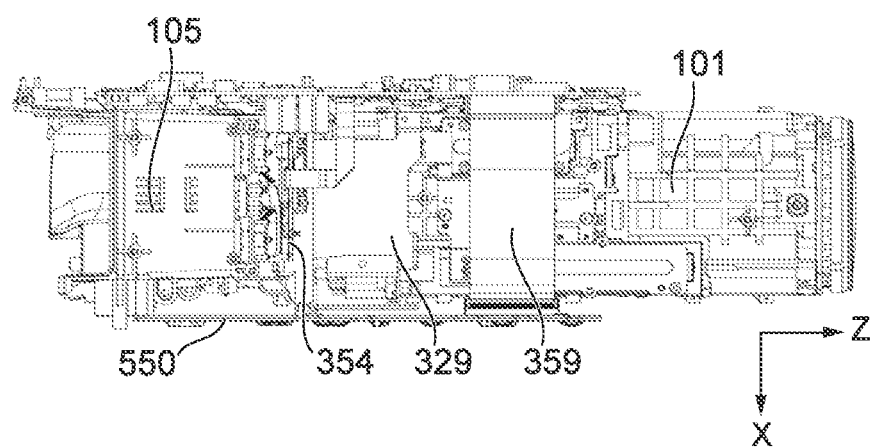
Figure 21C:
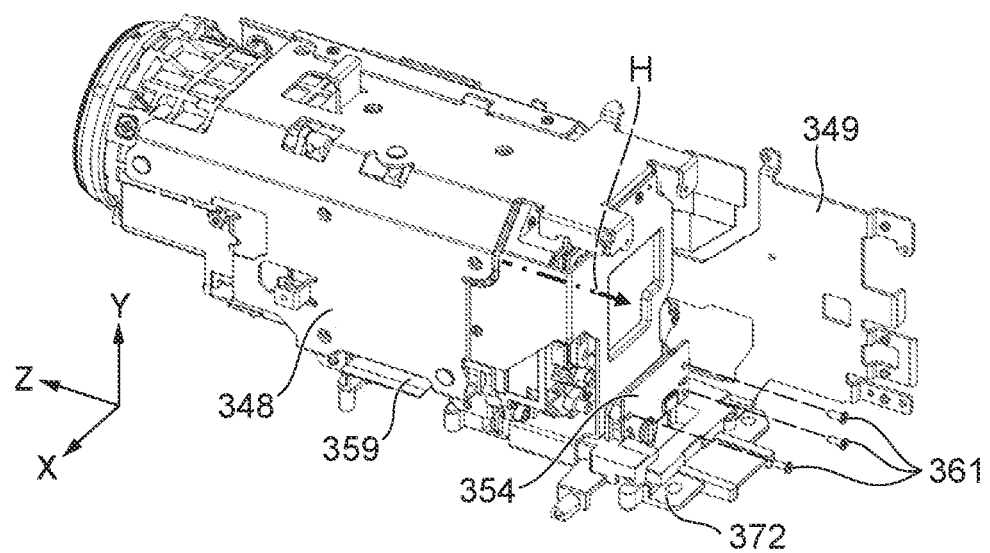

FIGS. 21A to 21C show the gyro board 354 and components associated therewith. FIG. 21A is a side view of the body 100, as viewed from the left side (−X side). FIG. 21B is a bottom view of the body 100, as viewed from the bottom side (−Y side). FIG. 21C is a perspective view showing a portion where the gyro board 354 is fixed and surrounding components. Note that an operation section main board 550 appearing in FIG. 21B and the control circuit board 125 are omitted in FIG. 21A.

The gyro board 354 is disposed on an opposite side (−Z side) to the image capturing sensor board 124 across the image capturing sensor heat dissipation sheet metal 366, such that the gyro board 354 extends orthogonal to the axis H. Further, the gyro board 354 is located in the vicinity of a lower exterior member of the body 100 and is fixed to a fixed member 372 with fixing members 361 as shown in FIG. 21C.

The operation section main board 550 on which a variety of operation members included in the operation system arrangement section 104 are mounted is communicably connected to the control circuit board 125 via a flexible circuit board 359. The flexible circuit board 359 is disposed in a non-protruding area 360 below a lens barrel portion 101a. In the image capturing apparatus 1000, by disposing the flexible circuit board 359 in the non-protruding area 360, a space is formed above (+Y side of) the gyro board 354, and by disposing the battery chamber 105 in this space in a posture tilted forward without a significant gap, size reduction of the body 100 is realized.

<Description of an ND Filter Turret 371>

Figure 22A:
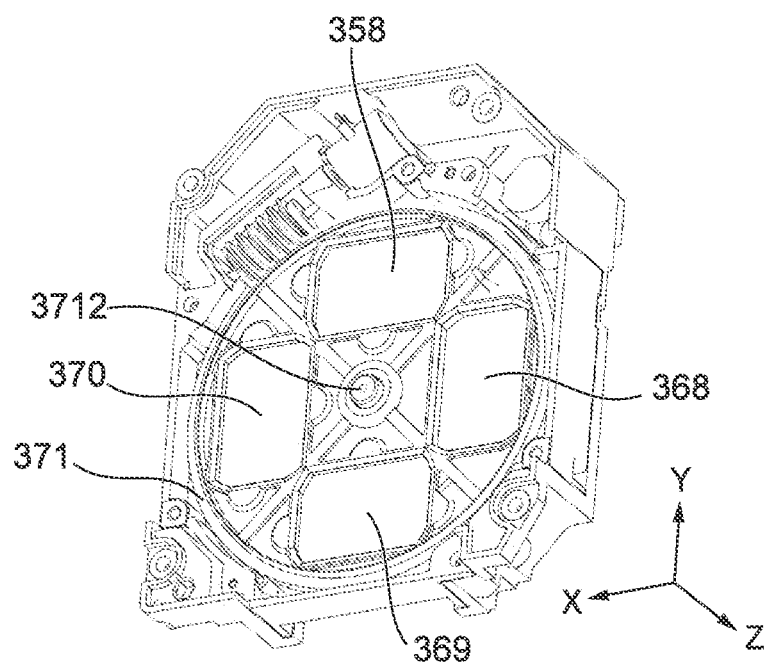
FIGS. 22A and 22B are perspective views showing the configuration of an ND filter turret.
Figure 22B:
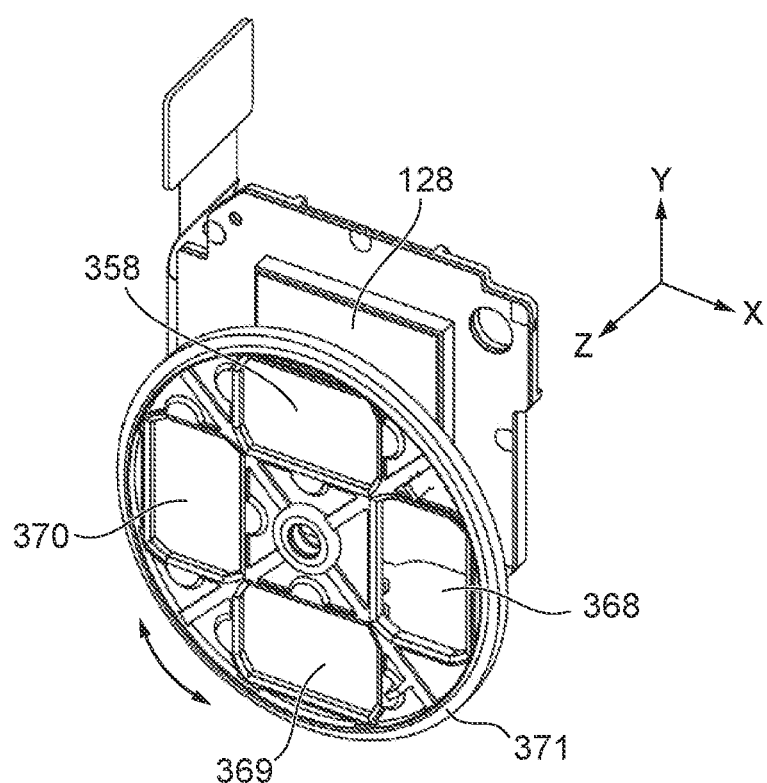

As shown in FIG. 21A, further, the image capturing sensor board 124 is mounted on the rear side (−Z side) of the photographic lens 101. Further, an ND filter turret 371 (see FIGS. 22A and 22B) is incorporated inside the photographic lens 101 at a rear location. FIGS. 22A and 22B are perspective views showing the configuration of the ND filter turret 371. Note that FIGS. 22A and 22B differ from each other in the direction of viewing the ND filter turret 371.

The ND filter turret 371 is dispose at the rear location inside the photographic lens 101. The ND filter turret 371 includes ND filters 358, 368, 369, and 370, which are different in density. The ND filter turret 371 is formed by fitting the plurality of ND filters in a disc-shaped member axially supported on a shaft 3712 which is parallel to the axis H, and is rotatable about the shaft 3712. By rotating the ND filter turret 371 to insert a desired ND filter immediately before the image sensor 128, it is possible to adjust an amount of light entering the image sensor 128. Note that the shaft 3712 is disposed on the lower side of the axis H, and hence the ND filter turret 371 is formed as a whole such that the ND filter turret 371 protrudes toward the lower side of the photographic lens 101, and when the exterior of the photographic lens 101 is formed to cover the ND filter turret 371, the photographic lens 101 is formed with a protruding portion 357 protruding from the lens barrel portion 101a toward the bottom (−Y side).

<Description of the Heat Dissipation Duct 127>

Figure 23A:
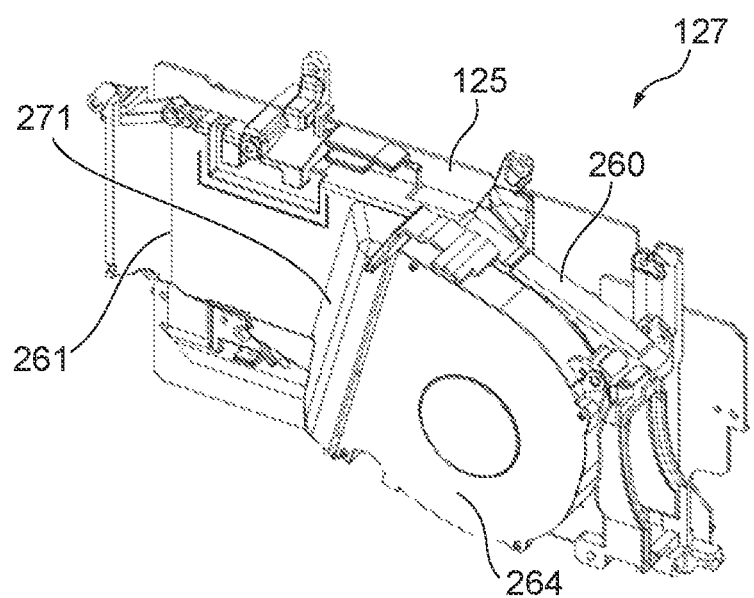
FIGS. 23A and 23B are perspective views showing the configuration of a heat dissipation duct.
Figure 23B:
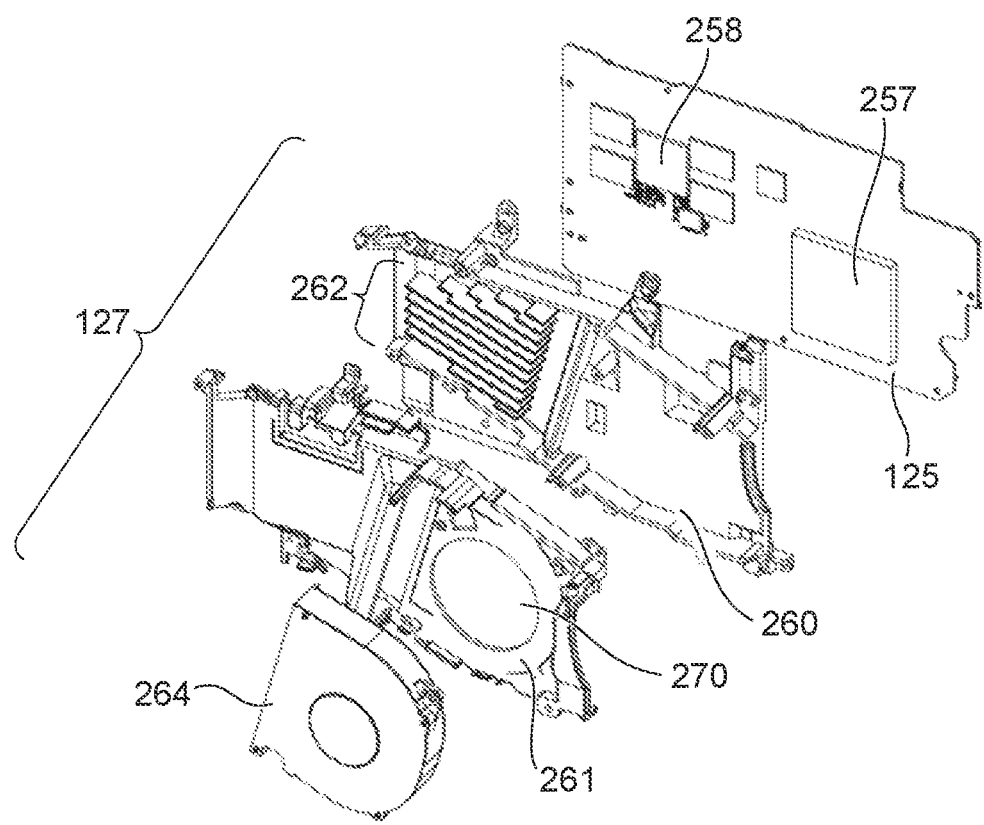

FIG. 23A is a perspective view showing the whole configuration of the heat dissipation duct 127. FIG. 23B is an exploded perspective view of the heat dissipation duct 127. The heat dissipation duct 127 includes a heat dissipation duct base 260, the rotary fan 264, and a heat dissipation duct cover 261. A metal member having a high thermal conductivity is used for the heat dissipation duct base 260, and a heat dissipation rubber (not shown) is sandwiched and held between the heat dissipation duct base 260 and the control circuit board 125 adjacent to this, in a compressed state. Note that, for the heat dissipation duct base 260, for example, a member formed by die-cast molding e.g. an aluminum alloy is used. Further, for the heat dissipation rubber, a member which can smoothly transferring heat between components without generating a large reaction force is used, and for example, a member formed by kneading e.g. metal filler into a material which is soft and high in elasticity, such as silicone rubber, is used.

To efficiently dissipate heat generated in the control circuit board 125 to the heat dissipation duct base 260, the heat generating elements 257 and 258 mounted on the control circuit board 125 are both mounted on the same surface toward the heat dissipation duct base 260. Further, the heat dissipation rubber is disposed on upper surfaces of the heat generating elements 257 and 258. This makes it possible to efficiently dissipate (disperse) heat generated in the control circuit board 125 to the heat dissipation duct base 260.

By combining the heat dissipation duct base 260 and the heat dissipation duct cover 261, a cavity close to the control circuit board 125 is formed. The heat generating element 258 is mounted on the control circuit board 125 directly under heat dissipation fins 262 of the heat dissipation duct base 260. This makes it possible to efficiently transfer heat generated in the heat generating element 258 to the heat dissipation fins 262 and efficiently discharge the heat to the outside air by forced cooling using the rotary fan 264.

Figure 24:
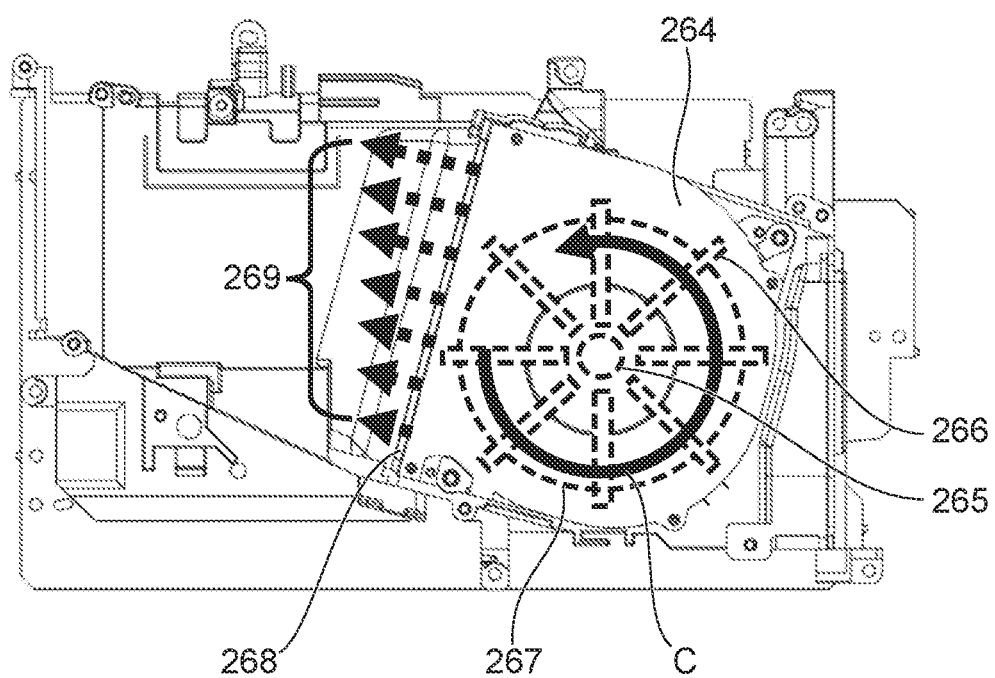
FIG. 24 is a view useful in explaining the configuration of a rotary fan and generated air flow.

FIG. 24 is a view useful in explaining the configuration of the rotary fan 264 and air flow generated by driving the rotary fan 264. The rotary fan 264 is a centrifugal fan and has an impeller 266 having a plurality of blades arranged radially around a fan rotation shaft 265. The impeller 266 is rotated about the fan ration shaft 265 by a drive force of an actuator (motor), not shown, whereby air is taken in from an air suction inlet 267 and is discharged from an exhaust wind outlet 268. The air suction inlet 267 is a substantially circular opening formed in one surface of an outer shape of the rotary fan 264, and its center is substantially coaxial with the fan rotation shaft 265. The exhaust wind outlet 268 is formed in a side wall of the rotary fan 264.

When the rotary fan 264 is driven to rotate the impeller 266, a negative pressure is generated in the center of the impeller 266, whereby surrounding air is sucked from the air suction inlet 267 into the rotary fan 264. The air taken into the rotary fan 264 is pushed out from the inside (center side) to the outside (outer peripheral side) by centrifugal force of the impeller 266 rotated in an anticlockwise direction indicated by an arrow C in FIG. 24, and is discharged from the exhaust wind outlet 268 as the exhaust wind after flowing along an inner wall of the rotary fan 264. Note that since the impeller 266 is rotated in the anticlockwise direction indicated by the arrow C, in the state shown in FIG. 24, a flow amount distribution 269 of the exhaust wind at the exhaust wind outlet 268 shows ununiform distribution in which the air flow amount is less in a lower portion of the exhaust wind outlet 268 than in an upper portion thereof.

Figure 25A:
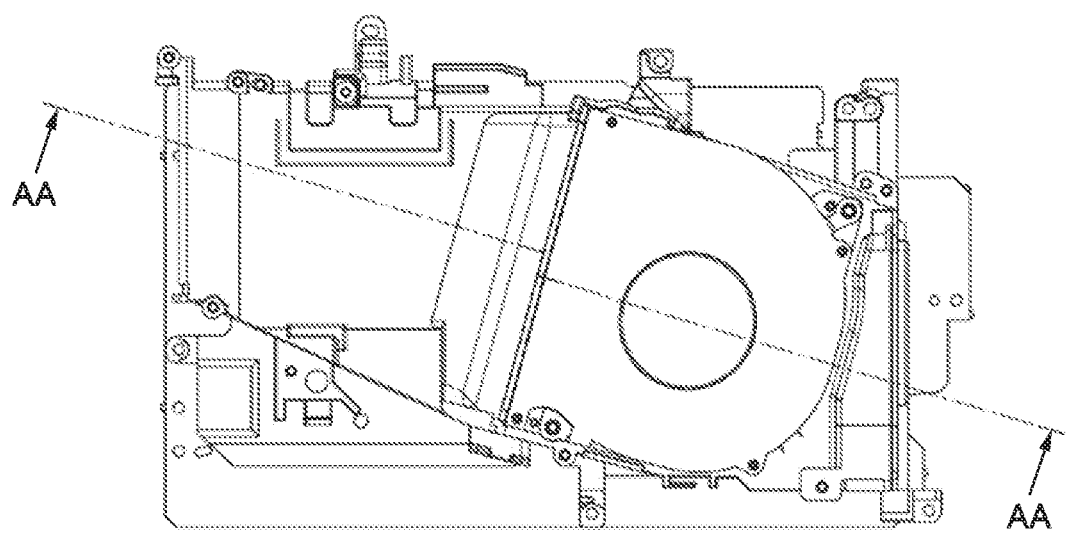
FIGS. 25A and 25B are a plan view of the heat dissipation duct and a cross-sectional view of the same taken along AA-AA, respectively.
Figure 25B:
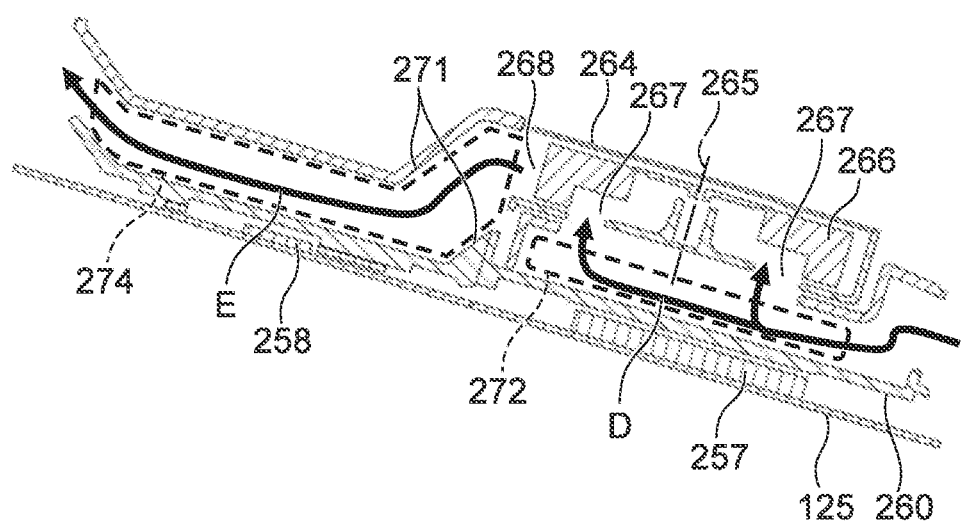

Next, flow of air within the heat dissipation duct 127 will be described. FIG. 25A is a plan view of the heat dissipation duct 127. FIG. 25B is a cross-sectional view of the heat dissipation duct 127 taken along AA-AA in FIG. 25A.

The cavity inside the heat dissipation duct 127 has a fan air suction area 272 connected to the air inlet port 110 (see FIG. 2). The fan air suction area 272 communicates with the air suction inlet 267 via a fan opening 270 (see FIG. 23B) of the heat dissipation duct cover 261 in a direction along the rotational axis of the impeller 266. Further, the fan air suction area 272 is provided at a location opposed to the heat generating element 257 via the heat dissipation duct base 260 in the direction along the rotational axis of the impeller 266. Thus, an air flow passage from the air inlet port 110 to the air suction inlet 267 of the rotary fan 264 via the fan air suction area 272 is formed so as to make air flow in a direction indicated by an arrow D (air suction direction).

The cavity inside the heat dissipation duct 127 has an exhaust duct area 274 which communicates with the exhaust wind outlet 268 of the rotary fan 264. The exhaust duct area 274 is formed from the exhaust wind outlet 268 to the air outlet port 111 (see FIG. 3) through a section formed by an inclined surface 271 inclined with respect to a surface on which the rotary fan 264 is disposed so as to make air flow in a direction indicated by an arrow E (exhaust direction). Thus, air flows within the exhaust duct area 274 in the direction indicated by the arrow E (exhaust direction).

By operating the rotary fan 264 to rotate the impeller 266, air sucked from the air inlet port 110 is discharged from the air outlet port 111 through the fan air suction area 272, the rotary fan 264, and the exhaust duct area 274. Heat generated by the heat generating elements 257 and 258 is transferred to the air flowing within the heat dissipation duct 127, whereby the heat generating elements 257 and 258 are cooled (increase of the temperature is suppressed).

Figure 26A:
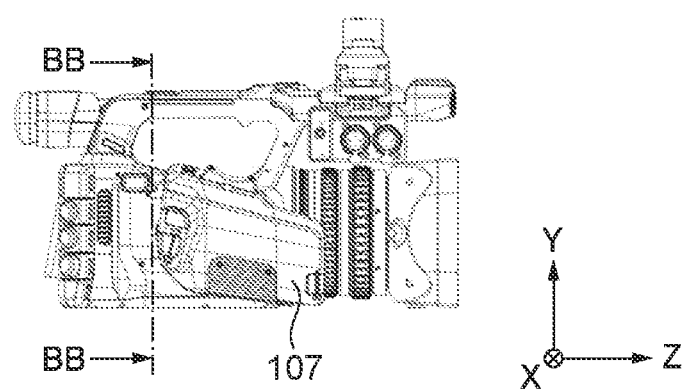
FIGS. 26A to 26C are a side view of a grip portion and cross-sectional views taken along BB-BB, respectively.
Figure 26B:
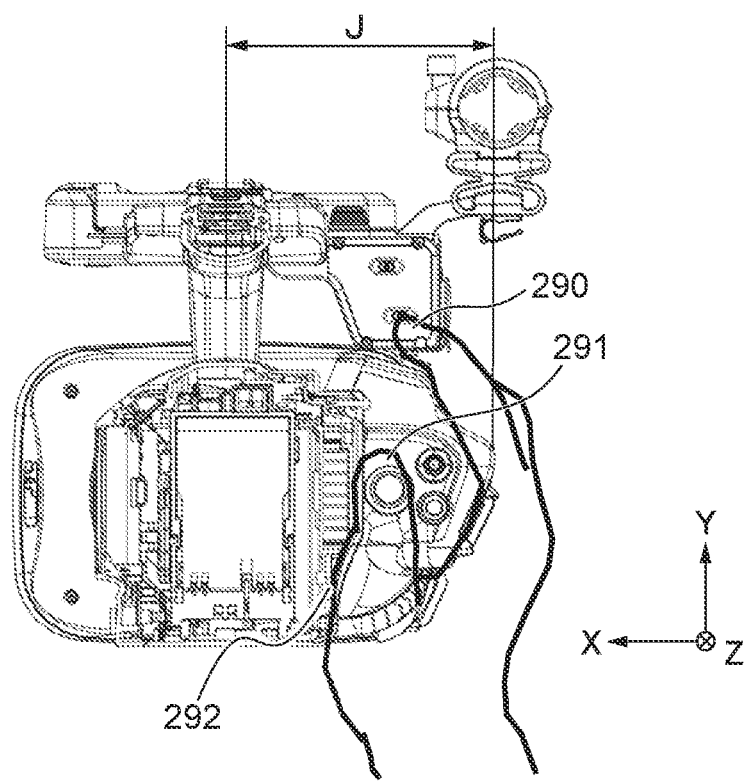
Figure 26C:
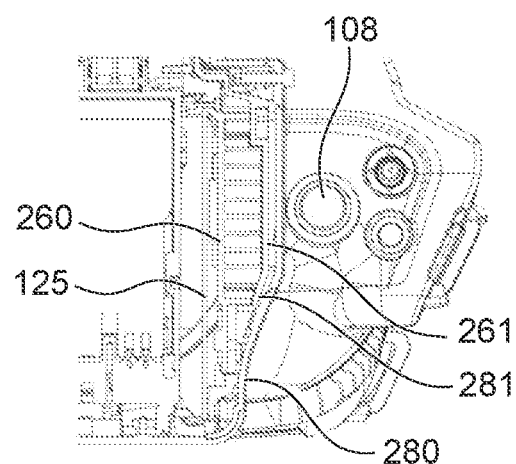

Next, a relationship between the heat dissipation duct 127 and the grip portion 107 will be described. FIG. 26A is a side view showing the grip portion 107 and components surrounding the same. FIG. 26B is a cross-sectional view taken along BB-BB in FIG. 26A, on which an image of a photographer's hand gripping the grip portion 107 is superimposed. FIG. 26C is a cross-sectional view, taken along BB-BB in FIG. 26A, of where the thumb is brought into contact and surrounding components.

When performing photographing, the photographer holds the image capturing apparatus 1000 by covering the grip portion 107 with the palm such that the photographer can operate the photographing start button 108 with the thumb 291, and the seesaw switch 400 with the forefinger 290 and the middle finger. A counterbore portion 280 recessed in the +X side is formed below the photographing start button 108 at a location rearward of the grip portion 107, and within the body 100, an inclined portion 281 is formed in the heat dissipation duct cover 261 according to the counterbore portion 280. With this, the inner cavity formed by the heat dissipation duct base 260 and the heat dissipation duct cover 261 becomes narrower toward below. However, the flow amount distribution 269 of the exhaust wind from the rotary fan 264, appearing in FIG. 24, has less flow amount in a lower portion of the inner cavity, and hence the influence of provision of the counterbore portion 280 on the heat dissipation property is small.

Further, when the grip portion 107 is gripped, the photographer can hold the image capturing apparatus 1000 by bringing a thenar 292 at the base of the thumb into contact with the counterbore portion 280, such that the body 100 is supported from below. Here, in the body 100, a distance J from the axis H to the grip portion 107 is large, and hence the force of moment expressed by "weight of the photographing optical system"×"torque at the distance J" is generated in a direction of rotating the hand holding the body 100, in the anticlockwise direction. However, the photographer can support the body 100 from below by bringing the thenar 292 into contact with the counterbore portion 280 against the force of moment, and hence the photographer is difficult to get tired even when the photographer holds the image capturing apparatus 1000 for a long time period.

<Description of the Operation Ring 102>

Figure 27:
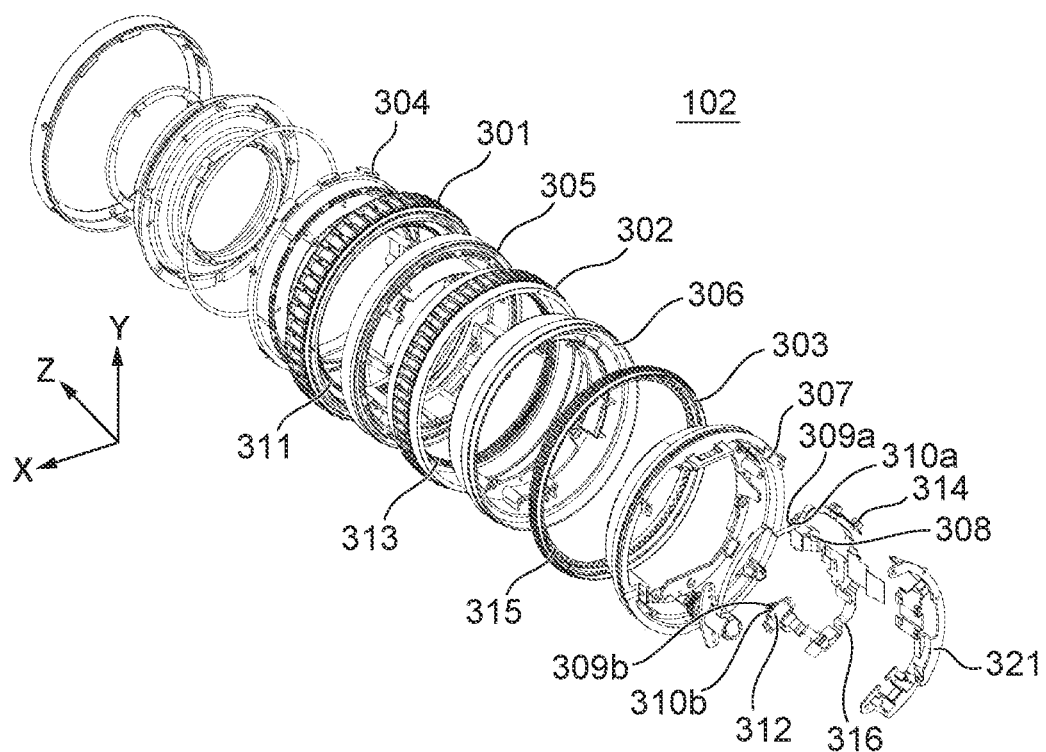
FIG. 27 is an exploded perspective view of an operation ring.

FIG. 27 is an exploded perspective view of the operation ring 102. The operation ring 102 includes a focus adjustment operation section 301, a zoom adjustment operation section 302, an aperture adjustment operation section 303, a first base member 304, a second base member 305, a third base member 306, and a fourth base member 307. Further, the operation ring 102 includes a focus rotation sensor 308, a zoom rotation sensor 312, an aperture rotation sensor 314, a flexible circuit board 316, and a holding member 321.

The focus adjustment operation section 301 is sandwiched and held between the first base member 304 and the second base member 305 such that the focus adjustment operation section 301 is rotatable about the axis H in a state inhibited from moving in the Z direction. The zoom adjustment operation section 302 is sandwiched and held between the second base member 305 and the third base member 306 such that the zoom adjustment operation section 302 is rotatable about the axis H in a state inhibited from moving in the Z direction. The aperture adjustment operation section 303 is sandwiched and held between the third base member 306 and the fourth base member 307 such that the aperture adjustment operation section 303 is rotatable about the axis H in a state inhibited from moving in the Z direction. The focus rotation sensor 308 is fixed to the first base member 304 and detects an amount of rotation of the focus adjustment operation section 301. The zoom rotation sensor 312 is fixed to the second base member 305 and detects an amount of rotation of the zoom adjustment operation section 302.

Figure 28:
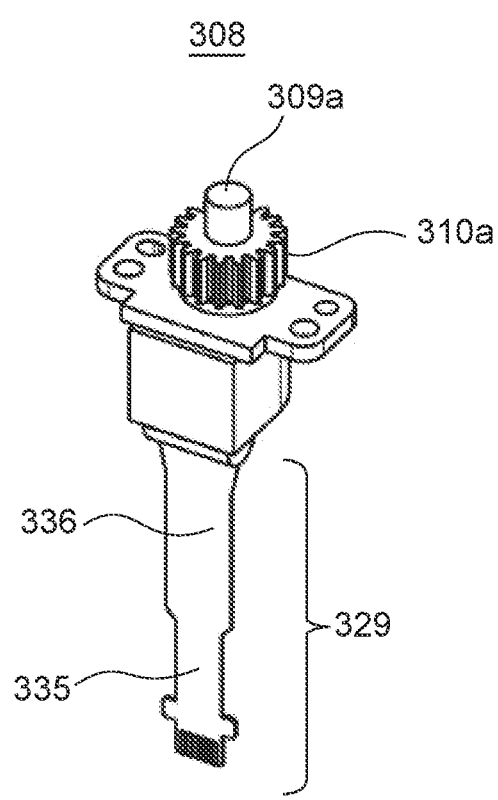
FIG. 28 is a perspective view showing the configuration of a focus rotation sensor.

Here, the focus rotation sensor 308 will be described. FIG. 28 is a perspective view showing the configuration of the focus rotation sensor 308. The focus rotation sensor 308 includes a rotating shaft 309a, and a gear 310a is mounted on the rotating shaft 309a. A flexible circuit board 329 is mounted on the focus rotation sensor 308. The flexible circuit board 329 is formed by an area 335 which is narrow in width and an area 336 which is wide in width. These areas 335 and 336 will be described hereinafter in detail.

Referring again to FIG. 27, a gear 311 is provided on an inner wall of the focus adjustment operation section 301. The gear 311 is meshed with the gear 310a mounted on the rotating shaft 309a of the focus rotation sensor 308. When the focus adjustment operation section 301 is rotated, the rotating shaft 309a is interlockingly rotated, and the focus rotation sensor 308 detects an amount of rotation of the focus adjustment operation section 301.

The zoom rotation sensor 312 has a similar structure to the focus rotation sensor 308, and the zoom adjustment operation section 302 has a similar structure to the focus adjustment operation section 301. That is, a gear 313 provided on an inner wall of the zoom adjustment operation section 302 is meshed with a gear 310b mounted on a rotating shaft 309b of the zoom rotation sensor 312. When the zoom adjustment operation section 302 is rotated, the rotating shaft 309b is interlockingly rotated, and the zoom rotation sensor 312 detects an amount of rotation of the zoom adjustment operation section 302.

The aperture rotation sensor 314 is fixed to the fourth base member 307 and detects an amount of rotation of the aperture adjustment operation section 303. The aperture rotation sensor 314 is, specifically, a photo interrupter. The aperture rotation sensor 314 measures the number of ones, which have passed the aperture rotation sensor 314, of teeth 315 each provided in a comb-tooth shape on an inner wall of the aperture adjustment operation section 303, to thereby measure an amount of rotation of the aperture adjustment operation section 303.

Figure 29:
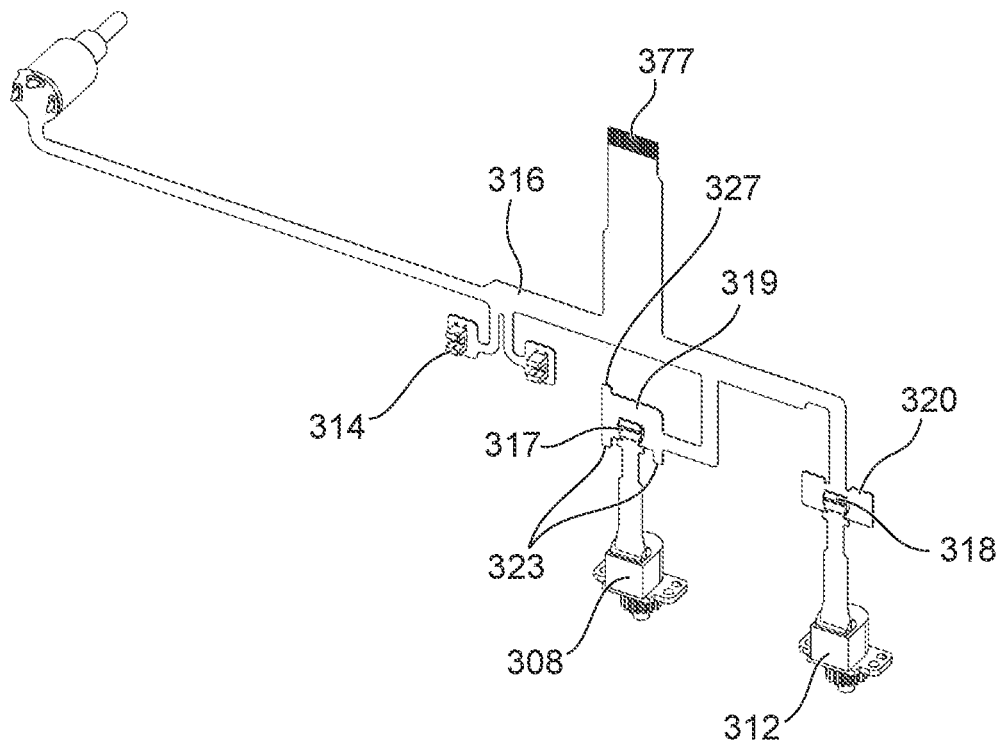
FIG. 29 is a perspective view of a flexible circuit board in a developed state.

FIG. 29 is a perspective view of the flexible circuit board 316 in a developed state. The flexible circuit board 316 is a member for transmitting signals indicative of the amounts of rotation detected by the focus rotation sensor 308, the zoom rotation sensor 312, and the aperture rotation sensor 314 to the control circuit board 125. The aperture rotation sensor 314 is directly mounted on the flexible circuit board 316. The focus rotation sensor 308 is electrically connected to a connector 317 mounted on a first mounting portion 319 of the flexible circuit board 316. The zoom rotation sensor 312 is electrically connected to a connector 318 mounted on a second mounting portion 320 of the flexible circuit board 316.

The signals indicative of the amounts of rotation measured by the focus rotation sensor 308, the zoom rotation sensor 312, and the aperture rotation sensor 314, respectively, are transmitted to the control circuit board 125 via a flexible circuit board end 377. The flexible circuit board 316 has a first engaging claw 327 and second engaging claws 323, and the first engaging claw 327 is shorter than each second engaging claw 323. The uses of the first engaging claw 327 and the second engaging claws 323 will be described hereinafter.

Figure 30:
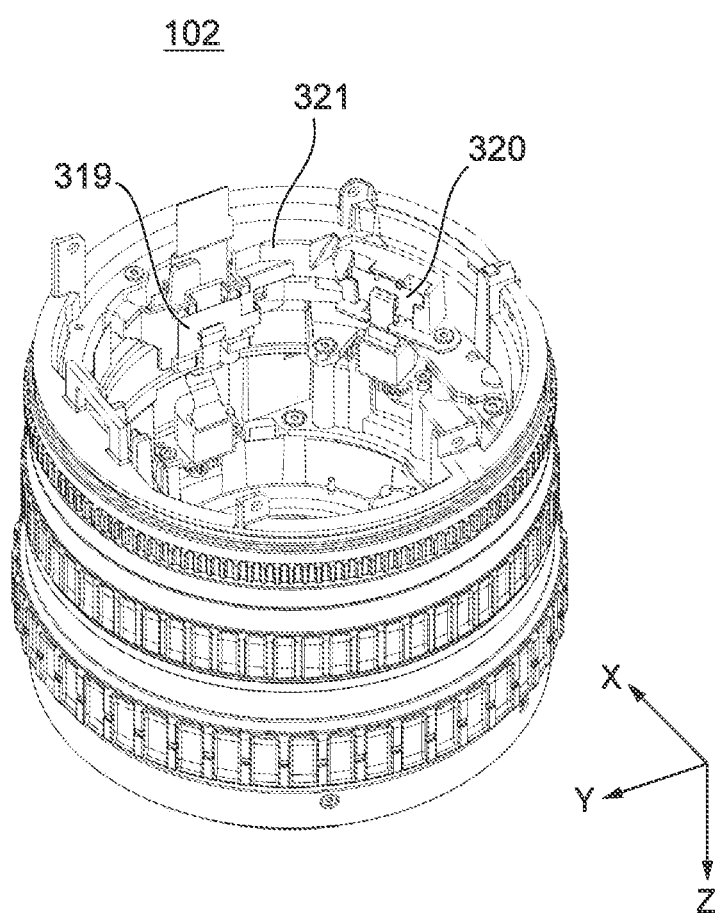
FIG. 30 is a perspective view of the operation ring.
Figure 31:
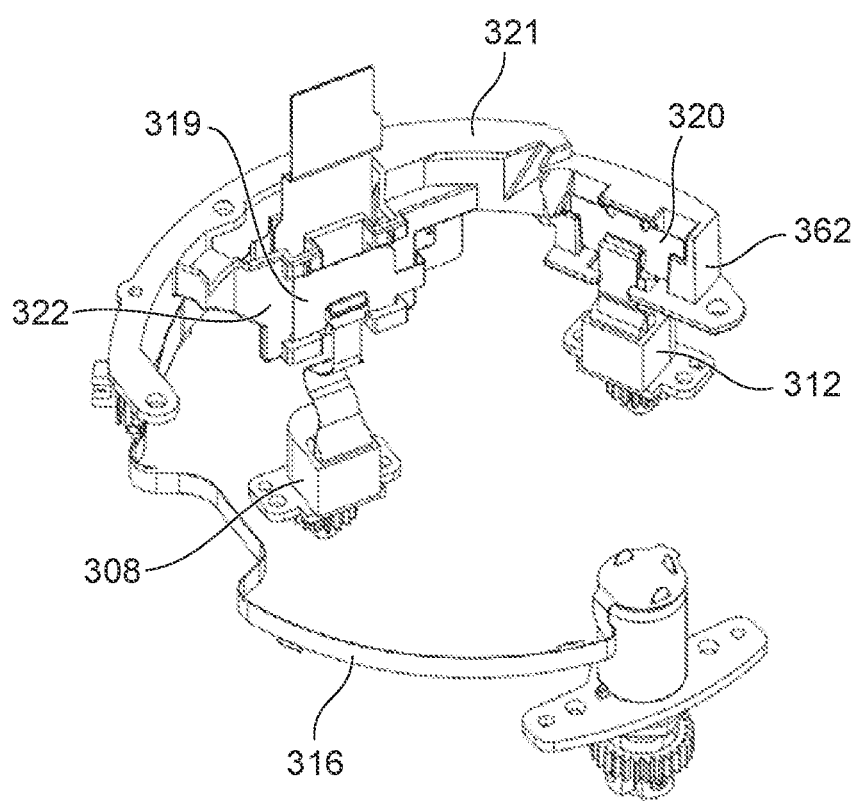
FIG. 31 is a perspective view of the flexible circuit board in a state held by a holding member.

FIG. 30 is a perspective view of the operation ring 102. The first mounting portion 319 and the second mounting portion 320 of the flexible circuit board 316 are held by the holding member 321 disposed on the rear side (−Z side) of the operation ring 102. FIG. 31 is a perspective view showing the flexible circuit board 316 in a state held by the holding member 321. The first mounting portion 319 is held by a first holding portion 322 of the holding member 321. The second mounting portion 320 is held by a second holding portion 362 of the holding member 321.

Figure 32A:
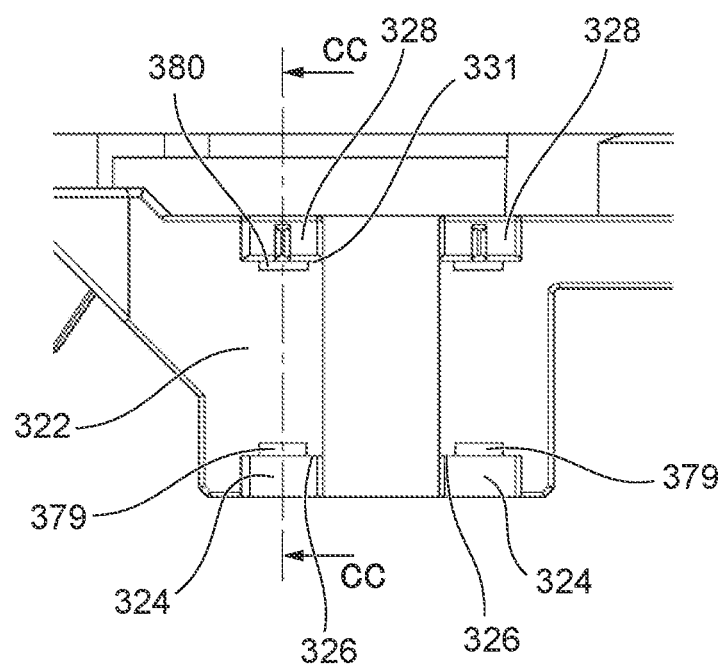
FIGS. 32A and 32B are views useful in explaining the composition of a first holding portion of the holding member.
Figure 32B:
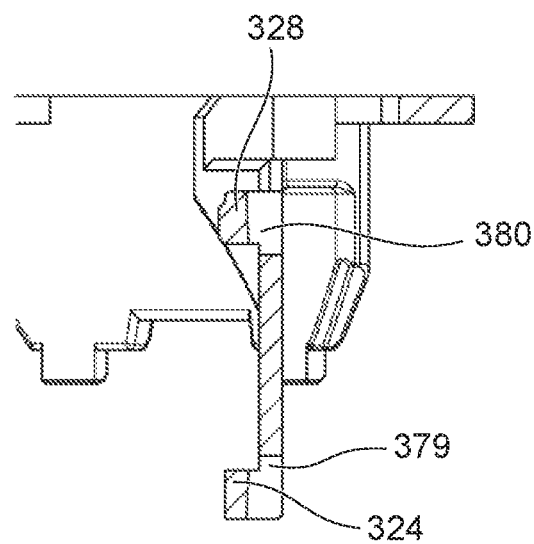

FIG. 32A is a view useful in explaining the structure of the first holding portion 322. FIG. 32B is a cross-sectional view of the first holding portion 322 taken along CC-CC in FIG. 32A. The first holding section 322 has two first engaged portions 324 and two second engaged portions 328. An upper end of each first engaged portion 324 is formed with a first abutment portion 326 and a first opening 379, and a lower end of each second engaged portion 328 is formed with a second opening 380 and a second abutment portion 331.

Figure 33A:
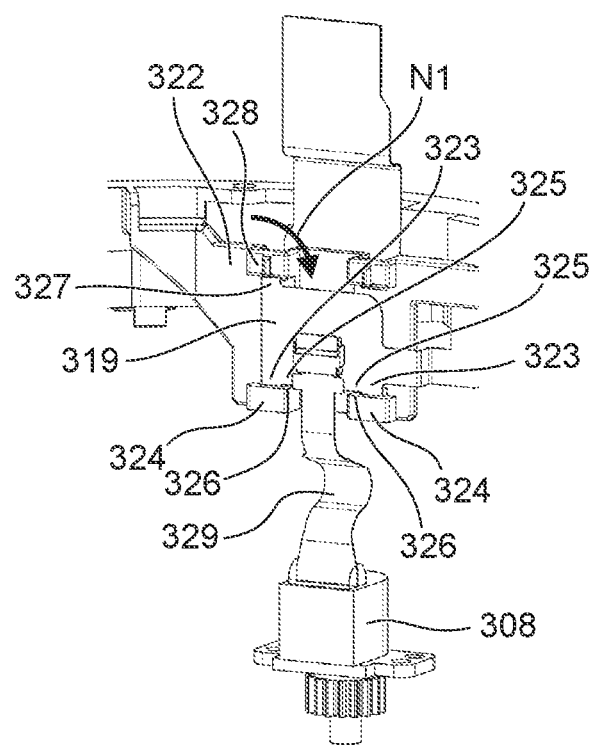
FIGS. 33A and 33B are views of a first mounting portion of the flexible circuit board, in a state being assembled into the first holding portion of the holding member, and in an assembled state, respectively.
Figure 33B:
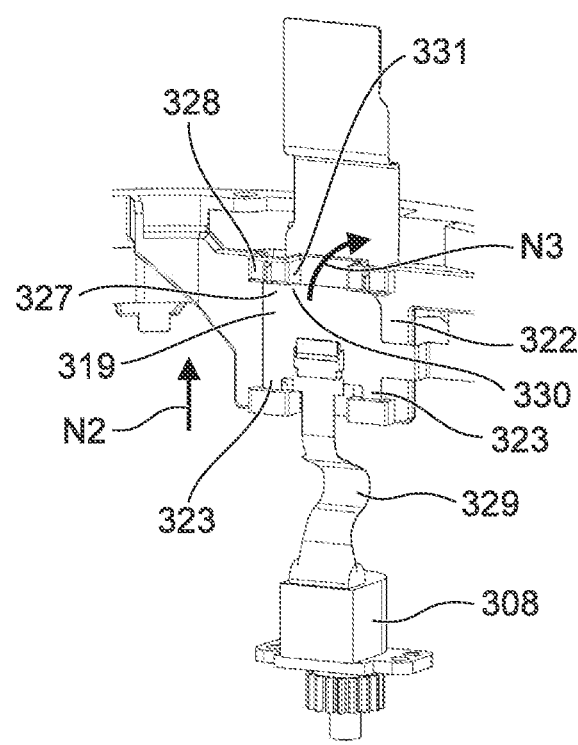

FIG. 33A is a view showing the first mounting portion 319 of the flexible circuit board 316, in a state being assembled into the first holding portion 322. FIG. 33B is a view showing the first mounting portion 319 in a state assembled into the first holding portion 322. As shown in FIG. 33A, the first mounting portion 319 is assembled into the first holding portion 322 from a direction indicated by an arrow N1, and abutting portions 325 are disposed in respective positions brought into abutment with the first abutment portions 326 while the second engaging claws 323 are being engaged with the first engaged portions 324. The first engaging claw 327 shorter than the second engaging claws 323 is in a non-engaged state with respect to the second engaged portion 328 in the state shown in FIG. 33A.

In the state shown in FIG. 33B, the first mounting portion 319 is urged in a direction indicated by an arrow N2 by the elasticity of the flexible circuit board 329 connected to the focus rotation sensor 308 fixed to the first base member 304 (see FIG. 27) in advance. And, the first engaging claw 327 is engaged with the second engaged portion 328, and an abutting portion 330 of the flexible circuit board 316 is moved to a position where the abutting portion 330 is brought into abutment with the second abutment portion 331. At this time, the second engaging claws 323 and the first engaging claw 327 are engaged at the same time, whereby the first mounting portion 319 is held by the first holding portion 322. The flexible circuit board 329 urges the first mounting portion 319 also in a direction of pressing the first mounting portion 319 against the first holding portion 322 (direction indicated by an arrow N3) and thereby stabilizes the held state of the first mounting portion 319.

Figure 34A:
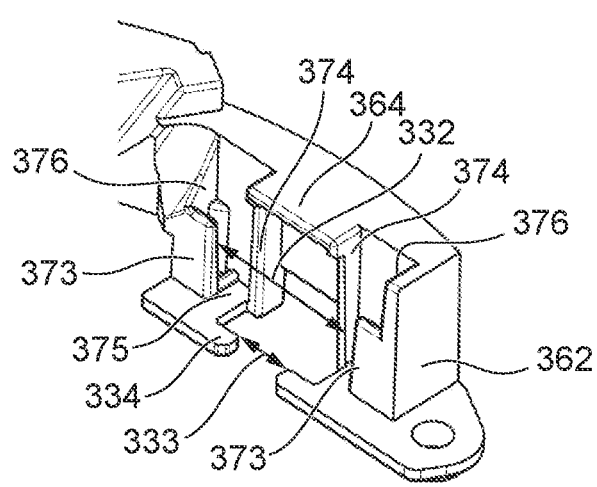
FIGS. 34A to 34C are views showing the configuration of a second holding portion of the holding member, a second mounting portion in a state being assembled into the second holding portion, and the second mounting portion in an assembled state, respectively.
Figure 34B:
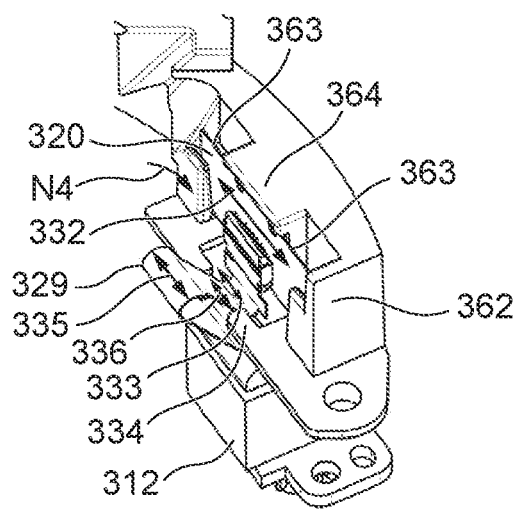
Figure 34C:
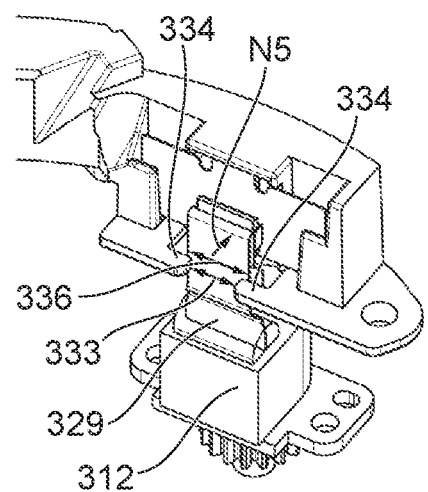

FIG. 34A is a perspective view showing the configuration of the second holding portion 362 included in the holding member 321. FIG. 34B is a view showing the second mounting portion 320 of the flexible circuit board 316, in a state being assembled into the second holding portion 362. FIG. 34C is a view showing the second mounting portion 320 in a state assembled into the second holding portion 362.

As shown in FIG. 34A, the second holding portion 362 has a substantially box shape formed by a surface direction regulating portion 373, a surface direction regulating portion 374, a bottom surface 375, and side walls 376, and the surface direction regulating portion 373 has a gap 332. The second holding portion 362 includes an engagement portion 334 having a gap 333. As shown in FIG. 34B, the second mounting portion 320 is assembled from a direction indicated by an arrow N4 and held in a state in which a mounting portion upper end 363 is brought into contact with a protruding portion 364. At this time, the flexible circuit board 329 of the zoom rotation sensor 312 fixed to the second base member 305 (see FIG. 27) in advance extends from the gap 332. Here, as described above, the flexible circuit board 329 has the area 335 which is narrow in width and the area 336 which is wide in width, and the width of the area 335 is narrower than the gap 333, and the width of the area 336 is wider than the gap 333. Therefore, after bending the flexible circuit board 329, the area 336 is engaged with and held on the engagement portion 334, and at this time, the held state of the second mounting portion 320 can be stabilized by the urging force generated by the elasticity of the flexible circuit board 329 in a direction indicated by an arrow N5. Thus, it is possible to stably hold the first mounting portion 319 and the second mounting portion 320 on the holding member 321 without using a screw.

<Description of the Handle 103>

Figure 35A:
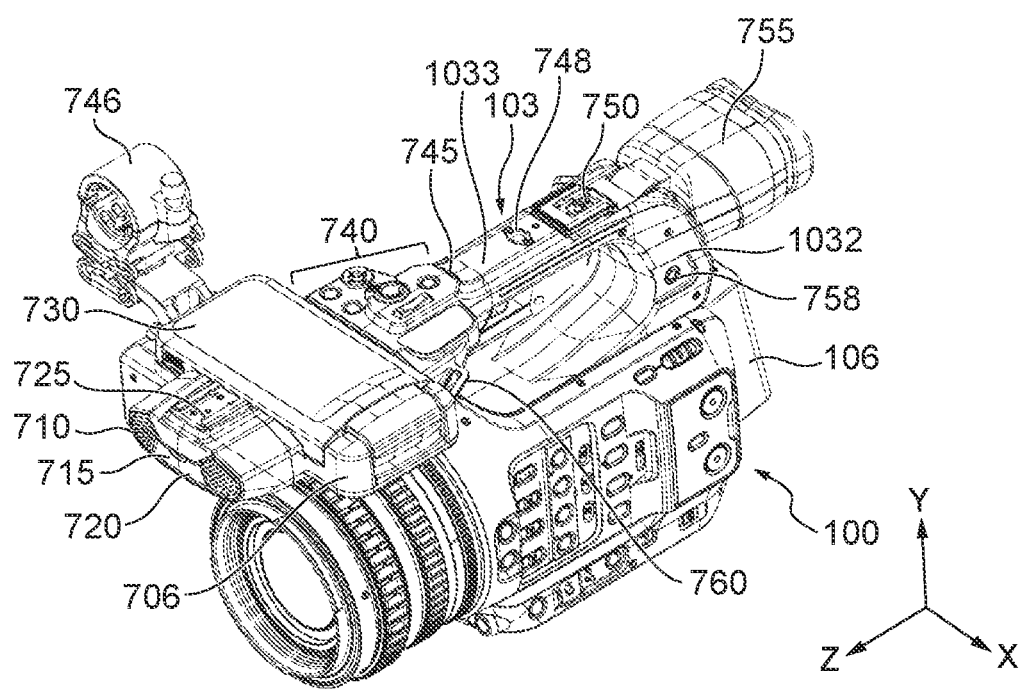
FIGS. 35A and 35B are perspective views showing the configuration of a handle.
Figure 35B:
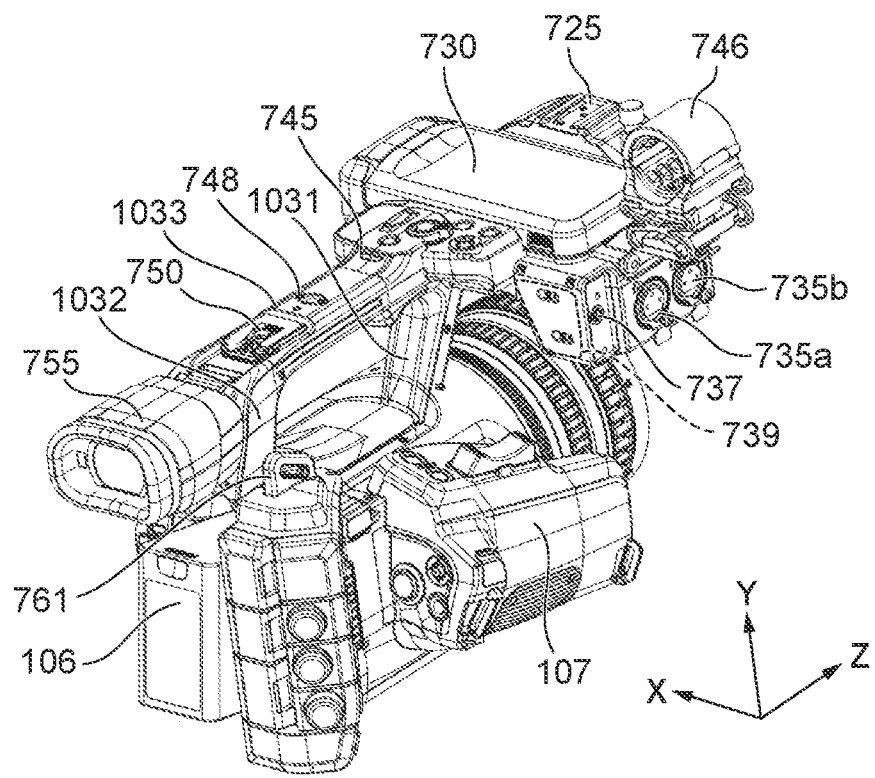
Figure 36:
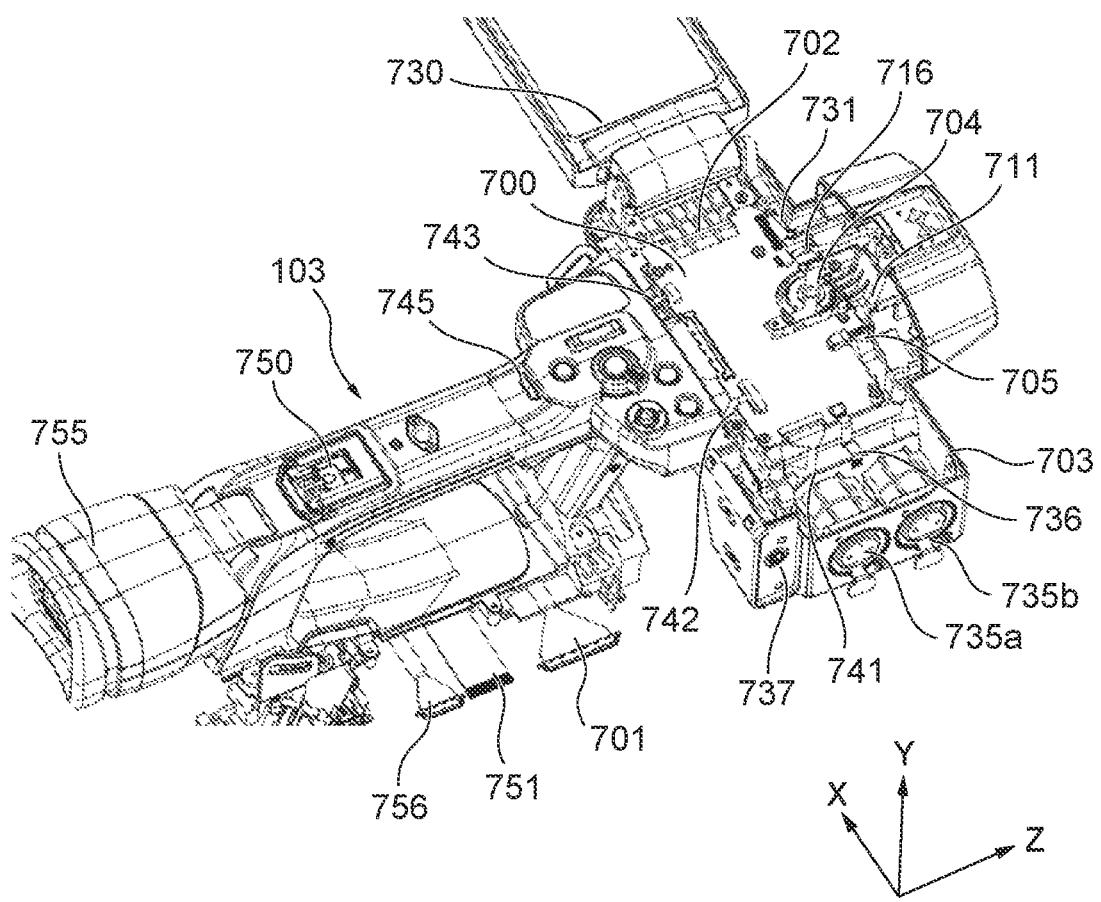
FIG. 36 is a perspective view showing the configuration of an audio circuit board.

FIGS. 35A and 35B are perspective views showing the configuration of the handle 103, and FIG. 35A and FIG. 35B differ from each other in the direction of viewing the handle 103. FIG. 36 is a perspective view showing the configuration of an audio circuit board 700. Note that FIG. 36 shows the audio circuit board 700 in a state in which an upper audio cover 706 for covering the audio circuit board 700 has been removed, with a display unit 730 (display section) being in an open state. Details of the display unit 730 will be described hereinafter.

The audio circuit board 700 is a circuit board on which is mounted a circuit for mainly performing audio processing, and is fixed to a handle frame 702 formed of a magnesium alloy. The upper audio cover 706 is an appearance cover made of resin. The handle frame 702 serves as a skeleton for maintaining the whole strength of the handle 103 and has high rigidity. The lower side of the handle frame 702 is covered with a lower audio cover 703 made of resin. The audio circuit board 700 is electrically connected to the display unit 730, XLR terminals 735a and 735b, and so forth, and is electrically connected to the control circuit board 125 (see FIG. 8) by wires 701.

A microphone cover 710 is an appearance cover for containing a microphone (not shown) therein, and portions thereof covering immediately in front of the microphone are formed with a plurality of through holes such that sound from the outside can excellently reach the microphone. Further, the microphone is electrically connected to the audio circuit board 700 by wires 711 and can record audio data of sound around the image capturing apparatus 1000. Details of how the microphone is held will be described hereinafter.

A tally light cover 715 forms an appearance cover and has an LED light 1172 (see FIG. 61) mounted therein. The tally light cover 715 is formed of a milky white plastic material which can transmit light. When the image capturing apparatus 1000 starts photographing, the tally light cover 715 is illuminated by light emitted from the LED light 1172. For example, as the LED light 1172, a light that emits red light is used. The photographer can recognize that photographing is being performed by confirming lighting of the LED light 1172. Note that the LED light 1172 is electrically connected to the audio circuit board 700 by wires 716.

An IR light cover 720 forms an appearance cover and has an infrared light 1171 (see FIG. 61) disposed therein. The IR light cover 720 is formed of e.g. a gray plastic material which can transmit infrared light. When the image capturing apparatus 1000 is set to an IR photographing mode, the infrared light 1171 is lighted to emit infrared light to an object, whereby it is possible to photograph the object even in a dark place. The infrared light 1171 is electrically connected to the audio circuit board 700 by the wires 716.

An accessory shoe 725 is a portion for mounting a variety of accessories, such as a video light for illuminating an object, and is formed of a metal material. The display unit 730 is a display device that displays a photographed image, an image being photographed, and so forth. Video signals generated by the control circuit board 125 (see FIG. 8) are delivered to the display unit 730 via the wires 701, the audio circuit board 700, and wires 731 (see FIG. 44A).

The XLR terminals 735a and 735b deliver, when an external microphone as an example of an external device is connected, audio signals from the external microphone to the control circuit board 125 (see FIG. 8) via an FFC 736, the audio circuit board 700, and the wires 701. The control circuit board 125 generates audio data by performing predetermined signal processing on the acquired audio signals and records the generated audio data. Note that an external microphone in general wide spread use is configured to have three electrical signal wires for a GND signal, an original signal (HOT), and a signal having an opposite phase from the original signal (COLD), so as to reduce audio noise. Therefore, it is general for an apparatus for business use to use an XLR type terminal for a connector for enabling connection of an external microphone.

An external microphone input terminal 737 delivers, when an external microphone as an example of an external device is connected, audio signals from the external microphone to the control circuit board 125 (see FIG. 8) via wires, not shown, the audio circuit board 700, and the wires 716. The control circuit board 125 generates audio data by performing predetermined signal processing on the acquired audio signals and records the generated audio data. The external microphone input terminal 737 has a characteristic of being compact in size compared with the XLR terminals 735a and 735b but being capable of acquiring stereo audio signals. An external microphone connected to the XLR terminals 735a and 735b or the external microphone input terminal 737 can be fixed to an external microphone holder 746.

An audio input switching switch 739 and the external microphone input terminal 737 are mounted on the same circuit board (not shown), and are electrically connected to the audio circuit board 700 by wires 741. The audio input switching switch 739 controls the input/output state of the XLR terminals 735a and 735b and the external microphone input terminal 737. Details of the audio input switching switch 739 will be described hereinafter.

An input operation section 740 is provided on the appearance surface of the upper side of the handle grasping portion 1033. The input operation section 740 includes a recording button for instructing start/stop of recording, and a zoom button for instructing a zooming operation when photographing is performed. Further, the input operation section 740 is provided at a location where the photographer can operate the input operation section 740 with the thumb, while holding the handle grasping portion 1033. Therefore, even in low-angle photographing or the like, the photographer can easily operate the input operation section 740 with the single hand, in a state holding the image capturing apparatus 1000.

A tally light cover 745 forms an appearance cover, and has an LED light (not shown) disposed therein. The tally light cover 745 is formed of a milky white plastic material which can transmit light. When the image capturing apparatus 1000 starts photographing, the tally light cover 745 is illuminated by light emitted from the LED light. For example, as the LED light, a light that emits red light is used. The photographer can recognize that photographing is being performed by confirming lighting of the LED light. Note that the input operation section 740 and the LED light are mounted on the same circuit board (not shown) and are electrically connected to the audio circuit board 700 by wires 742.

An accessory attachment portion 748 is a metal member used for mounting an external accessory, such as an external display. On an accessory shoe 750, a variety of accessories having a GPS unit and an XLR terminal can be mounted. The accessory shoe 750 is provided with an electrical contact portion (not shown) for an accessory and is electrically connected to the control circuit board 125 (see FIG. 8) via an FFC 751.

The electronic viewfinder 755 is a display device for confirming the display of a photographed image and an image being photographed. The electronic viewfinder 755 incorporates an image display device (not shown), and video signals are delivered from the control circuit board 125 (see FIG. 8) to the electronic viewfinder 755 via wires 756. Note that details of the electronic viewfinder 755 will be described hereinafter.

A headphone terminal 758 for connecting a headphone or an earphone is provided on the right side (+X side) of the handle rear leg portion 1032. The headphone terminal 758 is electrically connected to the audio circuit board 700 by wires 743. Details of how the headphone terminal 758 is disposed will be described hereinafter.

A shoulder strap-attaching portion 760 is provided in the vicinity of a front end portion of a right side (+X side) of the handle grasping portion 1033, and a shoulder strap-attaching portion 761 is provided on a left side (−X side) of the handle rear leg portion 1032. Opposite ends of a shoulder strap (not shown) can be attached to the shoulder strap-attaching portion 760 and the shoulder strap-attaching portion 761, respectively. The photographer can reduce a load applied when carrying the image capturing apparatus 1000, by carrying the image capturing apparatus 1000 with the attached shoulder strap being slung on the shoulder.

As shown in FIG. 36, a speaker module 704 is provided on the handle frame 702 so as to output sound downward, and sound can be output to the outside of the image capturing apparatus 1000 through a plurality of through holes (not shown) of the lower audio cover 703. The speaker module 704 is electrically connected to the audio circuit board 700 by wires 705.

Figure 37A:
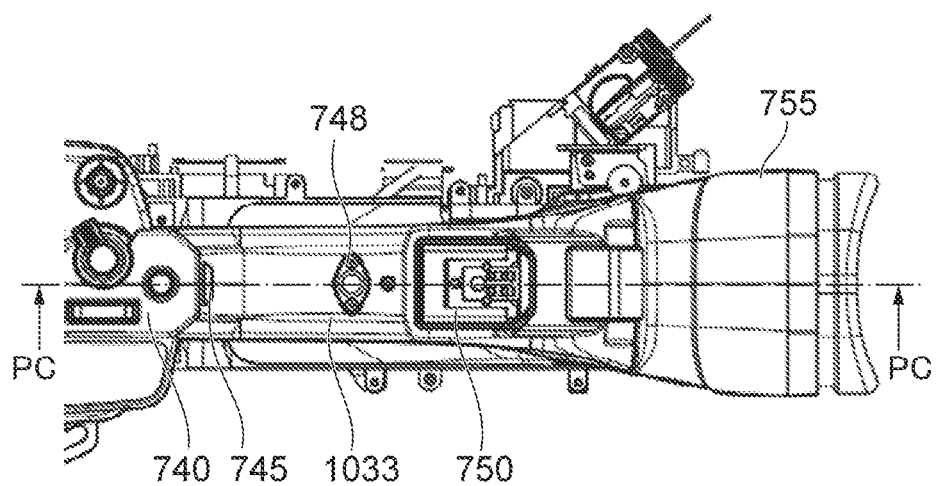
FIGS. 37A and 37B are a top view of the handle and a cross-sectional view of the same taken along PC-PC, respectively.
Figure 37B:
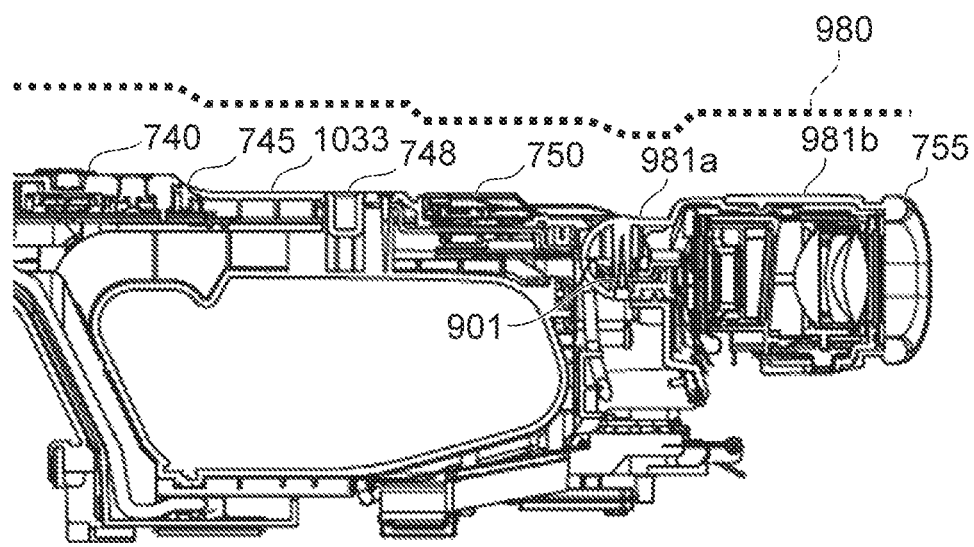

FIG. 37A is a top view of the handle 103 showing a configuration thereof from the input operation section 740 to the electronic viewfinder 755. FIG. 37B is a cross-sectional view of the handle 103 taken along PC-PC in FIG. 37A. Note that a broken line 980 indicated in FIG. 37B represents changes in the level of the handle upper surface in FIG. 37B.

The description is given in order starting with the front side (left side, as viewed in FIGS. 37A and 37B). First, the input operation section 740 is disposed at a location higher than the handle grasping portion 1033 to ensure the operability. Next, the tally light cover 745 is disposed on a slope connecting between the input operation section 740 and the handle grasping portion 1033 to ensure the visibility from the side, the top side, and the rear side. Further, the accessory attachment portion 748 is disposed on the topmost stage of the handle grasping portion 1033 to enable a mounting portion of a large accessory, such as an external display, to be freely fixed thereto. Then, the accessory shoe 750 is disposed on the rearmost of the handle grasping portion 1033 so as to enable an accessory to be mounted thereon from the rear side. Here, the height of the accessory shoe 750 is designed to be lower than the height of the handle grasping portion 1033 so as to prevent a photographer from touching the accessory shoe 750 when holding the handle 103. Next, a hinge cover portion 981a of the electronic viewfinder 755 is disposed at a location lower than the accessory shoe 750 so as not to interfere with mounting/removal of an accessory. Further, an eyepiece cover portion 981b is disposed at a location higher than the accessory shoe 750 so as not to interfere with mounting/removal of the battery 106 (see FIGS. 35A and 35B) under the electronic viewfinder 755. By changing the heights of the components of the handle 103 as shown by the broken line 980, it is possible to ensure the good operability without increasing the size of the handle 103.

<Description of the Headphone Terminal 758>

Figure 38:
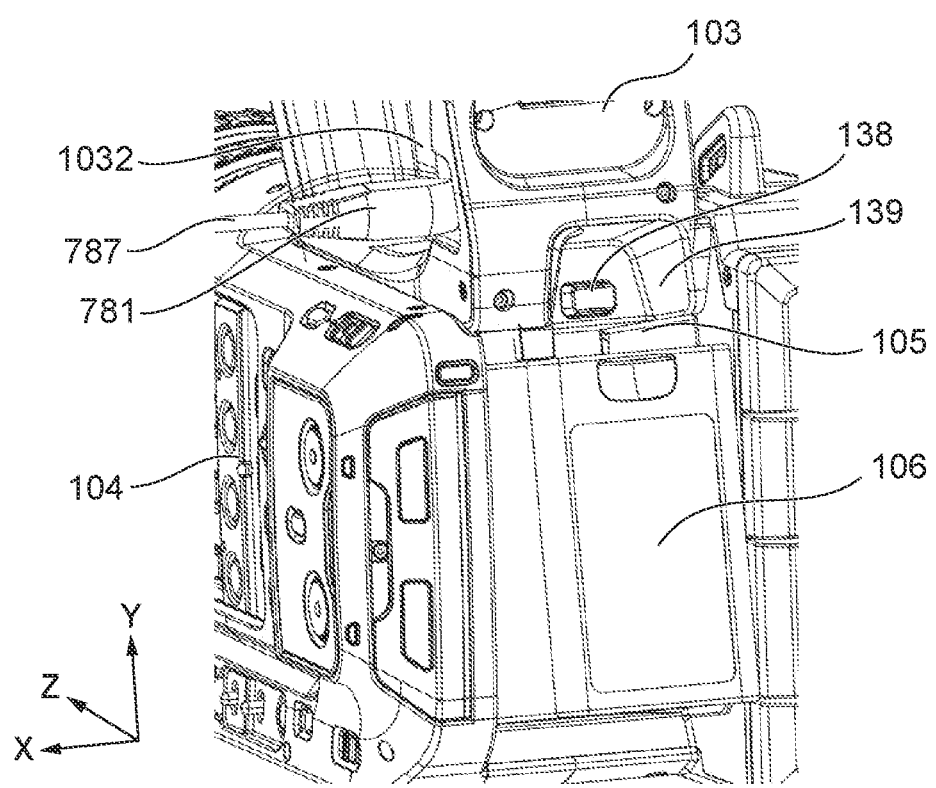
FIG. 38 is a perspective view of a headphone plug in a state inserted into a headphone terminal.

FIG. 38 is a perspective view showing a headphone plug 781 of a headphone or an earphone, in a state inserted into the headphone terminal 758. The image capturing apparatus 1000 is designed, assuming that a photographer uses the image capturing apparatus 1000 by gripping the grip portion 107 or the handle 103 with the right hand, i.e. the image capturing apparatus 1000 is used on the right side of the photographer. For this reason, the headphone terminal 758 is disposed on a side of the handle rear leg portion 1032 toward the operation system arrangement section 104, so as to connect headphone wires 787 and the photographer by the shortest distance and so as not to interfere with holding the handle 103 or operating keys of the operation system arrangement section 104. Further, the headphone terminal 758 is disposed so as to enable the photographer to insert/remove the headphone plug 781 in the X direction.

Figure 39:
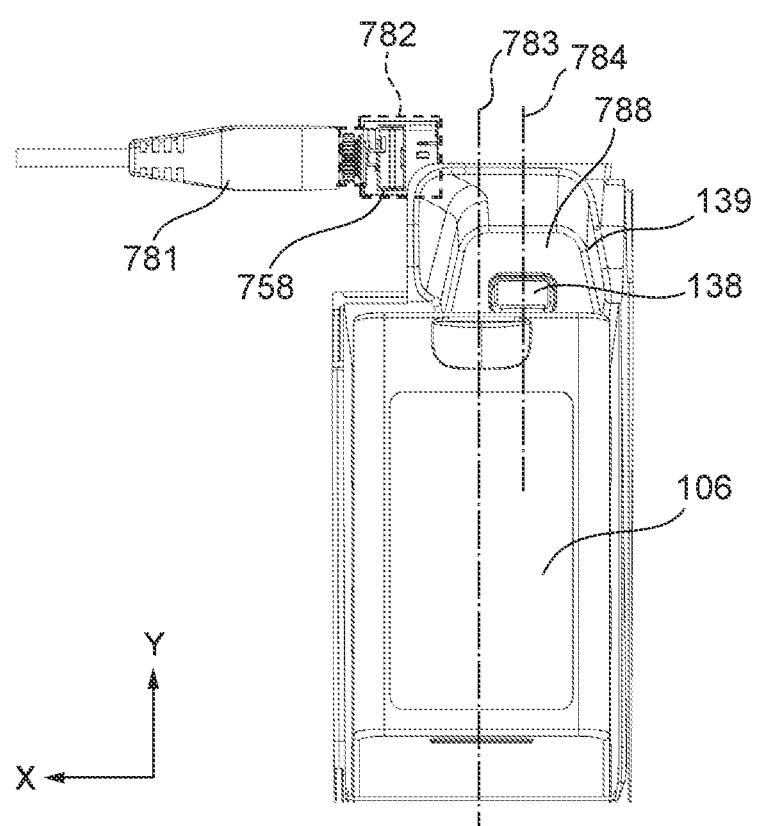
FIG. 39 is a rear view showing a positional relationship between the headphone terminal and a recess of the battery chamber.

On the other hand, the recess 139 of the battery chamber 105 is disposed in the handle rear leg portion 1032 for the above-mentioned purpose of size reduction, and the headphone terminal 758 and the recess 139 are in a positional relationship in which they are arranged substantially in parallel to each other in the X direction. FIG. 39 is a rear view showing the positional relationship between the headphone terminal 758 and the recess 139 of the battery chamber 105 in a simplified manner.

The recess 139 has a shape which is wider toward its opening (in the −Z direction) so as to make it easy to insert a photographer's finger when mounting/removing the battery 106. The recess 139 overlaps broken lines 782 representing an outer shape of a shadow of the headphone terminal 758 projected in an optical axis direction (as viewed from a direction parallel to the axis H). Therefore, it is desirable to provide the recess 139 such that the space where the photographer's finger is inserted is made as large as possible while avoiding the headphone terminal 758. From this point of view, a one-dot-chain line 784 indicating the center of a bottom surface 788 of the recess 139 and the lock knob 138 in the X direction is positioned by being offset in the −X direction from a one-dot-chain line 783 indicating the center of the battery 106 in the X direction.

Figure 40:
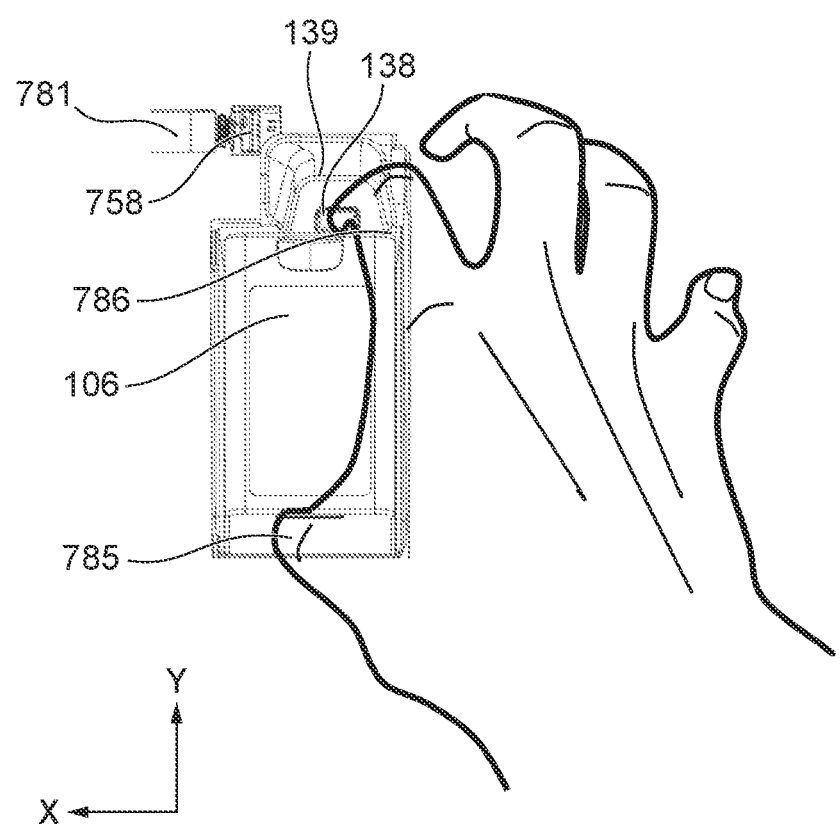
FIG. 40 is a schematic view showing how the battery is mounted/removed by a right hand.

FIG. 40 is a schematic view showing how the photographer mounts/removes the battery 106 by the right hand. When the photographer naturally extends the right arm to mount/remove the battery 106 with the right hand, the forefinger 786 that pushes the lock knob 138 is in a position shifted toward the −X side with respect to the thumb 785 that holds the battery 106 from the bottom. Further, as shown in FIG. 39, the one-dot-chain line 784 indicating the center of the bottom surface 788 of the recess 139 and the lock knob 138 in the X direction is in a position shifted toward the −X side with respect to the one-dot-chain line 783 indicating the center of the battery 106 in the X direction. Therefore, the photographer can easily mount/remove the battery 106.

By arranging the headphone terminal 758 and the recess 139 of the battery chamber 105 in the above-described positional relationship, it is possible to achieve both of size reduction and improvement of the operability of the image capturing apparatus 1000.

<Description of the Display Unit 730 and Components in its Vicinity>

Figure 41A:
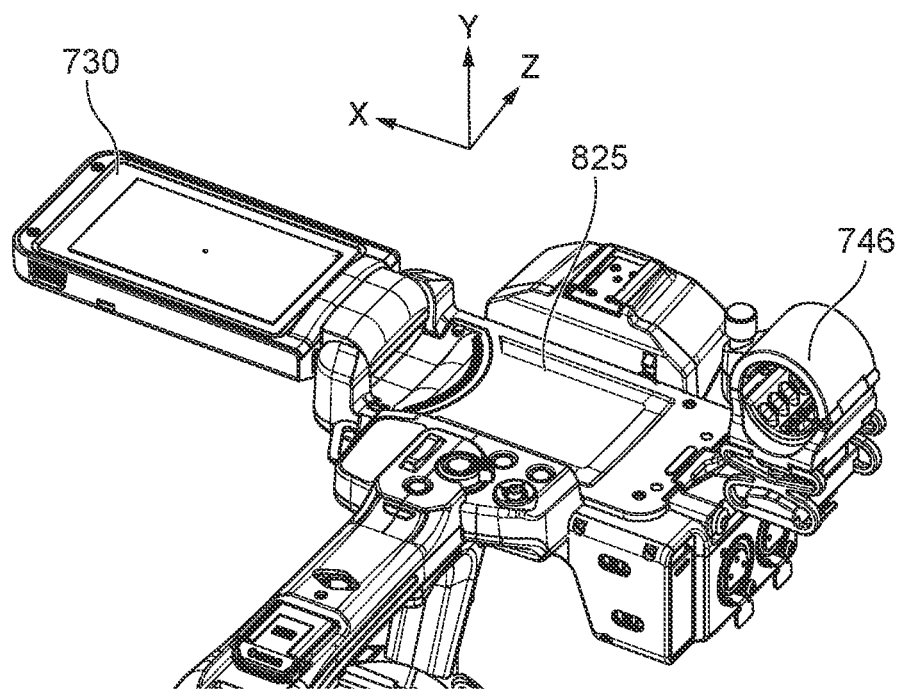
FIGS. 41A and 41B are a perspective view showing a front portion of the handle in a state in which a display unit is opened and a view useful in explaining how to attach an external microphone holder, respectively.

FIG. 41A is a perspective view showing a front portion of the handle 103 in a state in which the display unit 730 is opened. The rotatable display unit 730, a panel receiving section 825 for receiving the display unit 730, the external microphone holder 746 that is removably mounted, and so forth are arranged in front of the handle 103.

Figure 41B:
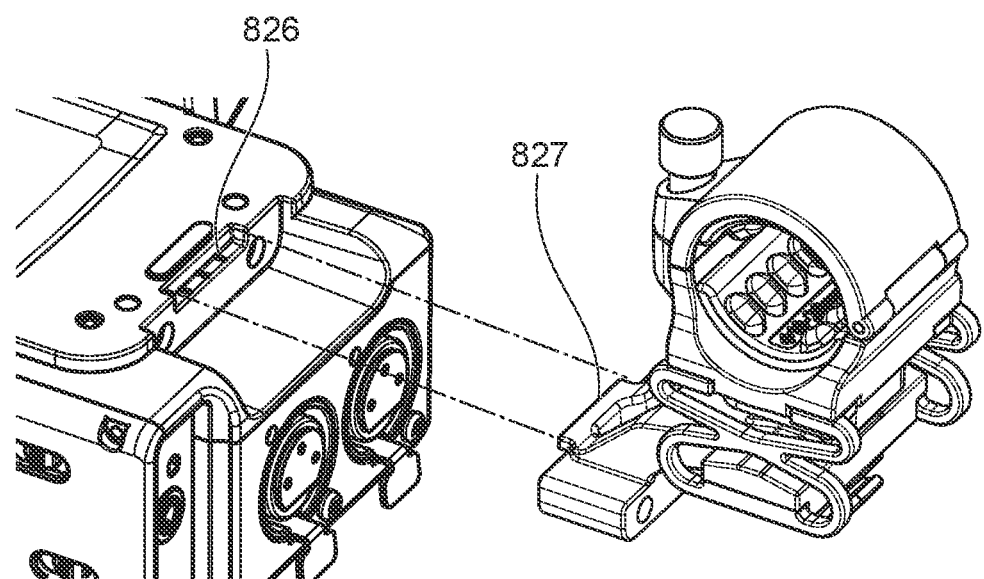

FIG. 41B is a view useful in explaining how to attach the external microphone holder 746 to the panel receiving section 825. The external microphone holder 746 is attachable/detachable to and from a positioning portion 826 provided in the panel receiving section 825, and its fixed position is determined by causing a microphone holder-positioning portion 827 to be fitted in the positioning portion 826.

Figure 42A:
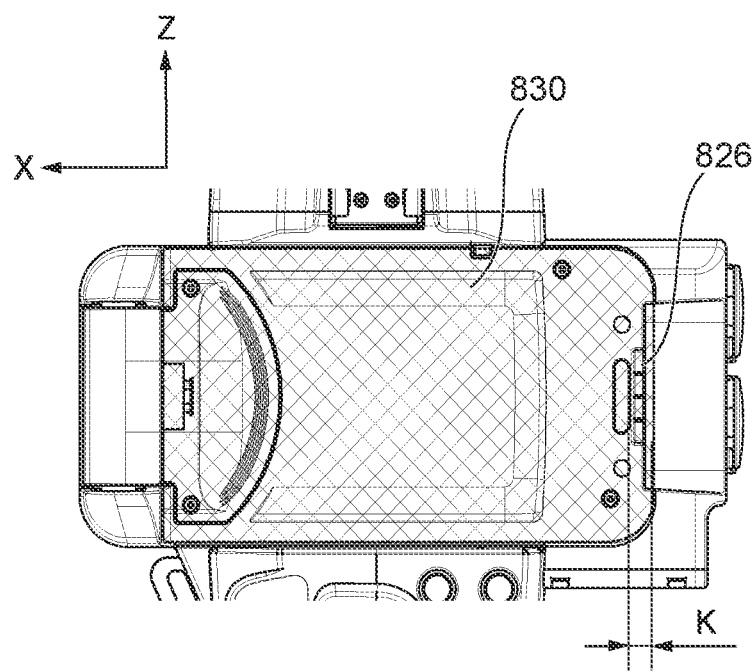
FIGS. 42A and 42B are a top view and a perspective view useful in explaining a position of a positioning portion to which the external microphone holder is attached, respectively.
Figure 42B:
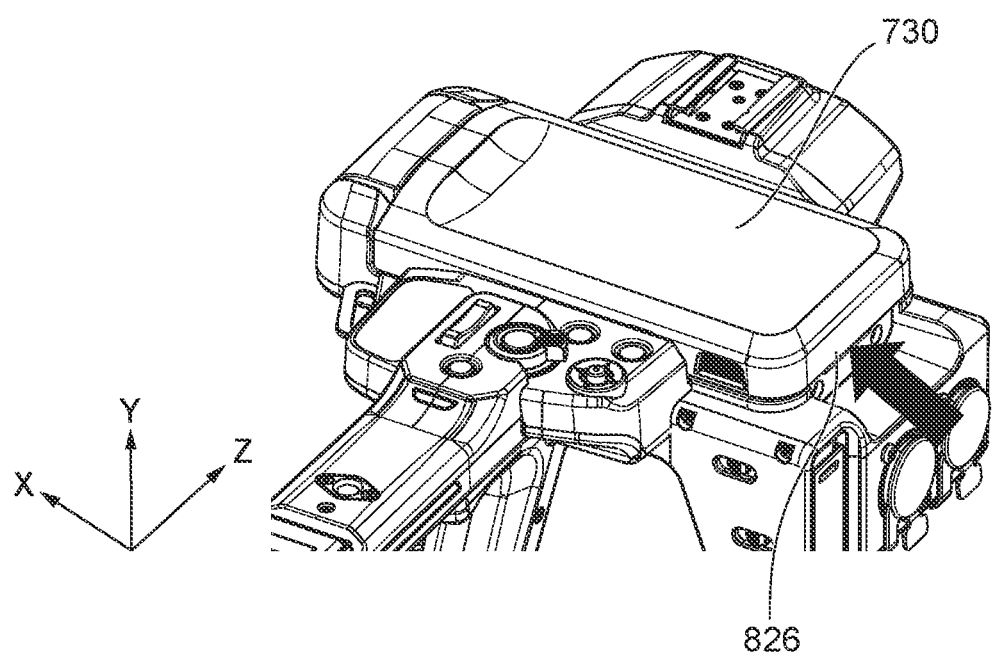

FIG. 42A is a top view useful in explaining the position of the positioning portion 826 to which the external microphone holder 746 is attached. FIG. 42B is a perspective view useful in explaining the positional relationship between the display unit 730 and the positioning portion 826. In FIG. 42A, the display unit 730 and the external microphone holder 746 are omitted from illustration.

A shaded portion 830 appearing in FIG. 42A is an area where a shadow of the display unit 730 is projected in the Y direction. The positioning portion 826 is provided at a location where the positioning portion 826 overlaps the shaded portion 830 in a state in which the display unit 730 is received in the panel receiving section 825. Therefore, it is possible to assemble the positioning portion 826 into the lower side (−Y side) of the display unit 730, by a length K indicated in FIG. 42A, whereby it is possible to reduce the length of the body 100 in the X direction by the length K.

Further, by assembling the external microphone holder 746 into under the display unit 730, it is possible to more reduce the size in the Y direction in a state in which the external microphone holder 746 has been attached, than when the external microphone holder 746 and the display unit 730 are arranged side by side in the X direction. Further, when the external microphone holder 746 is not attached, as indicated by an arrow in FIG. 42B, the positioning portion 826 can also function as a finger catch for opening/closing the display unit 730, and hence the good operability can be obtained.

Figure 43:
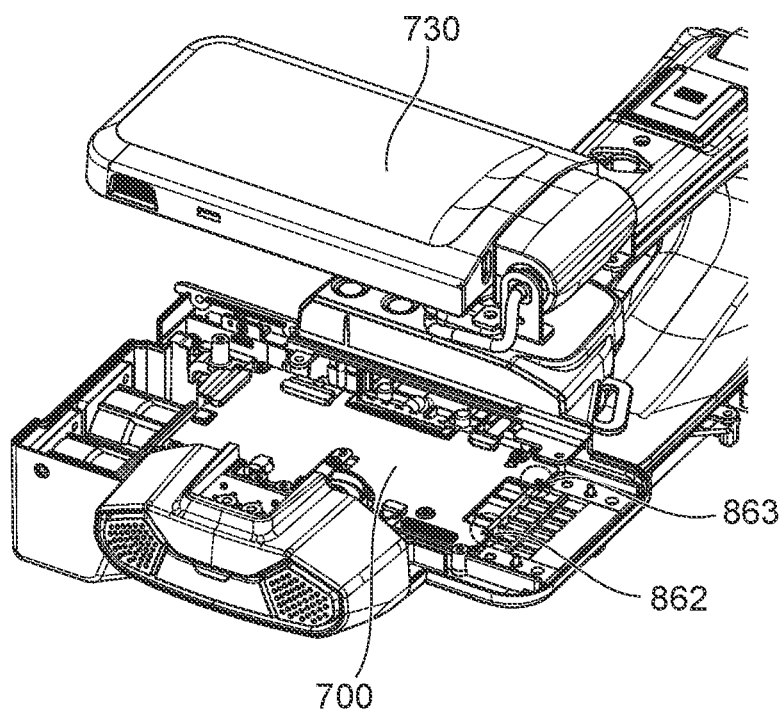
FIG. 43 is a view useful in explaining how to electrically connect the display unit to the handle.

FIG. 43 is a view useful in explaining how to electrically connect the display unit 730 to the handle 103. As described above, the audio circuit board 700 is disposed in front of the handle 103, and the display unit 730 is electrically connected to the audio circuit board 700. The audio circuit board 700 has a first magnetic sensor 862 and a second magnetic sensor 863 mounted thereon for detecting opening/closing of the display unit 730. Further, the detection strength of the first magnetic sensor 862 and that of the second magnetic sensor 863 has a relationship expressed by "the first magnetic sensor 862<the second magnetic sensor 863".

Figure 44A:
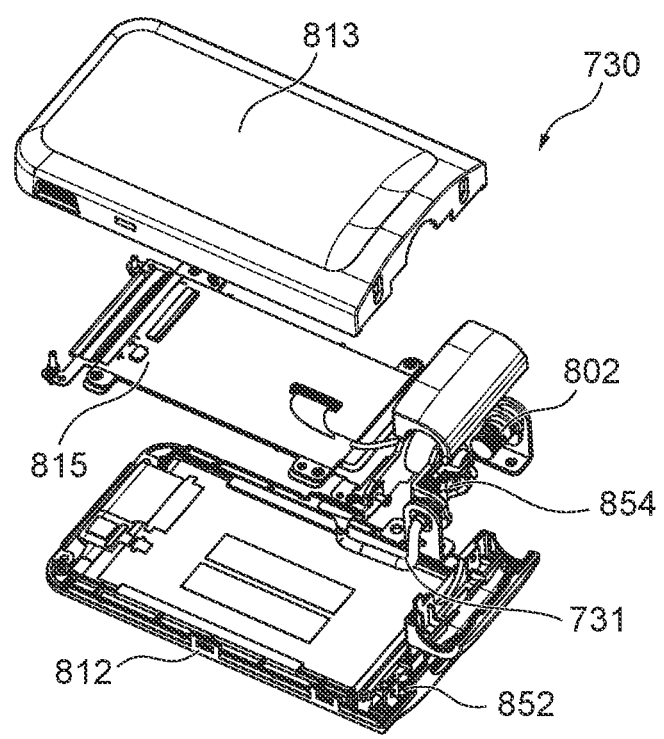
FIGS. 44A and 44B are exploded perspective views of the display unit.
Figure 44B:
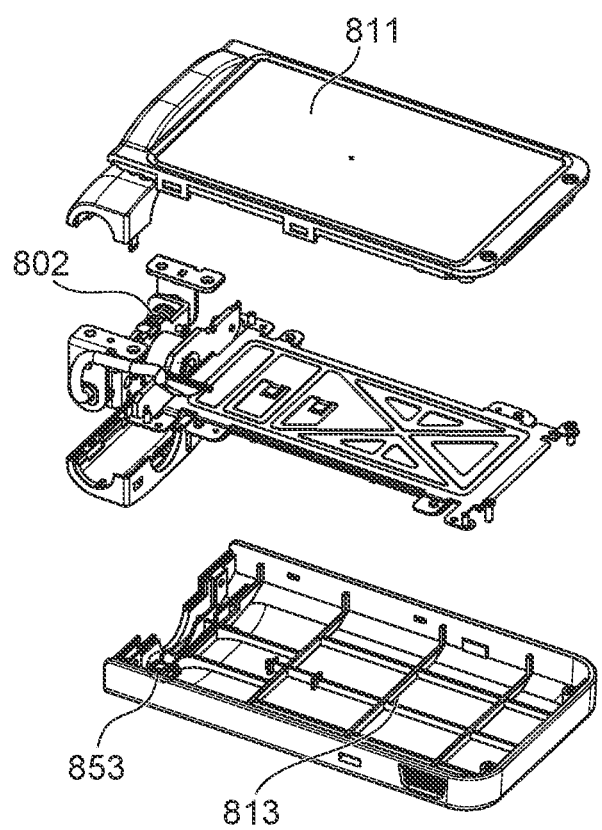

FIGS. 44A and 44B are exploded perspective views of the display unit 730. FIGS. 44A and 44B differ from each other in the direction of viewing the display unit 730. The display unit 730 includes a display panel 811 (display surface), a panel circuit board 815 that performs display control of the display panel 811, and a panel cover 812 and a panel exterior cover 813 which form a casing.

The display panel 811 is fixed to the panel cover 812 with e.g. a double-sided tape or an adhesive. Inside the panel cover 812 and the panel exterior cover 813, a first magnet 852 and a second magnet 853 for detecting a position of the display unit 730 are fixed with an adhesive. Note that the first magnet 852 is lower in magnetic flux density than the second magnet 853. The first magnetic sensor 862 and the first magnet 852, and the second magnetic sensor 863 and the second magnet 853 each function as a detection section for detecting opening/closing of the display unit 730.

The display unit 730 has a hinge portion 802, and a rotation detection switch 854 for detecting rotation of the display unit 730 is disposed on the hinge portion 802. The display unit 730 is configured such that when the rotation detection switch 854 detects rotation of the display unit 730, a display image on the display unit 730 is inversed by 180 degrees.

Figure 45:
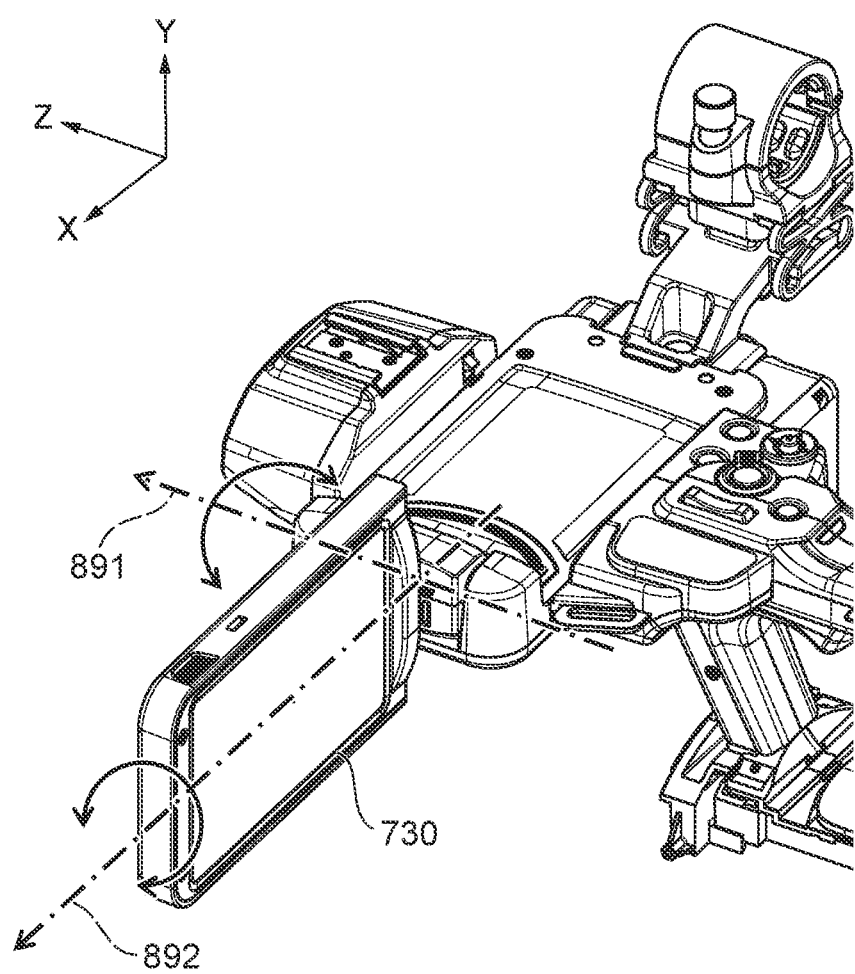
FIG. 45 is a perspective view showing an example of a rotated state of the display unit.

FIG. 45 is a perspective view showing an example of the display unit 730 in a rotated state. The display unit 730 is rotatably connected (linked) to the handle 103 via the hinge portion 802. More specifically, the display unit 730 is rotatable about a first rotational axis 891 substantially parallel to the Z direction with respect to the handle 103 via the hinge portion 802 within an angle range of approximately 180 degrees. Further, the display unit 730 is rotatable about a second rotational axis 892 orthogonal to the first rotational axis 891 via the hinge portion 802 and can direct the display panel 811 to a desired direction.

The hinge portion 802 is formed by a hollow member. Therefore, the wires 731 (see FIG. 44A) connecting between the panel circuit board 815 that is provided in the vicinity of the display panel 811 and controls the display panel 811 and the audio circuit board 700 can be routed through the hinge portion 802.

Figure 46A:
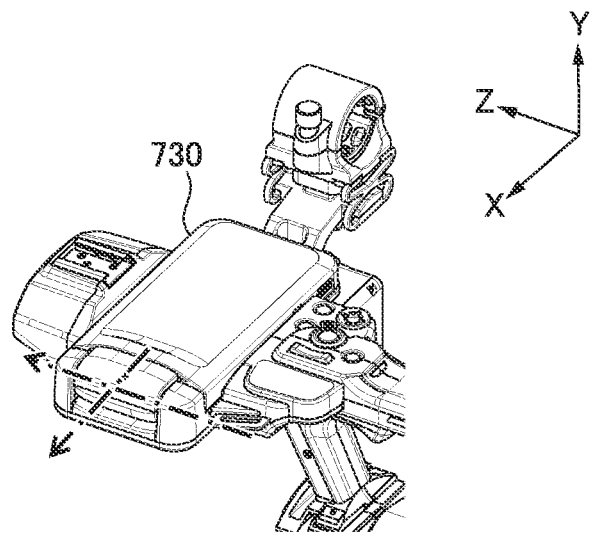
FIGS. 46A to 46D are first views showing typical states which can be assumed by the display unit.
Figure 46B:
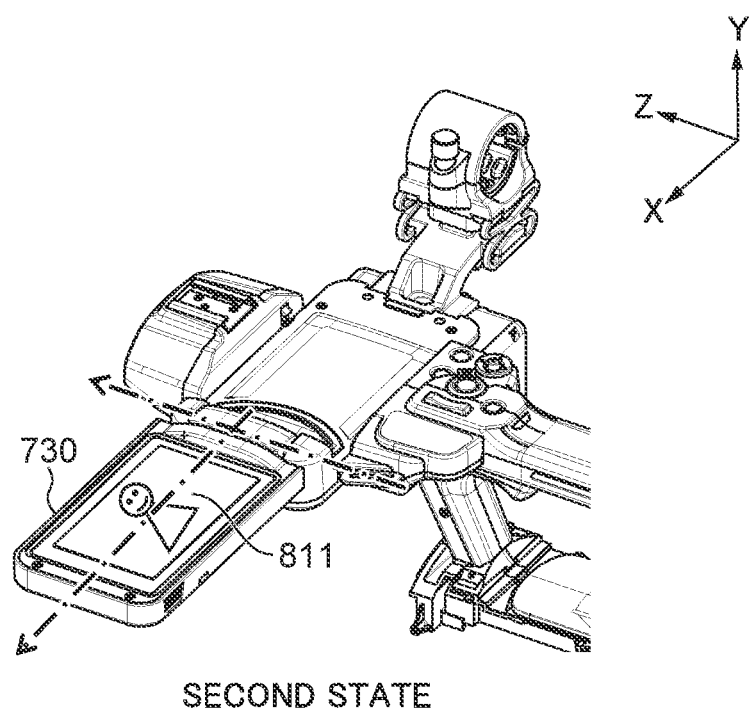
Figure 46C:
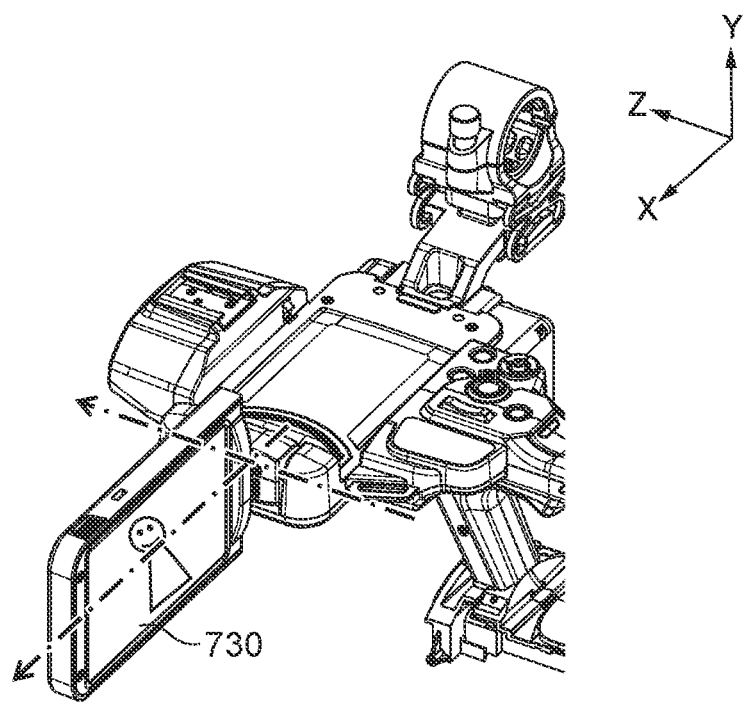
Figure 46D:
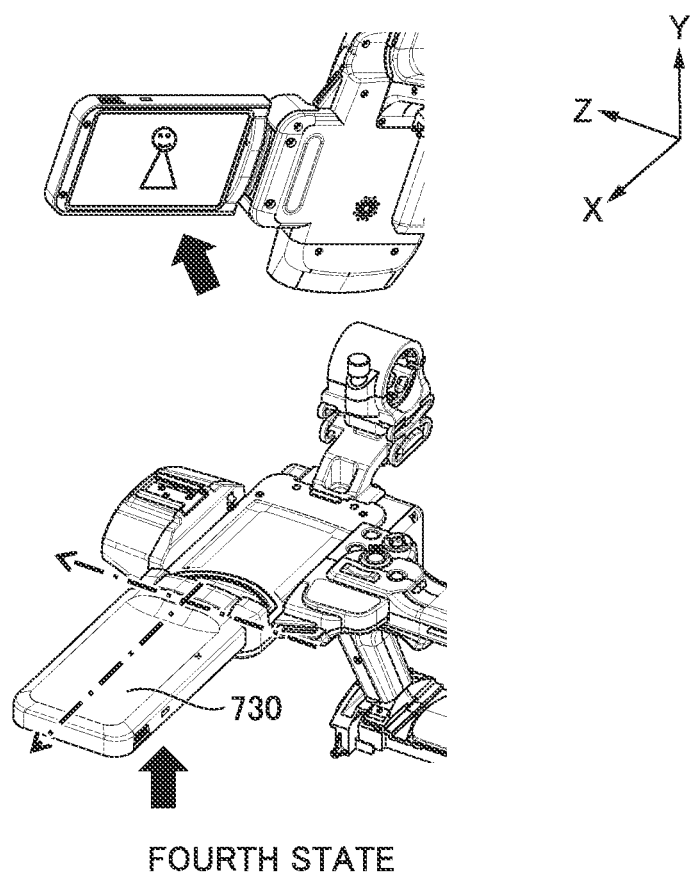
Figure 47A:
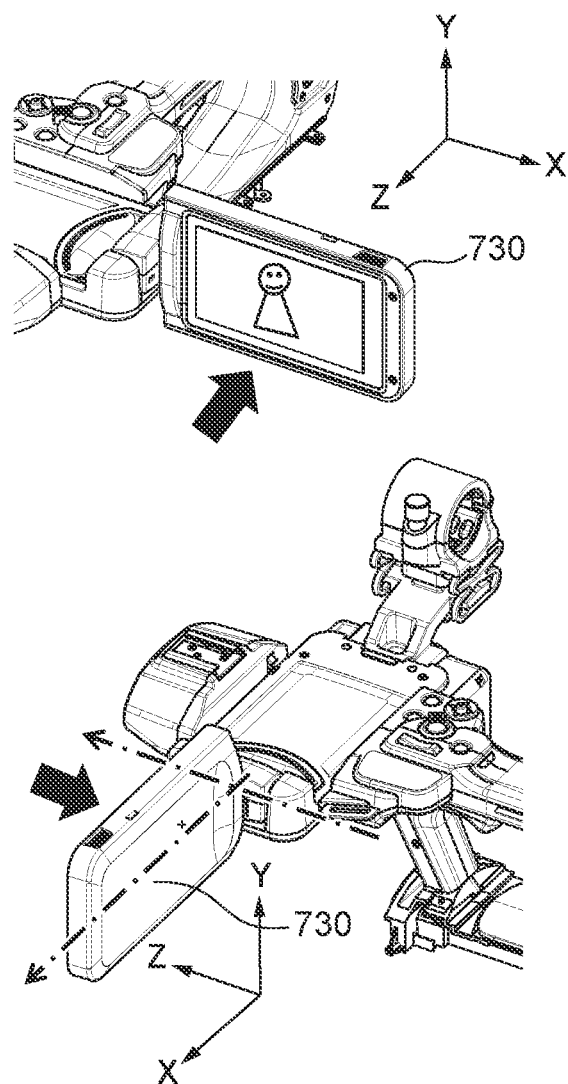
FIGS. 47A and 47B are second views showing typical states which can be assumed by the display unit.
Figure 47B:
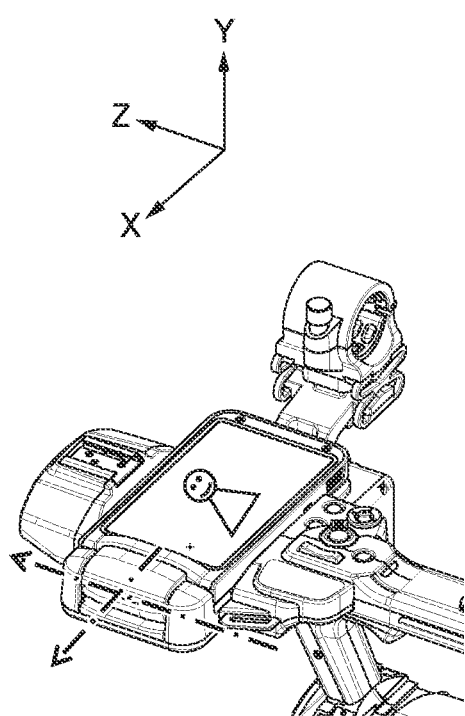

Next, typical six states which can be assumed by the display unit 730 will be described. FIG. 46A is a perspective view of the display unit 730 in a first state, in which the display unit 730 is in a normal retracted state. FIG. 46B is a perspective view of the display unit 730 in a second state, in which the display unit 730 is in an open state. FIG. 46C is a perspective view of the display unit 730 in a third state, in which the display unit 730 is in a normal use state. FIG. 46D is a perspective view of the display unit 730 in a fourth state, in which the display unit 730 is in a high-angle state. FIG. 47A is a perspective view of the display unit 730 in a fifth state, in which the display unit 730 is in a self-portrait state. FIG. 47B is a perspective view of the display unit 730 in a sixth state, in which the display unit 730 is in an inversely retracted state. The display unit 730 is configured such that the display unit 730 can be shifted between the first to sixth states.

Between these states, on/off of the display panel 811 and the direction of the display image to the photographer are switched over. These switching operations are controlled according to on-signals/off-signals output from the rotation detection switch 854, the first magnetic sensor 862, and the second magnetic sensor 863, and details of this control will be described hereafter.

Figure 48A:
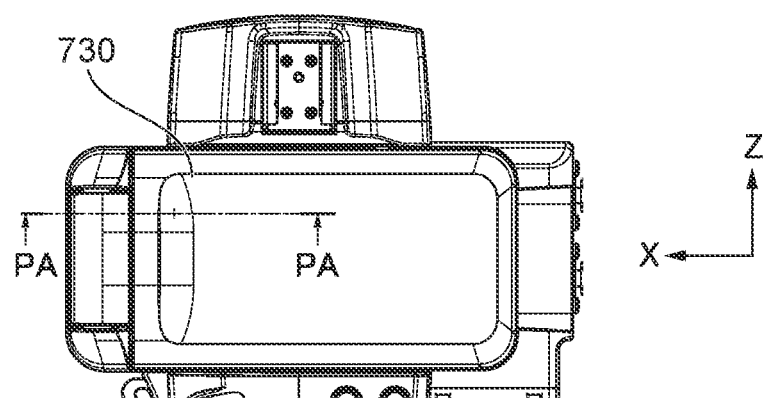
FIGS. 48A to 48C are first views useful in explaining a composition for detecting a state of the display unit.
Figure 48B:
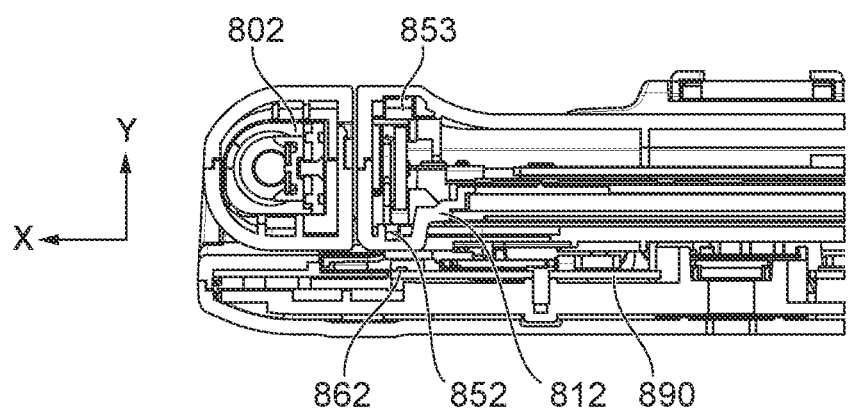
Figure 48C:
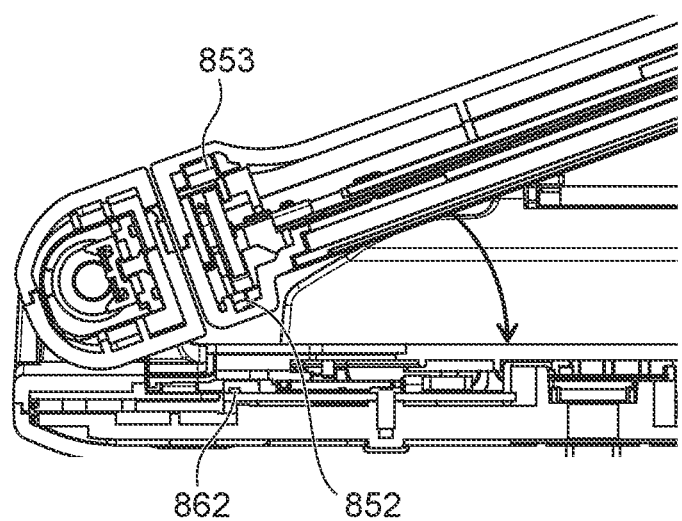

FIG. 48A is a top view of the display unit 730 in the first state. FIG. 48B is a cross-sectional view of the display unit 730 in the first state, taken along PA-PA in FIG. 48A. FIG. 48C is a cross-sectional view showing the display unit 730 in a state being shifted from the second state to the first state, taken along PA-PA in FIG. 48A.

As shown in FIG. 48B, the first magnet 852 is disposed at a location opposed to the first magnetic sensor 862 mounted on the audio circuit board 700 in a state fixed to the panel cover 812. As shown in FIG. 48C, as the display unit 730 is shifted form the second state to the first state, the first magnet 852 is moved close to the first magnetic sensor 862 for detecting the magnetic flux density in the −Y direction. Then, in a case where the first magnetic sensor 862 detects a magnetic flux density exceeding a predetermined threshold value, the first magnetic sensor 862 transmits an on signal to the control circuit board 125 (CPU).

Figure 49A:
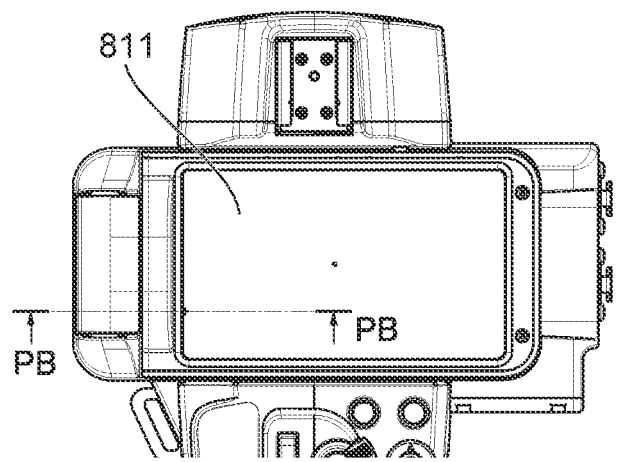
FIGS. 49A to 49C are second views useful in explaining the composition for detecting a state of the display unit.
Figure 49B:
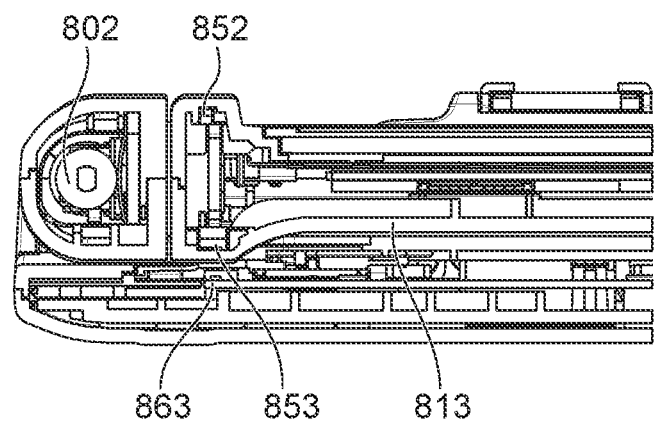
Figure 49C:
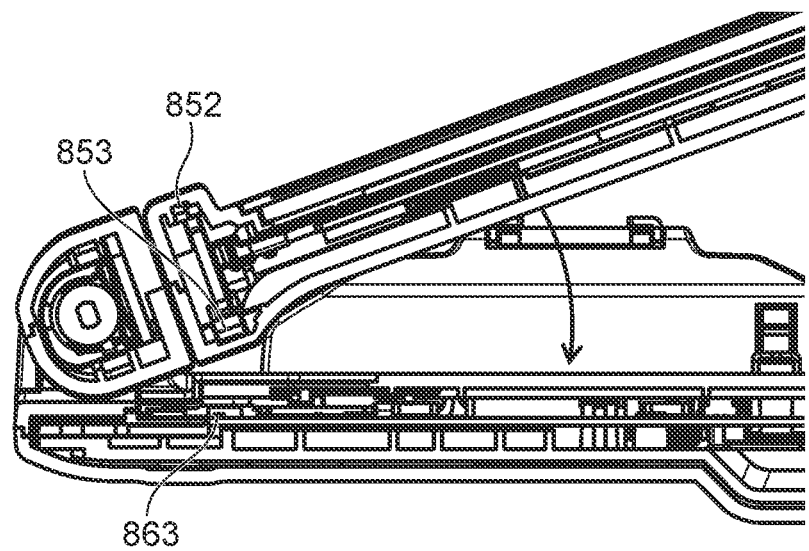

FIG. 49A is a top view of the display unit 730 in the sixth state. FIG. 49B is a cross-sectional view of the display unit 730 in the sixth state, taken along PB-PB in FIG. 49A. FIG. 49C is a cross-sectional view showing the display unit 730 in a state being shifted from the fourth state to the sixth state, taken along PB-PB in FIG. 49A.

As shown in FIG. 49B, the second magnet 853 fixed to the panel exterior cover 813 is disposed at a location opposed to the second magnetic sensor 863 mounted on the audio circuit board 700. As shown in FIG. 49C, as the display unit 730 is shifted from the fourth state to the sixth state, the second magnet 853 is moved close to the second magnetic sensor 863 for detecting the magnetic flux density in the −Y direction. Then, in a case where the second magnetic sensor 863 detects a magnetic flux density exceeding a predetermined threshold value, the second magnetic sensor 863 transmits an on signal to the control circuit board 125 (CPU).

FIG. 50 is a diagram showing a collection of detection states of the rotation detection switch 854, and the first magnetic sensor 862 and the second magnetic sensor 863, in the above-described first to sixth states of the display unit 730. Here, the display control of the display panel 811 based on the detection states of the rotation detection switch 854, and the first magnetic sensor 862 and the second magnetic sensor 863 will be described with referring to FIGS. 46A to 46D, 47A, 47B, and 50.

The first state shown in FIG. 46A is the normal retracted state of the display unit 730, and the display unit 730 is retracted to the handle 103 in a state in which the display panel 811 faces the body 100. The first state is a state in which the display panel 811 is not visible from the outside, i.e. a state in which the display unit 730 is not used. At this time, the first magnetic sensor 863 delivers the on signal, and hence the display panel 811 is in a non-display state (non-display retracted state).

In the second state shown in FIG. 46B, the display unit 730 is rotated about the first rotational axis 891 through approximately 180 degrees from the first state. Therefore, the signal delivered from the first magnetic sensor 862 is switched from the on signal to the off signal during shifting from the first state to the second state, whereby the display panel 811 is switched from the non-display state to a display state, and an image in a normal position as viewed from the photographer is displayed.

The third state shown in FIG. 46C is the normal use state in which the display unit 730 has been rotated about the second rotational axis 892 through approximately 90 degrees from the second state to cause the display panel 811 to face the −Z side. The third state is a mode of the display unit 730 used when the photographer photographs an object in front of the photographer while gripping the grip portion 107, and the signals output from the sensors are not changed from the second state. Therefore, the image displaying direction on the display panel 811 is the same as in the second state.

The fourth state shown in FIG. 46D is the high-angle photographing state in which the display unit 730 has been rotated about the second rotational axis 892 through approximately 180 degrees from the second state and the display panel 811 faces the −Y side. The fourth state is a mode of the display unit 730 used when the photographer performs photographing while holding the body 100 at a level moved upward, and the signals output from the sensors are not changed from the second state. Therefore, the image displaying direction on the display panel 811 is the same as in the second state.

The fifth state shown in FIG. 47A is the self-portrait state in which the display unit 730 has been rotated about the second rotational axis 892 through approximately 90 degrees from the second state to cause the display panel 811 to face the object side (+Z side). Here, the rotation detection switch 854 delivers the on signal in a case where the display unit 730 has been rotated about the second rotational axis 892 to the position where the state is shifted to the fifth state. Therefore, an image inverted by approximately 180 degrees is displayed on the display panel 811 such that the object and the display image match each other in the vertical direction.

The sixth state shown in FIG. 47B is the inversely retracted state in which the display unit 730 has been rotated about the first rotational axis 891 through approximately 180 degrees from the fourth state and retracted to the handle 103. In the sixth state, the display panel 811 faces upward of the image capturing apparatus 1000 (the display panel 811 turns its back to the body 100), i.e. in a position opposite to that of the first state, and the display panel 811 is visible from the outside. The signal delivered from the second magnetic sensor 863 is switched from the off signal to the on signal during shifting from the fourth state to the sixth state, whereby an image inverted by approximately 180 degrees is displayed on the display panel 811 (display retracted state). In this case, if the photographer is photographing an object in front of the photographer while gripping the grip portion 107, an image displayed on the display panel 811 is an image in the normal position, as viewed from the photographer.

Figure 51:
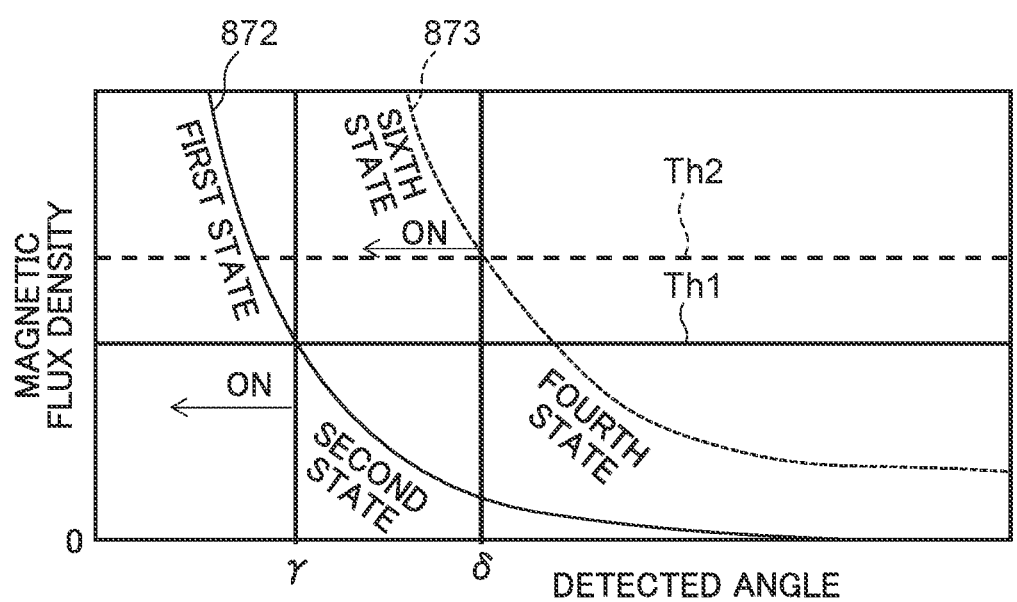
FIG. 51 is a diagram showing a relationship between an angle of the display unit and magnetic flux densities detected by respective magnetic sensors.

FIG. 51 is a diagram showing a relationship between an angle formed by the display unit 730 and the X direction and magnetic flux densities detected by the first magnetic sensor 862 and the second magnetic sensor 863. An angle formed by the display unit 730 and the X direction (detected angle represented by a horizontal axis in FIG. 51) is an angle detected by the rotation detection switch 854.

A solid line 872 indicates the shift between the first state and the second state, and the first magnetic sensor 862 switches between the on signal and the off signal using an angle γ as a boundary at which the magnetic flux density of the first magnet 852 becomes equal to a threshold value Th1. A broken line 873 indicates the shift between the fourth state and the sixth state, and the second magnetic sensor 863 switches between the on signal and the off signal using an angle δ as a boundary at which the magnetic flux density of the second magnet 853 becomes equal to a threshold value Th2.

As described above, the first magnet 852 and the second magnet 853 have different magnetic flux densities, and have a relationship expressed by "the first magnet 852<the second magnet 853". The first magnetic sensor 862 and the second magnetic sensor 863 also have a relationship expressed by "magnetic flux density detected by the first magnetic sensor 862<magnetic flux density detected by the second magnetic sensor 863", and a difference is provided between the angle γ and the angle δ.

Thus, by reducing the angle γ for switching between the first state and the second state, it is possible to quickly light the display panel 811 during shifting from the retracted state (first state) to the in-use state (second state), and the photographer can quickly confirm an image and perform an operation. Further, by increasing the angle δ for switching between the fourth state and the sixth state, it is possible to quickly invert the display image on the display panel 811 when confirming the image by shifting the state to the inversely retracted state (sixth state). With this, the photographer can quickly confirm an image and perform an operation.

<Description of the Electronic Viewfinder 755>

Figure 52:
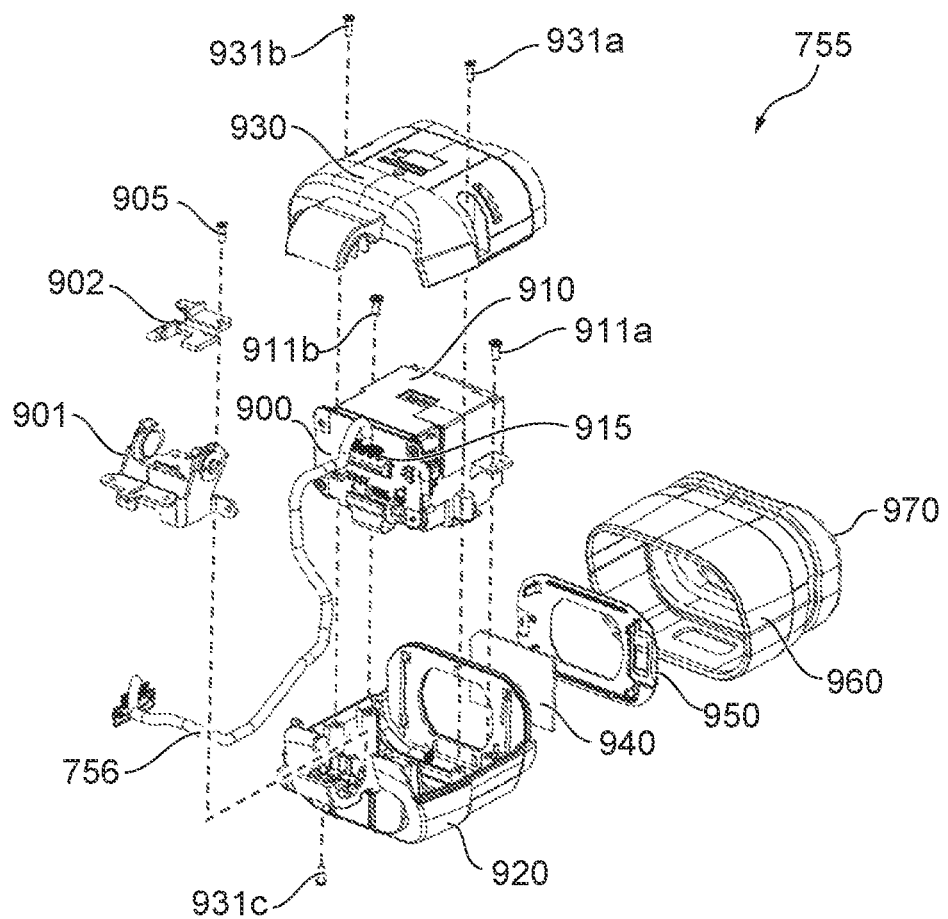
FIG. 52 is an exploded perspective view of a viewfinder.
Figure 53A:
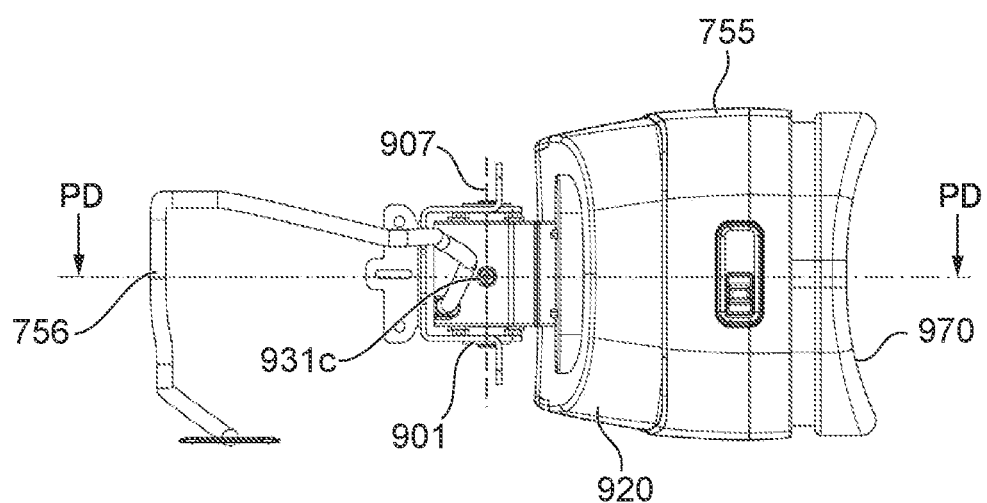
FIGS. 53A and 53B are a reverse side view of the viewfinder and a cross-sectional view of the same taken along PD-PD, respectively.
Figure 53B:
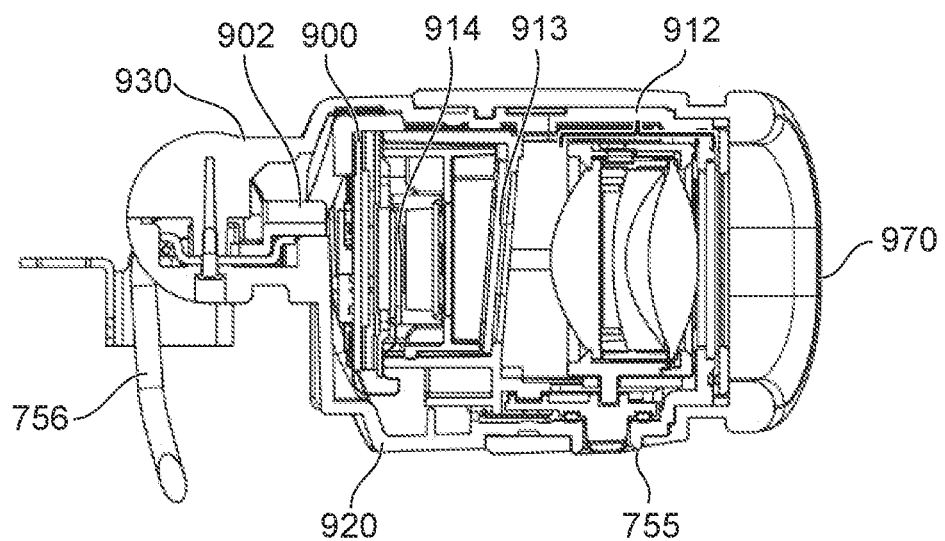

FIG. 52 is an exploded perspective view of the electronic viewfinder 755. FIG. 53A is a bottom view of the electronic viewfinder 755 (as viewed from the −Y side). FIG. 53B is a cross-sectional view of the electronic viewfinder 755, taken along PD-PD in FIG. 53A.

An EVF inner case 910 that holds an EVF circuit board 900 is fixed to an EVF lower cover 920 with fixing screws 911a and 911b. The EVF lower cover 920, an EVF hinge 901, and a wire routing member 902 are stacked from the lower side in the mentioned order and fastened with a hinge fixing screw 905 from the above. The EVF hinge 901 is a member for rotating the electronic viewfinder 755. After an EVF upper cover 930 and the EVF lower cover 920 are fixed with EVF screws 931a, 931b, and 931c, an eye cup 960 is attached to cover the EVF upper cover 930 and the EVF lower cover 920.

A lens cover 940 is mounted on the EVF lower cover 920 using a lens cover-holding member 950 from the rear side of the image capturing apparatus 1000 (side toward the eyepiece surface 970). The wires 756 electrically connect between the EVF circuit board 900 and the control circuit board 125 disposed in the body 100.

Inside the EVF inner case 910, as shown in FIG. 53B, there are arranged a lens section 912, an image display device-protecting plate 913, and an image display device 914 in the mentioned order from the side toward the eyepiece surface 970. The image display device 914 is electrically connected to the EVF circuit board 900 for controlling power supply and an image.

Image signals are sent from the control circuit board 125 disposed in the body 100 to the EVF circuit board 900 via the wires 756, and the image signals are further sent from the EVF circuit board 900 to the image display device 914 and displayed on the image display device 914 as an optical image. The optical image displayed on the image display device 914 is condensed by the lens section 912 and transmitted through the lens cover 940. This enables the photographer to visually recognize the optical image displayed on the image display device 914 with the naked eye.

Figure 54A:
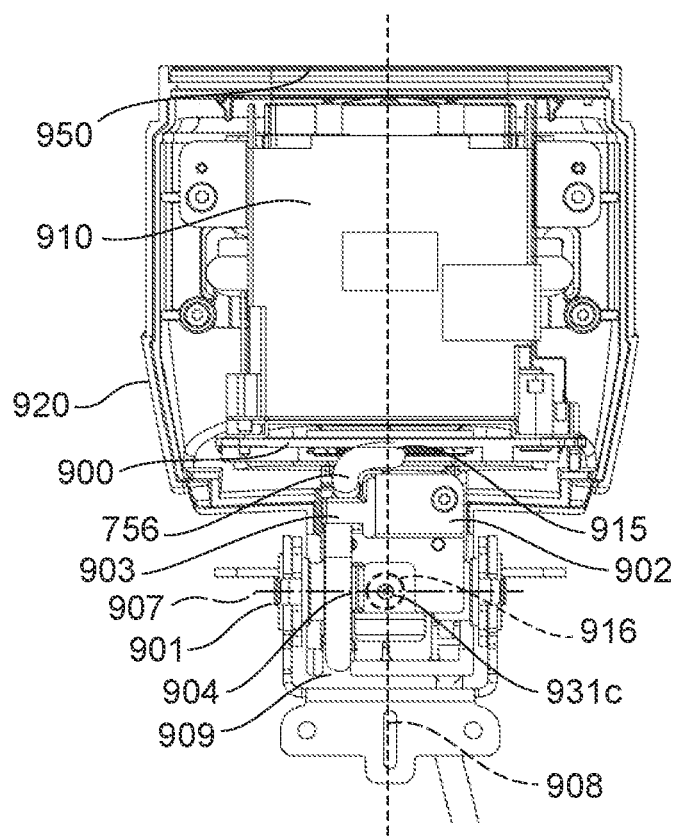
FIGS. 54A and 54B are a top view of the viewfinder and a perspective view of a wire routing member, respectively.
Figure 54B:
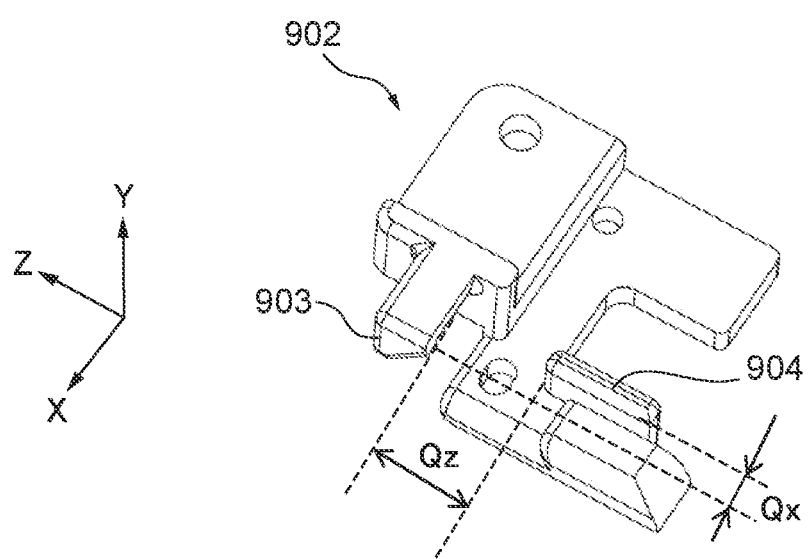

FIG. 54A is a top view of the electronic viewfinder 755, and the EVF upper cover 930 is omitted from illustration. FIG. 54B is a perspective view of the wire routing member 902. It is desirable that the EVF hinge 901 has sufficient mechanical strength against the rotational operation and further is compact and light in weight. From this point of view, the EVF hinge 901 is fastened between the EVF lower cover 920 and the EVF upper cover 930 with the EVF screw 931c at a hinge fixing portion 916 in the vicinity of an intersection between an EVF optical axis center 908 and an EVF rotational axis 907.

The EVF lower cover 920 is formed with a wire routing U-shaped groove 909 so as to arrange the wires 756 in a manner preventing the wires 756 and the EVF hinge 901 from interfere with each other. Here, in a case where the wires 756 are arranged without regulating its position, the wires 756 are in danger of being pinched between the EVF lower cover 920 and the EVF upper cover 930 at the hinge fixing portion 916 due to a positional relationship between an EVF wire connector 915 and the wire routing U-shaped groove 909. To avoid such pinch without increasing the width of the hinge, a sufficient space is required to be provided between the EVF wire connector 915 and the wire routing U-shaped groove 909 in the optical axis direction of the electronic viewfinder 755. However, in this arrangement, the electronic viewfinder 755 is increased in size.

To cope with this problem, in the present embodiment, the wires 756 are routed using the wire routing member 902 appearing in FIG. 54A, whereby the wires 756 are prevented from being pinched between the EVF lower cover 920 and the EVF upper cover 930, and what is more, space saving is realized. More specifically, as shown in FIG. 54B, the wire routing member 902 has a claw shape portion 903 and a guide shape portion 904, and holds the wires 756 by sandwiching the wires 756 between the claw shape portion 903 and the guide shape portion 904. It is possible to restrict the wires 756 to a position shifted toward the +X side than the EVF optical axis center 908 by using the claw shape portion 903. Further, it is possible to prevent the wires 756 from being pinched between the EVF lower cover 920 and the EVF upper cover 930 at the hinge fixing portion 916 by using the guide shape portion 904. Thus, by performing wire routing such that the wires 756 are positioned toward one side with respect to the EVF optical axis center 908 by using the wire routing member 902, it is possible to route the wires 756 without increasing the size of the electronic viewfinder 755 in the optical direction.

Further, to cope with variation in thickness of the wires 756, the claw shape portion 903 and the guide shape portion 904 are separated from each other by a predetermined distance Qz in the Z direction and by a predetermined distance Qx in the X direction. The distance Qx is set to be shorter than the thickness of the wires 756, which is the thinnest imaginable one, and this makes it possible to positively hold the wires 756 even when the wires 756 vary in outer diameter.

Figure 55A:
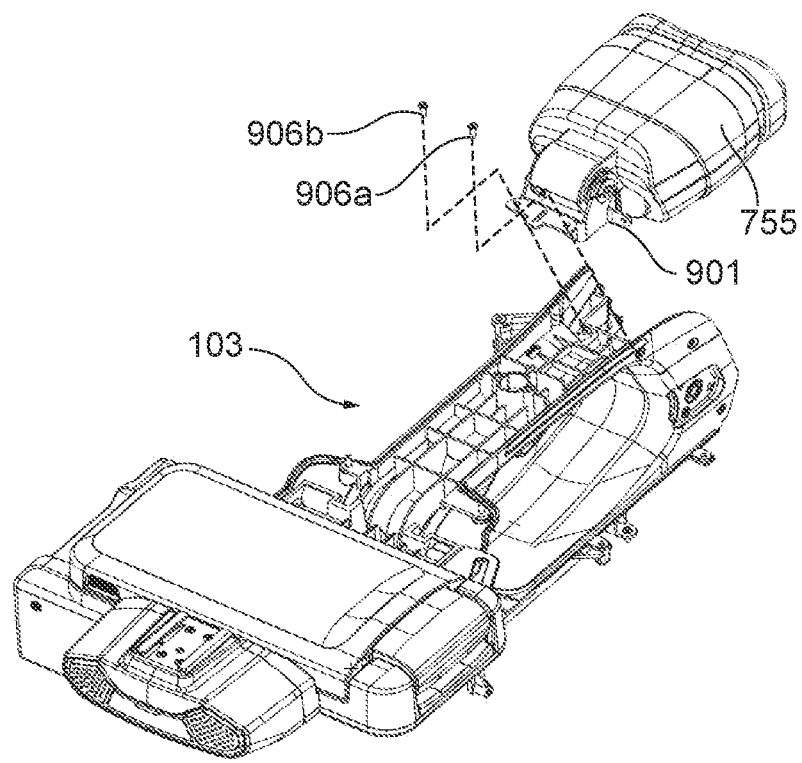
FIGS. 55A and 55B are schematic views showing how to mount the viewfinder on the handle.
Figure 55B:
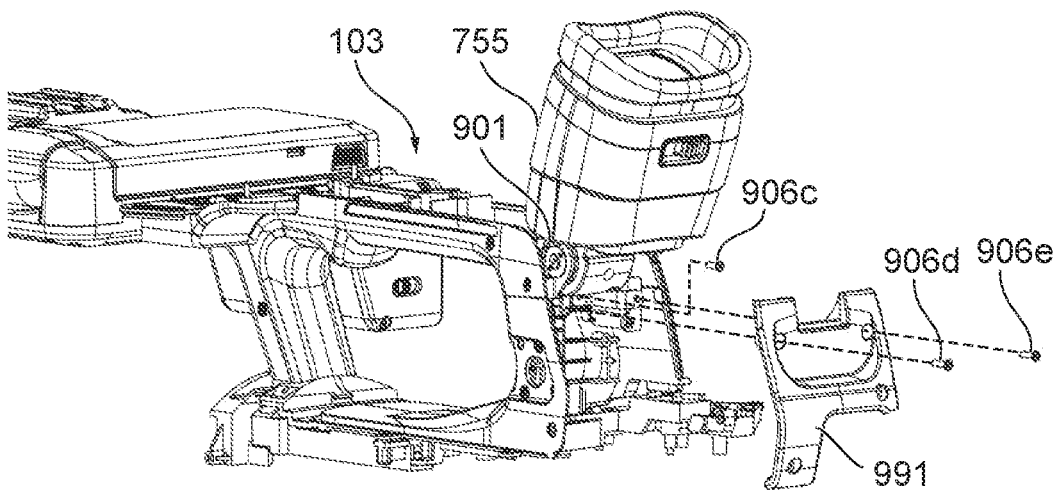

FIG. 55A is a schematic view showing how to mount the electronic viewfinder 755 on the handle 103, as viewed from the +Y side. FIG. 55B is a schematic view showing how to mount the electronic viewfinder 755 on the handle 103, as viewed from the −Z side. Note that in FIGS. 55A and 55B, a handle upper cover 990 (see FIGS. 56A to 56C) which is a component of the handle 103 and is fixed after mounting the electronic viewfinder 755 is omitted from illustration.

The electronic viewfinder 755 is connected to the handle 103 such that the electronic viewfinder 755 is rotatable by the EVF hinge 901 formed of a metal material having high strength, such as stainless steel. As shown in FIG. 55A, the EVF hinge 901 is fastened and fixed to the handle 103 with hinge fixing screws 906a and 906b from the top side (+Y side). Further, as shown in FIG. 55B, on the rear side of the handle 103, the EVF hinge 901 is fastened and fixed to the handle 103 with a hinge fixing screw 906c from the −Z side. To the rear surface of the EVF hinge 901, a handle rear cover 991 is fastened with hinge fixing screws 906d and 906e.

Figure 56A:
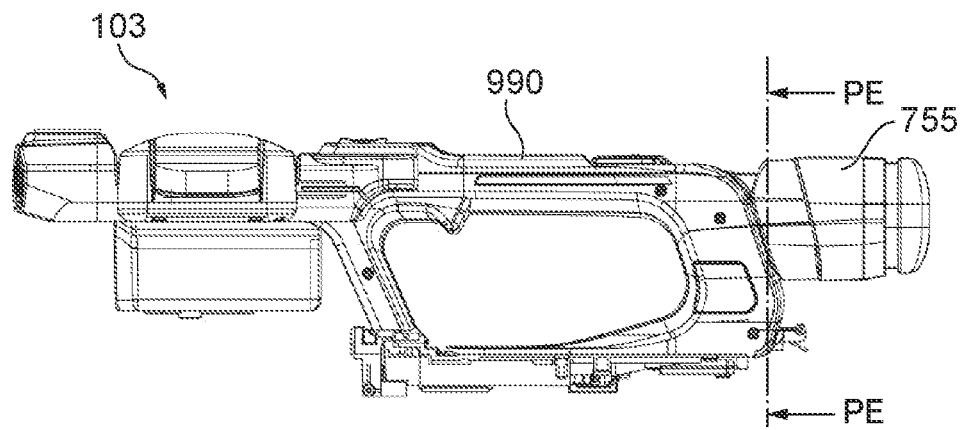
FIGS. 56A to 56C are side views showing postures which can be assumed by the viewfinder.
Figure 56B:
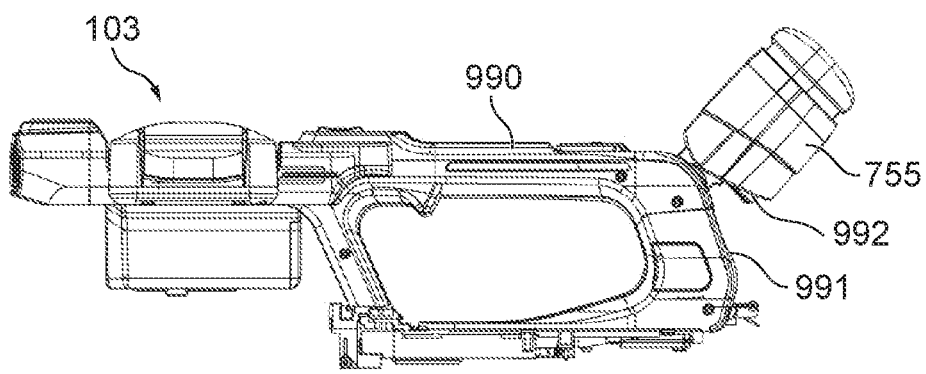
Figure 56C:
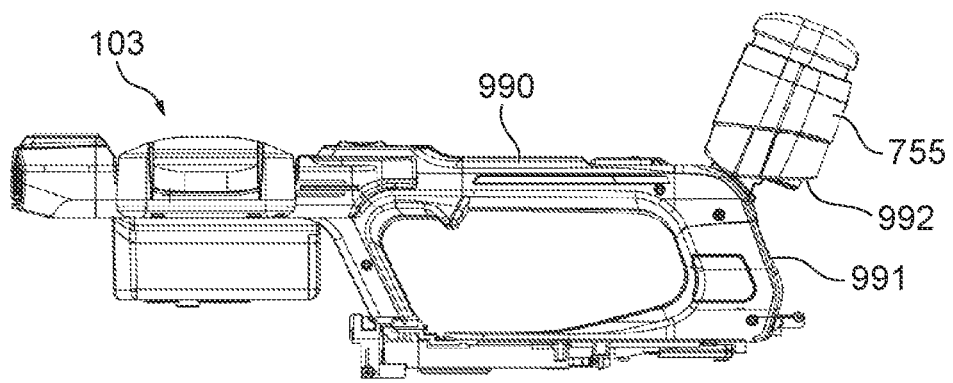

FIGS. 56A to 56C are side views showing postures which can be assumed by the electronic viewfinder 755. The electronic viewfinder 755 can be freely set between three states of a retracted state shown in FIG. 56A, a first in-use state shown in FIG. 56B, and a second in-use state shown in FIG. 56C, by rotating the EVF hinge 901.

Figure 57A:
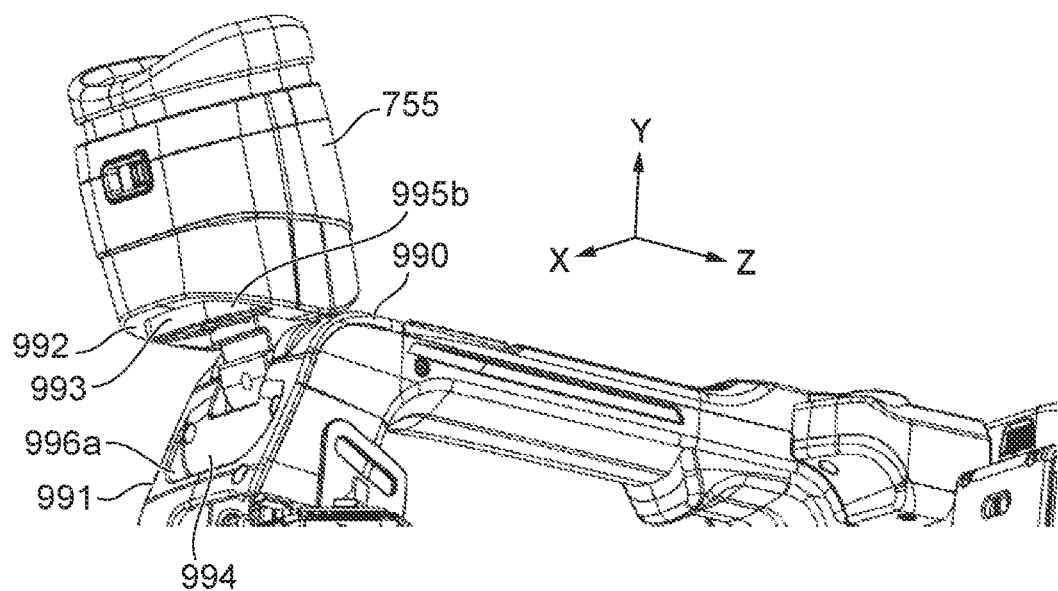
FIGS. 57A and 57B are perspective views showing a first use state of the viewfinder.
Figure 57B:
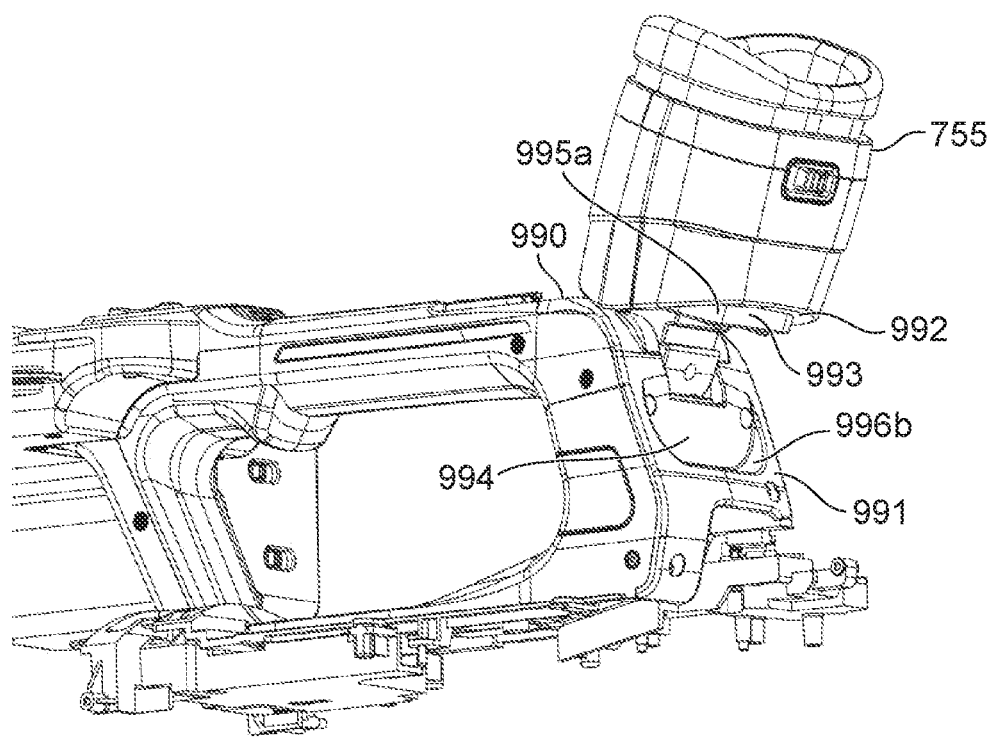
Figure 58:
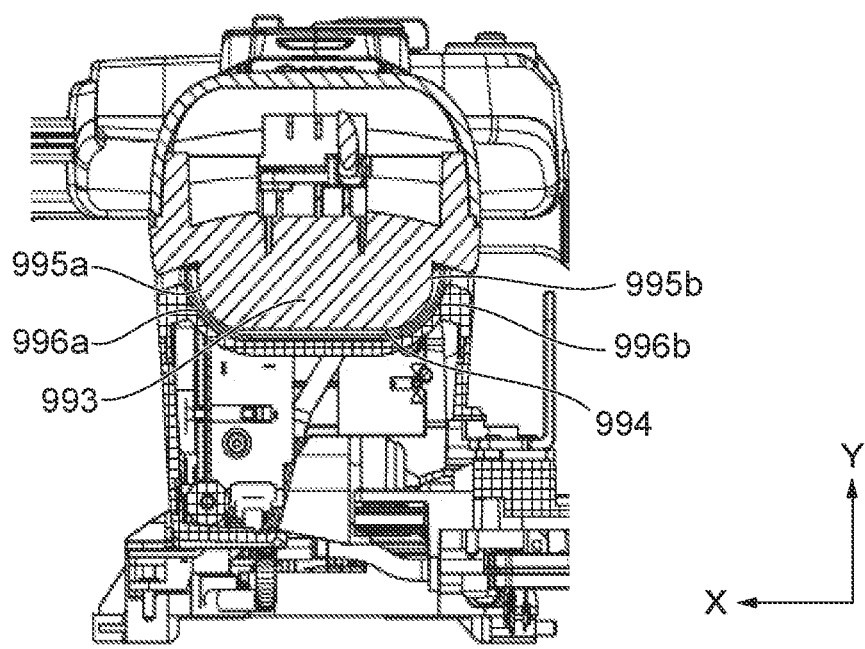
FIG. 58 is a cross-sectional view taken along PE-PE in FIG. 56A.

FIGS. 57A and 57B are perspective views of the electronic viewfinder 755 in the first in-use state shown in FIG. 56B. FIGS. 57A and 57B differ from each other in the direction of viewing the electronic viewfinder 755. FIG. 58 is a cross-sectional view of the electronic viewfinder 755, taken along PE-PE in FIG. 56A.

A front surface 992 of the electronic viewfinder 755 is formed with an EVF protruding portion 993. Further, the handle rear cover 991 of the handle 103 is provided with a handle recess 994 which can receive the EVF protruding portion 993 therein, at a location opposed to the EVF protruding portion 993 when the electronic viewfinder 755 is in the retracted state. In the retracted state of the electronic viewfinder 755 shown in FIG. 56A, the handle rear cover 991 of the handle 103 and the front surface 992 of the electronic viewfinder 755 are brought into contact with each other in a state oblique to the vertical direction (state in which a predetermined angle is formed). At this time, the EVF protruding portion 993 is received in the handle recess 994. An inner wall 996a and an inner wall 996b of the handle recess 994 are provided at respective locations opposed to a side surface 995a and a side surface 995b of the EVF protruding portion 993, respectively.

With the arrangement shown in FIGS. 56A to 58, in a case where a load (external force) is applied to the electronic viewfinder 755 in an axial direction (X direction) of the EVF rotational axis 907 of the EVF hinge 901, the side surface 995a is brought into abutment with the inner wall 996a and the inner wall 996a can receive the load. With this, it is possible to prevent the EVF hinge 901 from being deformed and damaged due to the load. Further, since the front surface 992 of the electronic viewfinder 755 is formed oblique to the vertical direction, it is possible to form the EVF protruding portion 993 which protrudes from the front surface 992 to be small. Further, it is possible to provide the EVF protruding portion 993 at a location away from the EVF rotational axis 907, and hence when an impact is applied to the electronic viewfinder 755, the position where the load is received is far from the EVF rotational axis 907, and it is possible to receive larger moment. With the above-described arrangement, it is possible to ensure the strength against the impact without increasing the size of the electronic viewfinder 755.

<Description of a Front Unit of the Handle 103>

Figure 59A:
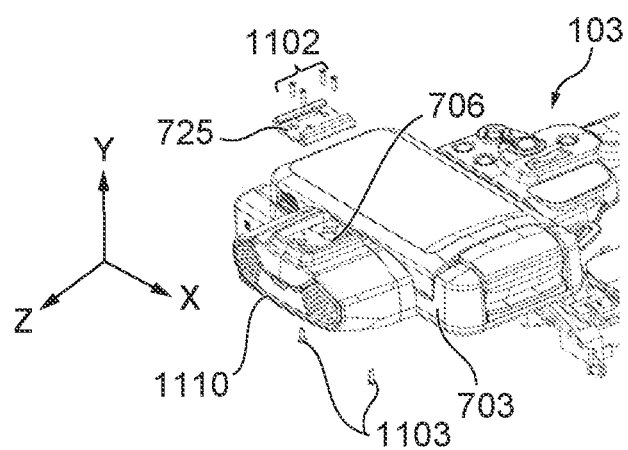
FIGS. 59A to 59C are perspective views showing the front portion of the handle.
Figure 59B:
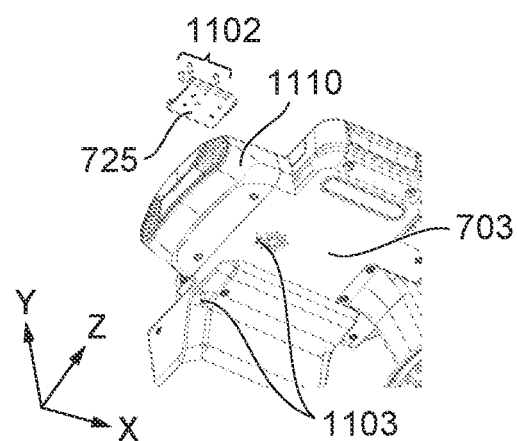
Figure 59C:
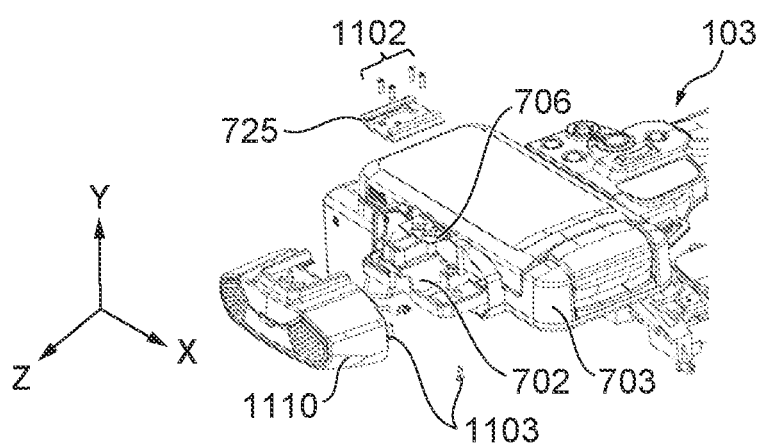

FIGS. 59A and 59B are perspective views showing the front portion of the handle 103. FIGS. 59A and 59B differ from each other in the direction of viewing the front portion of the handle 103. FIG. 59C is an exploded perspective view of the front portion of the handle 103.

A handle front unit 1110 is rigidly fixed to the handle frame 702 with screws 1102 and screws 1103. More specifically, the handle front unit 1110 is fixed to the lower audio cover 703 from the bottom side of the handle 103 with the screws 1103. Further, the handle front unit 1110 is fixed to the upper audio cover 706 from the top side of the handle 103 with the screws 1102. In doing this, the accessory shoe 725 is fixed with the screws 1102 such that the accessory shoe 725 extends astride the handle 103 and the handle front unit 1110. Therefore, by removing the screws 1102 and 1103, the handle front unit 1110 can be separated from the handle 103.

Figure 60A:
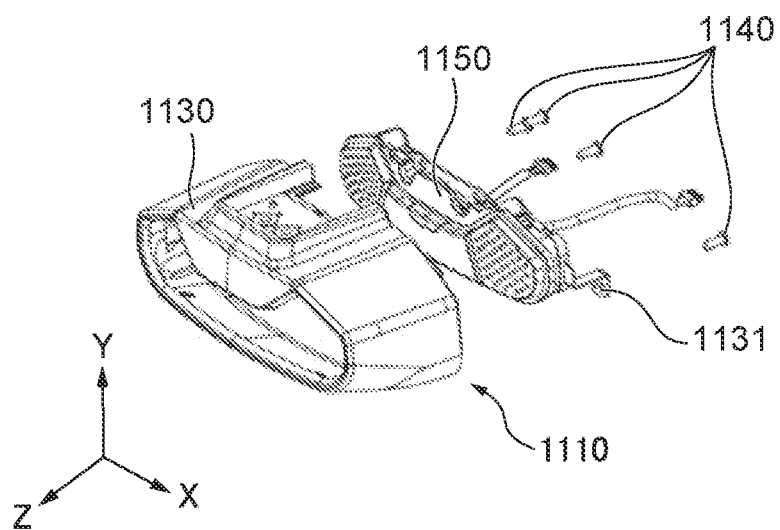
FIGS. 60A and 60B are exploded perspective views of a handle front unit.
Figure 60B:
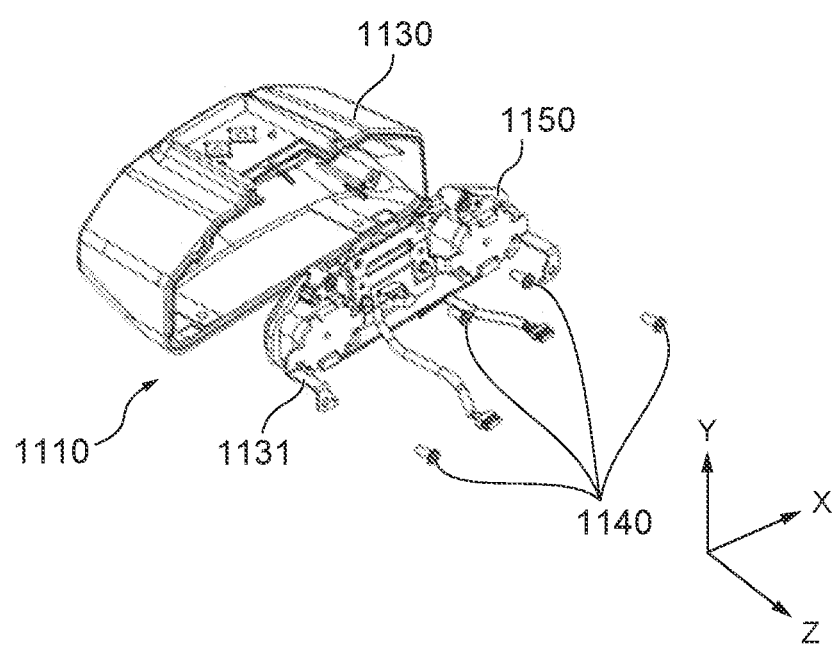

FIGS. 60A and 60B are exploded perspective views of the handle front unit 1110. FIGS. 60A and 60B differ from each other in the direction of viewing the handle front unit 1110.

The handle front unit 1110 is a unit formed by arranging a front microphone unit 1150 inside a handle front cover 1130. The handle front unit 1110 is formed by fixing a microphone holder 1131 of the front microphone unit 1150 to the handle front cover 1130 with four screws 1140.

Figure 61:
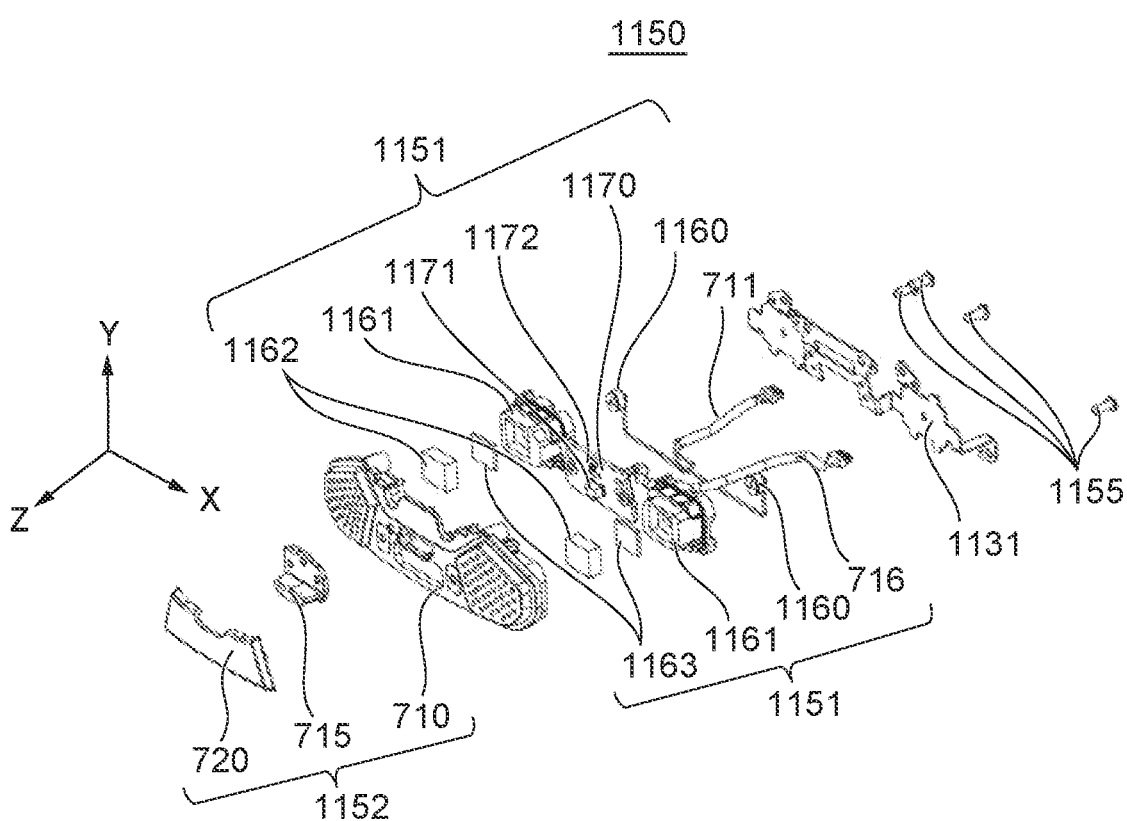
FIG. 61 is an exploded perspective view of a front microphone unit.

FIG. 61 is an exploded perspective view of the front microphone unit 1150. The front microphone unit 1150 includes a microphone cover unit 1152, an intermediate unit 1151, and the microphone holder 1131. The intermediate unit 1151 includes right and left two sets of microphone elements 1160, microphone rubbers 1161, microphone sponges 1162, and microphone blinding members 1163, and the wires 711. Further, the intermediate unit 1151 includes an IR board 1170 on which components, such as the infrared light 1171 and the LED light 1172, are mounted, and the wires 716 connected to the IR board 1170. The intermediate unit 1151 is sandwiched between the microphone cover unit 1152 and the microphone holder 1131 and fixed with screws 1155.

In each microphone element 1160, a sound collection section including a vibration plate is provided on a front side (+Z side), and an electric connection portion is provided on a rear side (−Z side). Further, inside the microphone element 1160, a circuit (not shown) for converting an audio signal input from the vibration plate to an electrical signal is disposed. Each microphone sponge 1162 is a porous resin member having elasticity and a predetermined open area ratio, suppresses wind noise generated by rapid wind pressure, and prevents sound pressure from being directly applied to the sound collection section of the microphone element 1160. Each microphone blinding member 1163 prevents the microphone element 1160 from being visible from the outside through the holes formed in the microphone cover 710. The microphone holder 1131 is a member as a base of the front microphone unit 1150 and is formed of a thin plate-shaped metal material.

The wires 711 have one end soldered to the electric connection portion of the rear surface of the microphone elements 1160 and the other end electrically connected to the audio circuit board 700. Audio signals obtained by the sound collection sections of the microphone elements 1160 are converted to electrical signals inside the microphone elements 1160, and then sent to the audio circuit board 700 via the wires 711, wherein predetermined processing is performed.

The microphone sponges 1162 and the microphone blinding members 1163 are disposed in front of the microphone elements 1160 in a state sandwiched between the microphone cover 710 and the microphone rubbers 1161. Therefore, even when wind having strong wind pressure invades through the holes of the microphone cover 710, the wind is attenuated by the microphone sponges 1162, and is prevented from largely shaking the sound collecting sections of the microphone elements 1160. That is, the microphone sponges 1162 function as a windshield member for reducing noise generated by wind.

The microphone cover unit 1152 is formed by the three components of the microphone cover 710, the tally light cover 715, and the IR light cover 720. Note that the tally light cover 715 and the IR light cover 720 have been described with reference to FIGS. 35A and 35B and so forth, and hence description here is omitted.

Inside the image capturing apparatus 1000, vibration propagates from the upper audio cover 706 and the handle frame 702 of the handle 103 to the microphone elements 1160 via the handle front cover 1130, the microphone holder 1131, and the microphone rubbers 1161 in the mentioned order. At this time, the vibration is progressively attenuated due to existence of the plurality of components in the propagation path. Further, the microphone elements 1160 are elastically held by the microphone rubbers 1161 inside the front microphone unit 1150, and hence the vibration is hardly transferred to the microphone elements 1160. Thus, in the present embodiment, it is possible to effectively reduce vibration which propagates through the exterior members of the image capturing apparatus 1000 to reach the microphone elements 1160.

<Description of an Audio Terminal Section>

Figure 62:
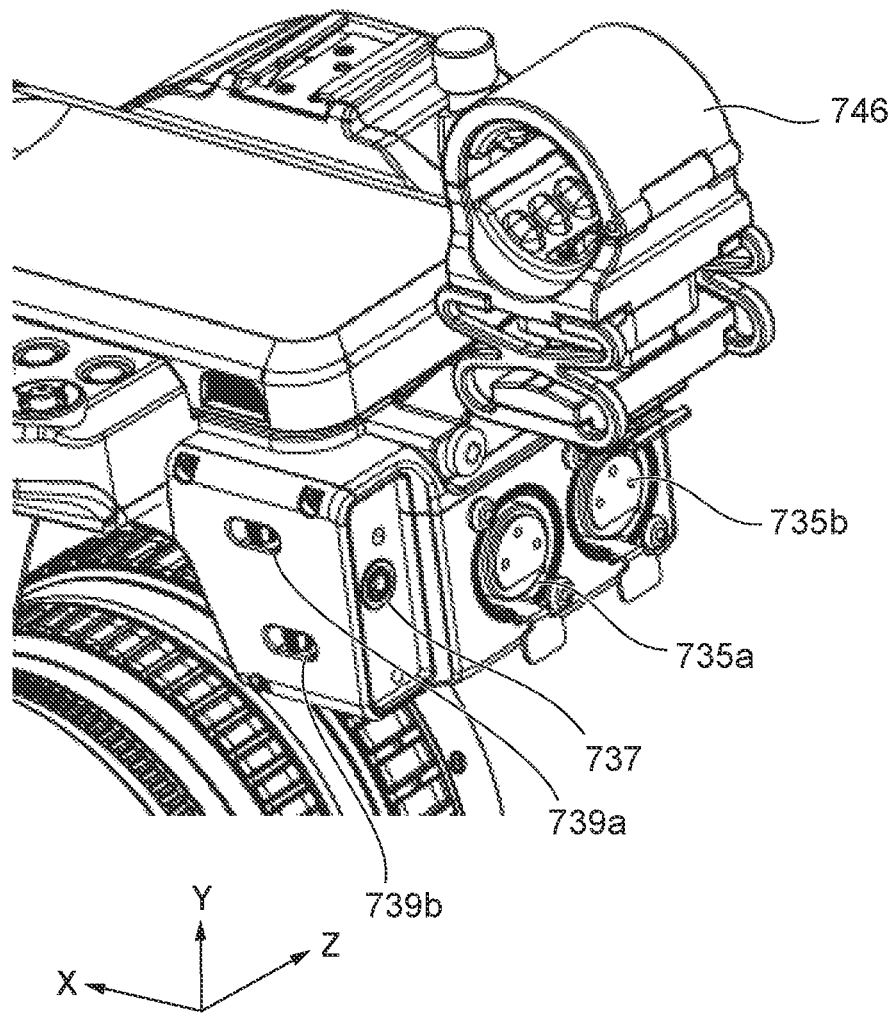
FIG. 62 is a perspective view showing the configuration of an audio input-switching switch and an audio output terminal portion.

FIG. 62 is a perspective view showing the configuration of the audio input-switching switch 739 and an audio terminal section. The audio terminal section specifically refers to where the XLR terminals 735a and 735b are arranged. By arranging the XLR terminals 735a and 735b of respective two systems, it is possible to record audio signals output from different external devices which are connected to the XLR terminals 735a and 735b, respectively. The XLR terminals 735a and 735b are arranged side by side along the optical axis direction (Z direction) such that each terminal is connected in a direction orthogonal to the optical axis of the body 100 and from the side toward the grip portion 107 (−X side).

On the −Z side of the XLR terminal 735a, the external microphone input terminal 737 is arranged such that it is connected from the direction orthogonal to the optical axis of the body 100 and from the side toward the grip portion 107, similar to the XLR terminals 735a and 735b. With this arrangement of the XLR terminals 735a and 735b and the external microphone input terminal 737, when the photographer holds the handle grasping portion 1033 or the grip portion 107, the photographer is prevented from being obstructed by cables connected to these terminals.

The audio input-switching switch 739 includes audio input-switching switches 739a and 739b. The audio input-switching switches 739a and 739b control respective input/output states of the XLR terminals 735a and 735b. The audio input-switching switches 739a and 739b are arranged on a surface which is substantially orthogonal and adjacent to the surface in which the XLR terminals 735a and 735b and the external microphone input terminal 737 are arranged, and is orthogonal to the axis H of the body 100. That is, the audio input-switching switches 739a and 739b are arranged in a rearward facing surface of the body 100.

Figure 63A:
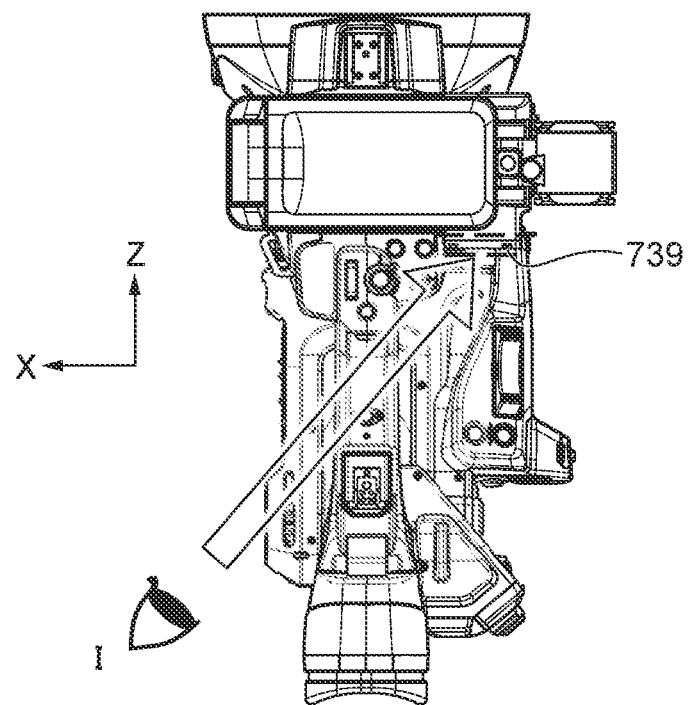
FIGS. 63A and 63B are schematic views showing how a photographer confirms the audio input-switching switches.
Figure 63B:
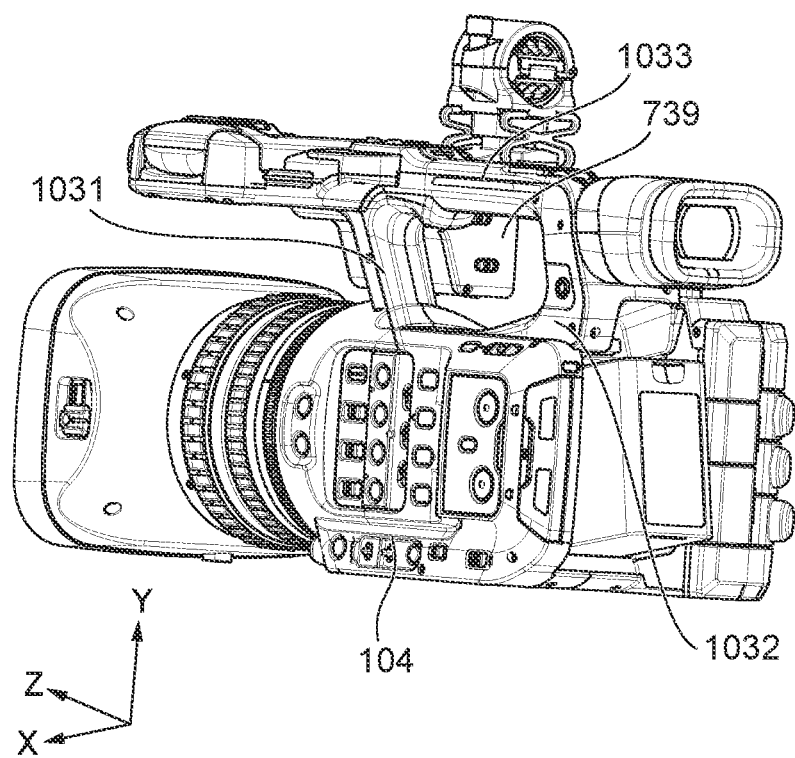

FIG. 63A is a top view showing how a photographer I confirms the audio input-switching switches 739a and 739b. FIG. 63B is a perspective view of the body 100, as viewed from a direction indicated by an arrow in FIG. 63A. When performing the photographing operation, the photographer I can confirm the positions of the audio input-switching switches 739a and 739b, through the handle holding space 1034 (see FIG. 4), from behind the +X side where the operation system arrangement section 104 is provided. Note that the handle holding space 1034 is a space surrounded by the handle front leg portion 1031, the handle rear leg portion 1032, the handle grasping portion 1033, and the top surface of the body 100.

Further, since the audio input-switching switches 739a and 739b, which are among the operation keys, are arranged on the side of the grip portion 107, it is possible to reduce the number of operation keys disposed in the operation system arrangement section 104 and thereby reduce the size of the operation system arrangement section 104. As a result, it is possible to reduce of the size of the body 100.

Figure 64A:
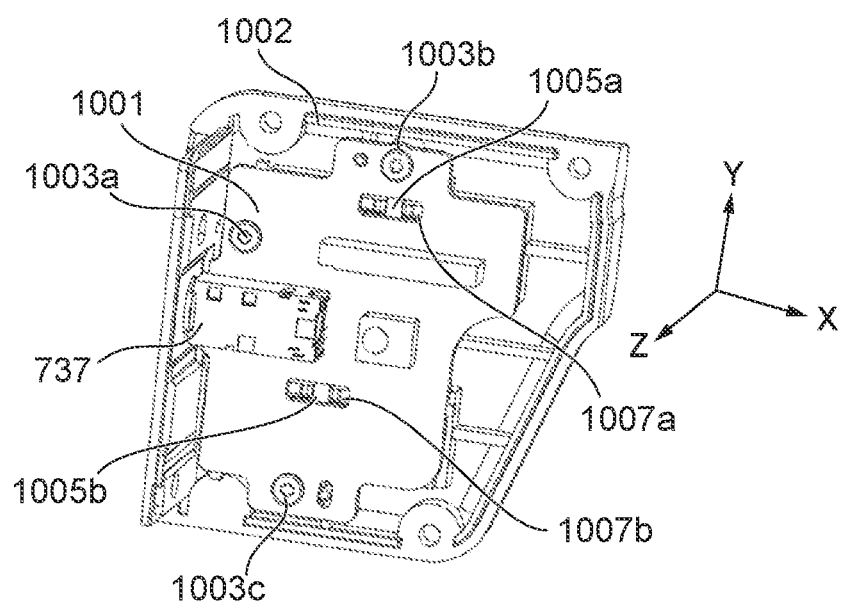
FIGS. 64A and 64B are views showing an internal configuration of a portion where an external microphone input terminal is mounted.
Figure 64B:
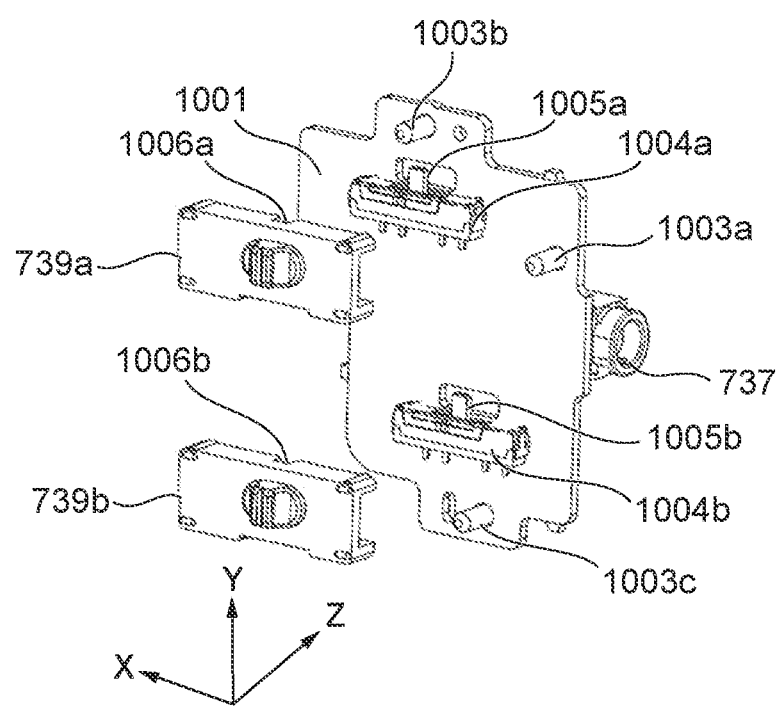

FIG. 64A is a view showing an internal configuration of where the external microphone input terminal 737 is mounted. FIG. 64B is an exploded perspective view of a microphone terminal board 1001 on which the external microphone input terminal 737 is mounted, as viewed from a side toward the audio input-switching switches 739a and 739b.

The external microphone input terminal 737 is mounted on the microphone terminal board 1001. The microphone terminal board 1001 is fixed to a microphone holding cover 1002, in which the mouth portion of the external microphone input terminal 737 opens, at fixing portions 1003a, 1003b, and 1003c. On a surface of the microphone terminal board 1001, opposite from the surface on which the external microphone input terminal 737 is mounted, audio operation switches 1004a and 1004b are mounted. By closely mounting the terminal group and switches (the external microphone input terminal 737 and the audio operation switches 1004a and 1004b) related to audio input on the same board, it is possible to realize size reduction in the Z direction.

The audio operation switches 1004a and 1004b have operation levers 1005a and 1005b, respectively. When the operation levers 1005a and 1005b are operated in a slide direction (X direction), the audio operation switches 1004a and 1004b switch audio input circuits, respectively. More specifically, the operation levers 1005a and 1005b are engaged with cutouts 1006a and 1006b of the audio input-switching switches 739a and 739b, respectively. The audio input-switching switches 739a and 739b are operated by operating the operation levers 1005a and 1005b, whereby the audio input circuits are switched.

Board openings 1007a and 1007b are formed at locations on the microphone terminal board 1001, opposed to the operation levers 1005a and 1005b, respectively. When assembling the audio input-switching switches 739a and 739b and the microphone terminal board 1001 into the microphone holding cover 1002, position confirmation can be performed in the following manner: The engagement positions between the operation levers 1005a and 1005b of the audio operation switches 1004a and 1004b and the cutouts 1006a and 1006b of the audio input-switching switches 739a and 739b can be confirmed through the board openings 1007a and 1007b.

On the microphone terminal board 1001, the audio operation switch 1004a, the external microphone input terminal 737, and the audio operation switch 1004b are arranged from the upper side (+Y side) in the mentioned order such that the shadows of these components, projected in the optical axis direction, do not overlap each other. The fixing portion 1003a is disposed in the vicinity of the mouth portion of the external microphone input terminal 737. The fixing portion 1003b is disposed in the vicinity of the audio operation switch 1004a and on a far side from the terminal end of the external microphone input terminal 737. The fixing portion 1003c is disposed in the vicinity of the audio operation switch 1004b and on the far side from the terminal end of the external microphone input terminal 737.

It is desirable that the external microphone input terminal 737 mounted on the microphone terminal board 1001 is not too firmly fixed at its terminal end so as to prevent a soldered portion for fixing the external microphone input terminal 737 from being peeled when an external force is applied in a plug inserted state. On the other hand, it is desirable that the audio operation switches 1004a and 1004b are firmly fixed since external forces in the operation direction are received when the audio input-switching switches 739a and 739b are operated. In view of this, as described above, the external microphone input terminal 737 is fixed only by a portion in the vicinity of the mouth portion, and the audio operation switches 1004a and 1004b are fixed at the respective locations far from the terminal end of the external microphone input terminal 737. Thus, these components mounted on the same board are properly fixed, whereby it is possible to improve the reliability of each component.

Figure 65:
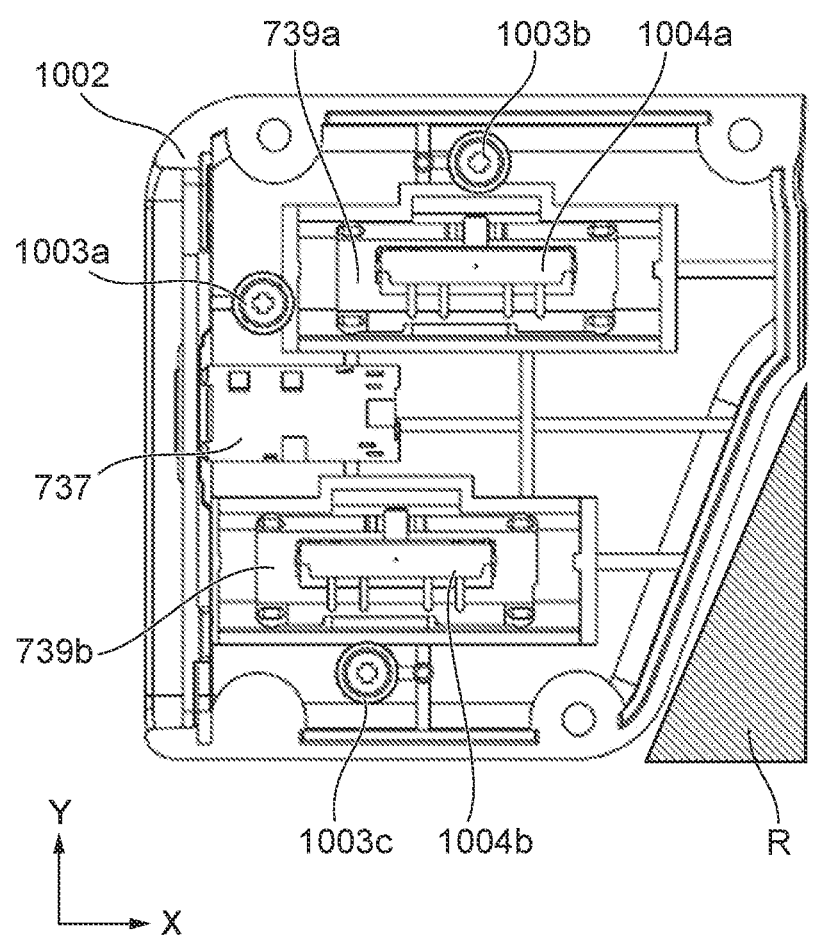
FIG. 65 is a view showing a positional relationship between components mounted on a microphone terminal board.

FIG. 65 is a view showing a positional relationship between the components mounted on the microphone terminal board 1001. Note that to show the positional relationship between the components mounted on the front and reverse sides of the microphone terminal board 1001, respectively, the microphone terminal board 1001 itself is not shown for convenience. The audio operation switches 1004b arranged on a far side from the fixing portion 1003a provided in the vicinity of the mouth portion of the external microphone input terminal 737 is disposed closer to the mouth portion side (−X direction) of the external microphone input terminal 737 because of non-provision of the fixing portion. Thus, the microphone holding cover 1002 can be formed into a shape from which an area R is eliminated, whereby it is possible to reduce the size of the body 100.

<Description of a Wireless Communication Section 201>

Figure 66A:
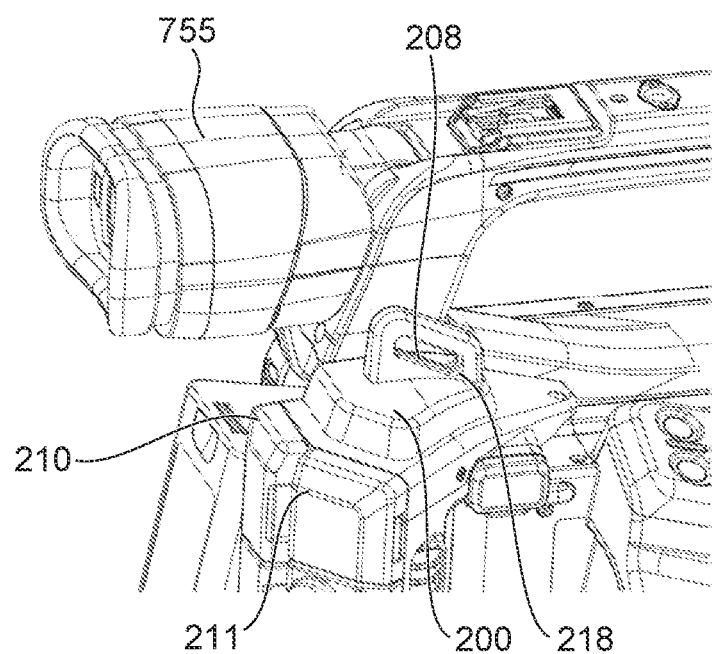
FIGS. 66A and 66B are perspective views showing a portion where a wireless communication section is arranged and the configuration of the wireless communication section, respectively.
Figure 66B:
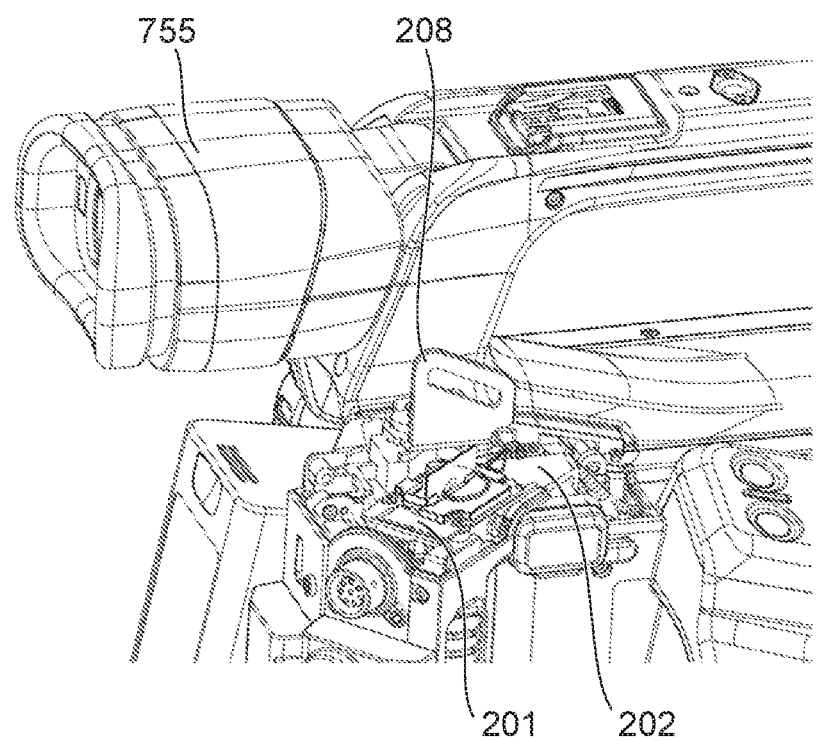

FIG. 66A is a perspective view of the appearance of a wireless communication section 201. FIG. 66B is a perspective view showing where is disposed the wireless communication section 201 in a state in which a wireless cover 200 is removed. The wireless cover 200 covers the wireless communication section 201 to protect the same. That is, the wireless communication section 201 is arranged inside the wireless cover 200. The wireless cover 200, a first terminal cover 210, and a second terminal cover 211 are each formed of a molding material (such as a dielectric resin material) which does not contain a conductor material (such as carbon). Note that each of the first terminal cover 210 and the second terminal cover 211 is a member which protects a terminal (connector) for connecting a communication cable of a predetermined communication standard, and is removed when connecting a communication cable to the terminal.

The wireless communication section 201 is fixed to a wireless module holder 202 of the body 100 with screws. A strap plate 208 having an opening for attaching a strap (not shown) is disposed on the upper side (+Y side) of the wireless communication section 201 at a location close to the wireless communication section 201. Although the wireless cover 200 covers not only the wireless communication section 201, but also the strap plate 208, the opening of the strap plate 208 is exposed from a strap opening 218 of the wireless cover 200.

Figure 67A:
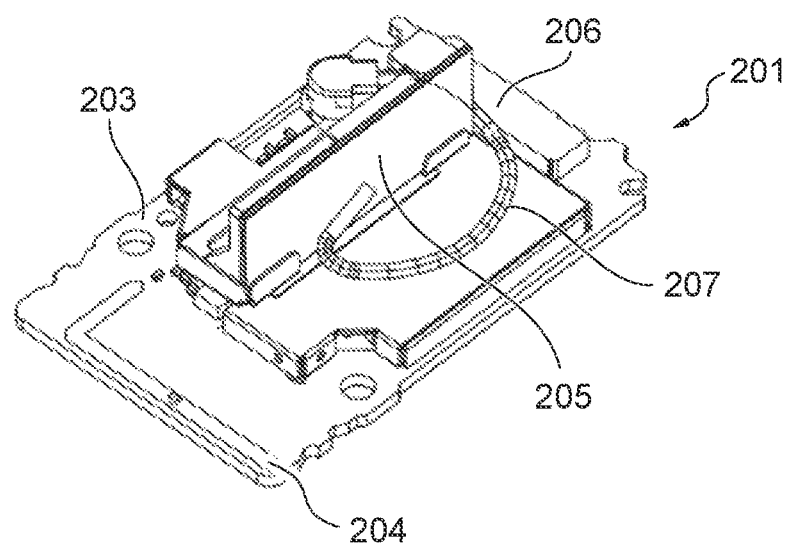
FIGS. 67A and 67B are a perspective view and a plan view of the wireless communication section, respectively.
Figure 67B:
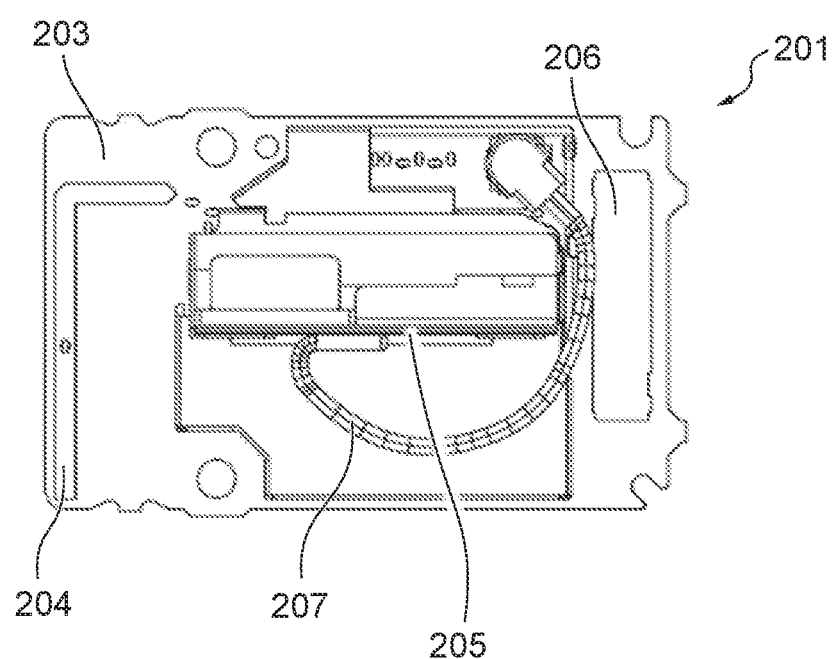

FIG. 67A is a perspective view of the wireless communication section 201. FIG. 67B is a plan view of the wireless communication section 201. The wireless communication section 201 includes a first antenna 204 substantially linearly provided on a wireless communication board 203 and a rectangular plate-shaped second antenna 205 disposed on the wireless communication board 203. An antenna connector 206 is mounted on one end of the wireless communication board 203, and the antenna connector 206 is connected to the control circuit board 125 by wires, not shown. The first antenna 204 is arranged substantially parallel to one side opposite to the antenna connector 206 on the upper surface of the wireless communication board 203. The second antenna 205 is erected on the wireless communication board 203 such that its longitudinal direction is orthogonal to a direction in which the first antenna 204 extends (length direction), and is electrically connected to the wireless communication board 203 by a cable 207.

Data wirelessly transmitted from the wireless communication section 201 is simultaneously transmitted from the first antenna 204 and the second antenna 205, and the respective radio waves are also received and separated by two antennas on a receiving side, and then restored to the original data. With this, it is possible to obtain substantially twice the communication speed. Further, since the second antenna 205 is disposed orthogonal to the first antenna 204, the radio waves vibrate in directions different from each other, and hence it is possible to reduce interference of two kinds of radio waves at the antennas on the receiving side, and thereby improve the performance of separating radio waves.

Figure 68:
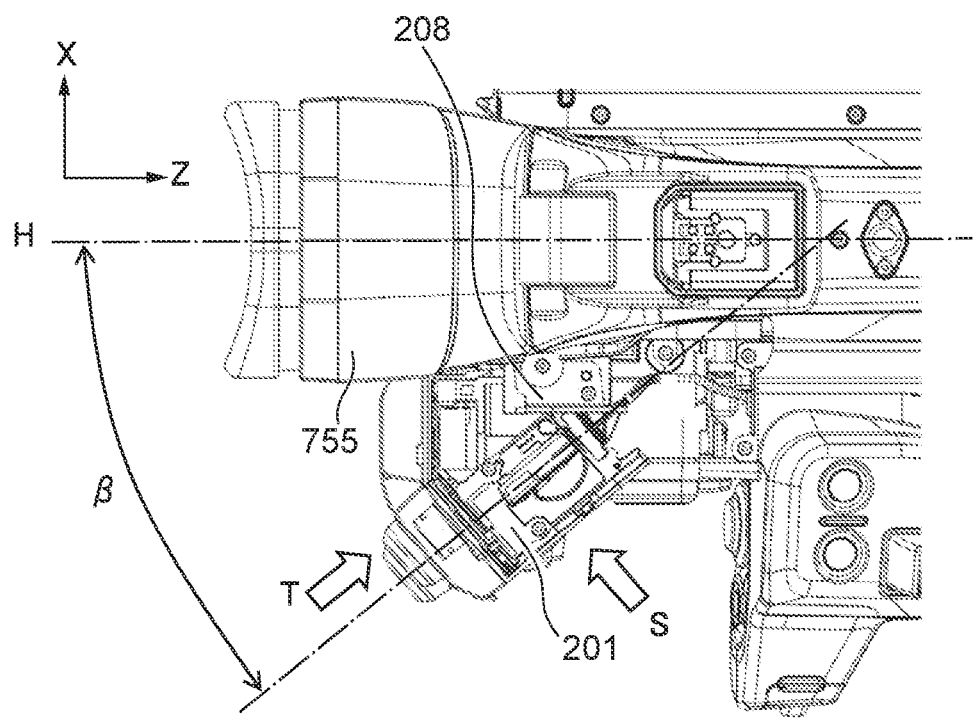
FIG. 68 is a top view showing the wireless communication section and components associated therewith.

FIG. 68 is a top view showing a composition of the wireless communication section 201 and components in its vicinity in a state in which the wireless cover 200, the first terminal cover 210, and the second terminal cover 211 have been removed. An arrow S indicated in FIG. 68 indicates a direction facing toward the longitudinal direction of the wireless communication board 203, and an arrow T indicates a direction facing toward the short direction of the wireless communication board 203.

Figure 69:
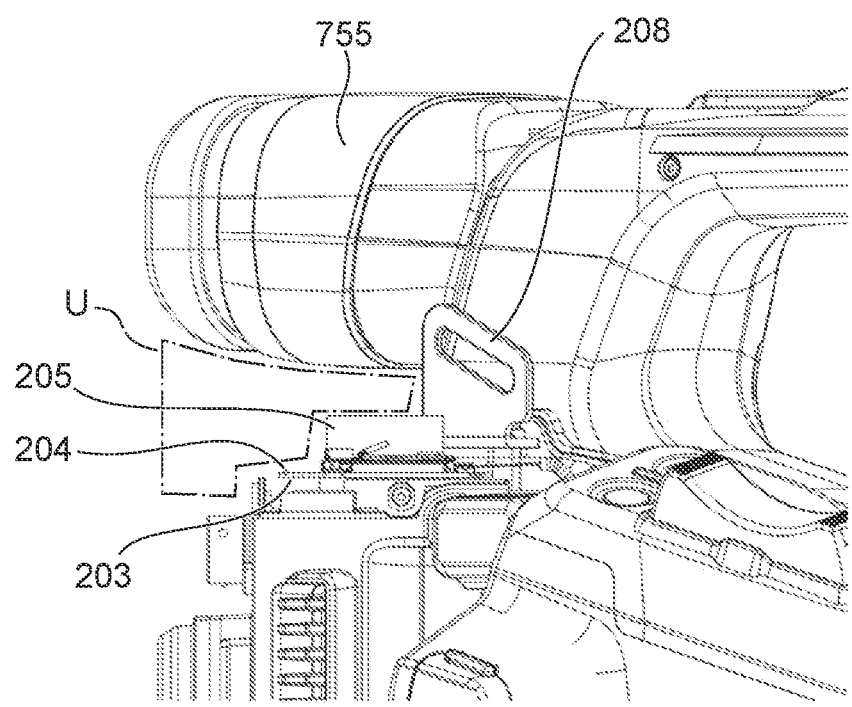
FIG. 69 is a perspective view of the wireless communication section as viewed in a tilted-down state of the viewfinder.
Figure 70:
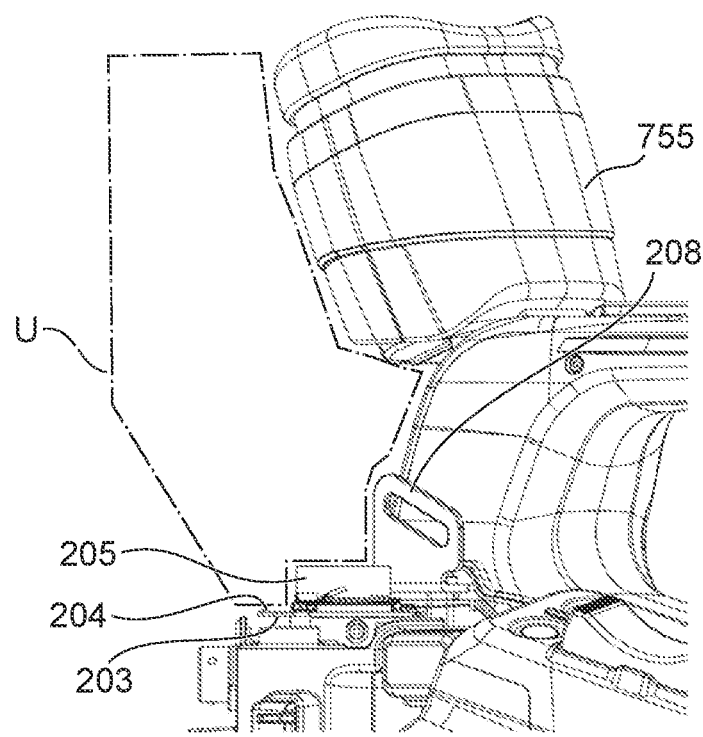
FIG. 70 is a perspective view of the wireless communication section as viewed in a tilted-up state of the viewfinder.
Figure 71:
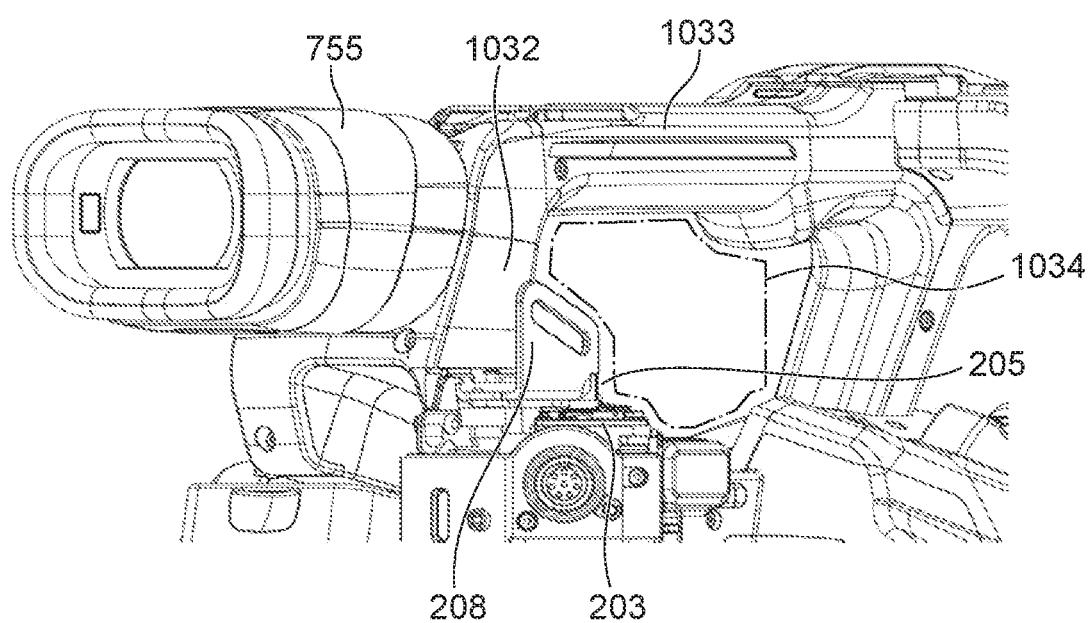
FIG. 71 is another perspective view of the wireless communication section as viewed in the tilted-down state of the viewfinder.

FIG. 69 is a perspective view of the wireless communication board 203 and the components in its vicinity in a state in which the electronic viewfinder 755 is moved down (state shown in FIG. 56A), as viewed from the direction indicated by the arrow S in FIG. 68. FIG. 70 is a perspective view of the wireless communication board 203 and the components in its vicinity in a state in which the electronic viewfinder 755 is flipped up (the third state shown in FIG. 56C), as viewed from the direction indicated by the arrow S. FIG. 71 is a perspective view of the wireless communication board 203 and the components in its vicinity in the state in which the electronic viewfinder 755 is moved down, as viewed from the direction indicated by the arrow T in FIG. 68.

As shown in FIG. 68, the wireless communication section 201 is fixed with an angle β with respect to the axis H of the body 100 (photographic lens 101). A free space which is not shielded by any conductive component is formed in the vicinity of the first antenna 204 and the second antenna 205. This free space is formed on the upper side of the wireless communication board 203 (+Y side), the rear side of the wireless communication board 203 (−Z side), and the opposite side of the axis H (+X side).

Further, a destination of extension of the first antenna 204 when the wireless communication section 201 is viewed from the arrow S direction is a lower space U below the electronic viewfinder 755, as shown in FIG. 69. Further, the lower space U also forms a free space which is not shielded by any conductive component. As shown in FIG. 70, by flipping up the electronic viewfinder 755, the lower space U which is not shielded by any conductive component is further increased.

As shown in FIG. 71, a destination of extension of the second antenna 205 when the wireless communication section 201 is viewed from the arrow T direction is the handle holding space 1034 surrounded by the handle grasping portion 1033, the top surface of the body 100, and the handle rear leg portion 1032. The handle holding space 1034 also forms a free space which is not shielded by any conductive component.

As described above, in the image capturing apparatus 1000, the free spaces which are not shielded by any conductive component are formed in a lot of directions with respect to the first antenna 204 and the second antenna 205. Thus, since there are a lot of directions in which radio waves transmitted from the first antenna 204 and the second antenna 205 are not shielded, it is possible to perform excellent wireless communication.

Figure 72:
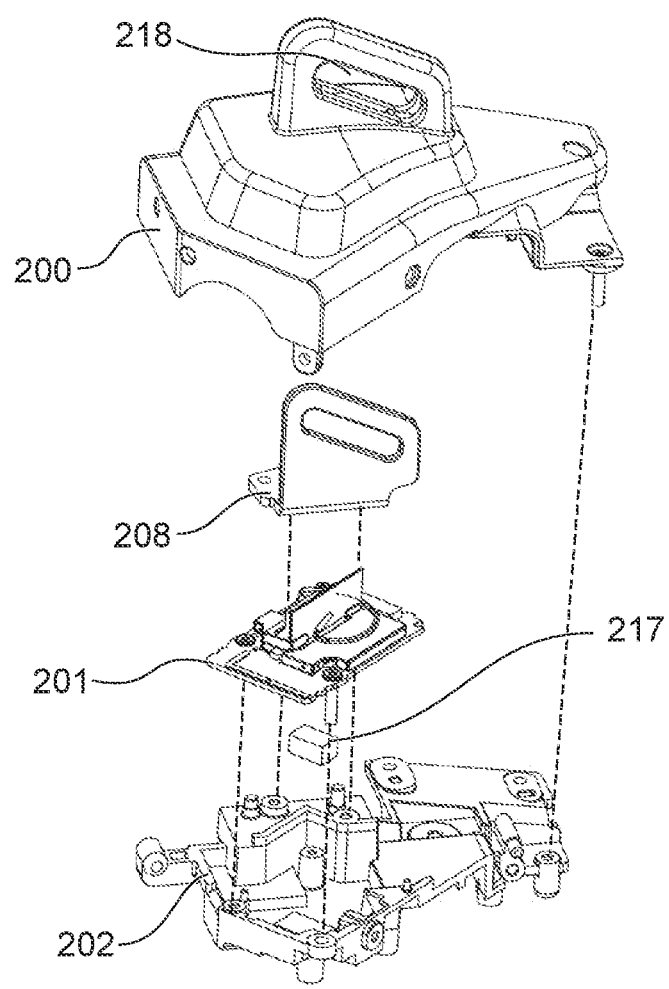
FIG. 72 is an exploded perspective view showing the configuration of the portion where the wireless communication section is arranged.

Next, a heat dissipation structure for releasing heat generated in the wireless communication section 201 to the outside will be described. FIG. 72 is an exploded perspective view showing a configuration where the wireless communication section 201 is disposed. The elements mounted on the wireless communication board 203 include ones that generate heat during wireless communication, and hence it is necessary to efficiently discharge the generated heat to the outside.

Here, the method of fixing the wireless communication section 201 will be described. First, the wireless communication section 201 is fastened (fixed) to the metal wireless module holder 202 with screws. Further, a heat conductive elastic member 217 is compressed and sandwiched between the wireless communication section 201 and the wireless module holder 202. Then, the metal strap plate 208 is fastened to the wireless module holder 202 with screws. In the state shown in FIGS. 66A and 66B, as described above, the strap plate 208 is partially exposed from the strap opening 218 of the wireless cover 200 to the outside.

With this arrangement, the heat generated in the wireless cover 200 is transferred to the wireless module holder 202 via the heat conductive elastic member 217, and then dissipated outside the body 100 via the strap plate 208. At this time, since the wireless cover 200 partially covers the strap plate 208, the photographer cannot directly touch the strap plate 208 which has been increased in temperature. Therefore, the photographer is prevented from being made uncomfortable by heat dissipation from the strap plate 208. Note that although the body 100 has the strap plate 208 and the wireless module holder 202 as separate members, these components may be integrally formed with the body 100.

<Description of the Operation System Arrangement Section 104>

Figure 73:
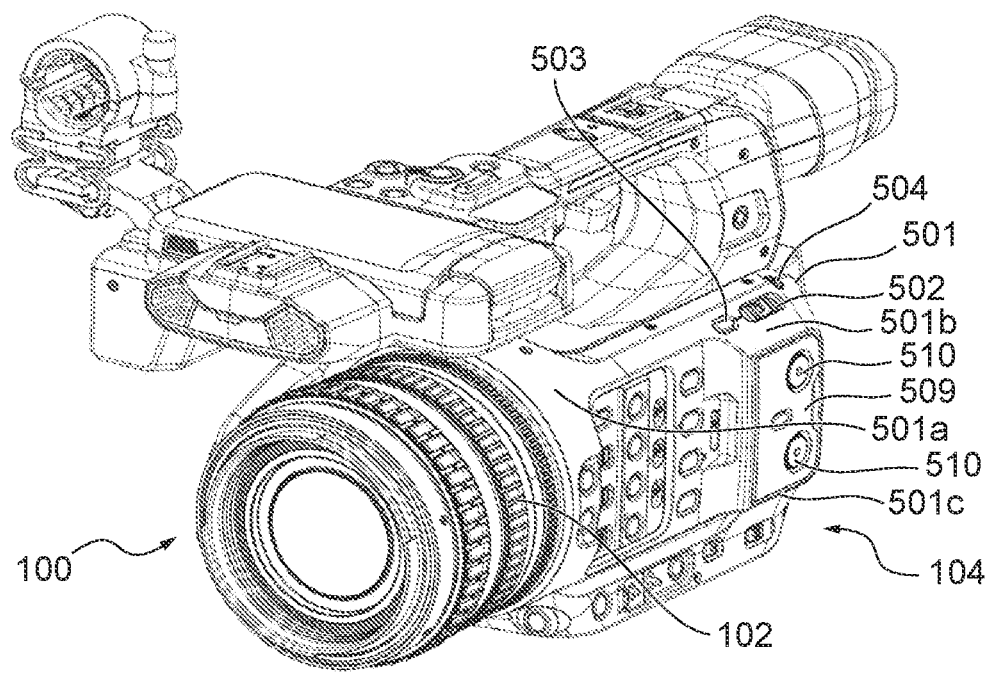
FIG. 73 is a perspective view of the image capturing apparatus.

FIG. 73 is a perspective view of the image capturing apparatus 1000. The operation system arrangement section 104 is formed by arranging a variety of operation members on a right-side cover 501 which is one of the exterior members. The main operation members of the operation system arrangement section 104 include a power key 502 that switches on/off of power supply, a media key 503 that switches a variety of modes of photographing, and a power lamp 504 that enables the photographer to visually recognize an operation mode of the image capturing apparatus 1000 by blinking. These operation members are disposed on the upper side (+Y side) and besides on the rear side (–Z side) of the operation system arrangement section 104, where the operation members can be easily operated by the photographer and are high in visibility. On the lower side (–Y side) of these components, operation members associated with sound recording, such as an audio dial 510 for adjusting the recording level of sound to be recorded, are arranged. On the rear side (–Z side) of an audio cover 509, a recording media protection cover 640 (see e.g. FIG. 81) is disposed, and recording medium slots 611 (see e.g. FIGS. 82A and 82B) are disposed inside the recording media protection cover 640.

A front outer shape surface 501a of the right-side cover 501, which is connected to the operation ring 102, forms a circumferential curved surface substantially similar to the outer shape of the operation ring 102. Further, outer shape surfaces 501b and 501c, and the rear outer shape surface of the right-side cover 501, which is formed by the audio cover 509, also have shapes which do not largely deviate from the curved surface shape of the front outer shape surface 501a. Since the right-side cover 501 is formed into the shape following the outer shape of the operation ring 102, it is possible to increase the operability when the operation ring 102 is operated.

Figure 74:
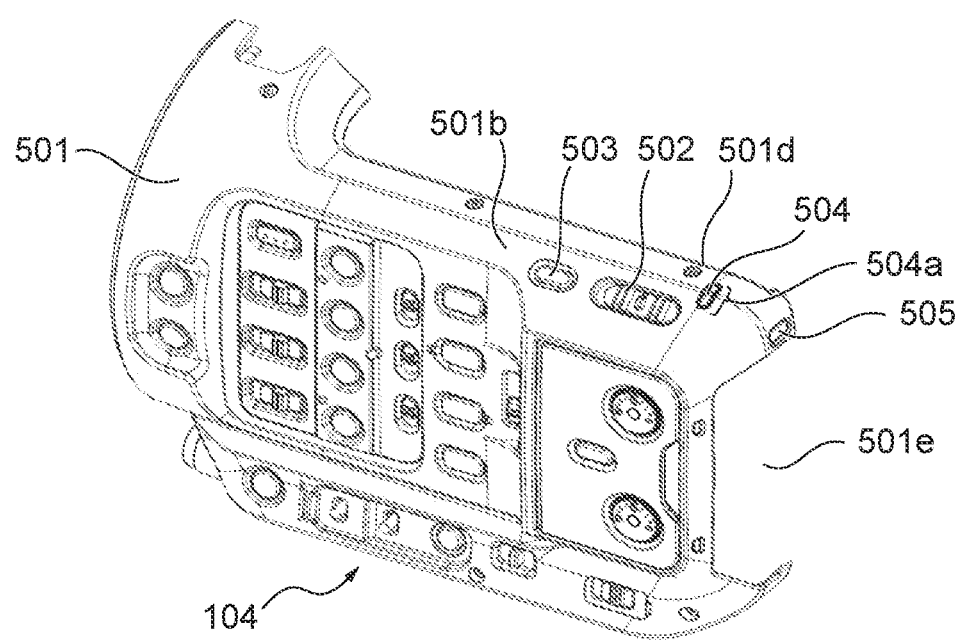
FIG. 74 is a perspective view of an operation system arrangement section provided on the image capturing apparatus.

FIG. 74 is a perspective view of the operation system arrangement section 104. In an opening 501e of the right-side cover 501, the two recording medium slots 611 (see FIGS. 82A and 82B) are disposed. A select key 505 for use in selecting which of the two recording medium slots 611 is to be used is disposed on the upper side (+Y side) of the opening 501e.

As described above, the power key 502 and the media key 503 are arranged on the outer shape surface 501b. The outer shape surface 501b is a surface having a normal line in a direction between the X direction and the Y direction (surface inclined by predetermined angles with respect to the X direction and the Y direction). The surface having a normal line in a direction between the X direction and the Y direction is hereinafter referred to as the "inclined surface". The power lamp 504 has a light emitting surface 504a formed by two surfaces of the outer shape surface 501b and an outer shape surface 501d having a normal line in the Y direction, and the photographer can confirm light emission of the light emitting surface 504a from both of the Y direction and the X direction. Other operation members except the power key 502 and the media key 503 are arranged on the surfaces having, respective normal lines in the substantially X direction, the substantially Y direction, and the substantially Z direction.

Figure 75:
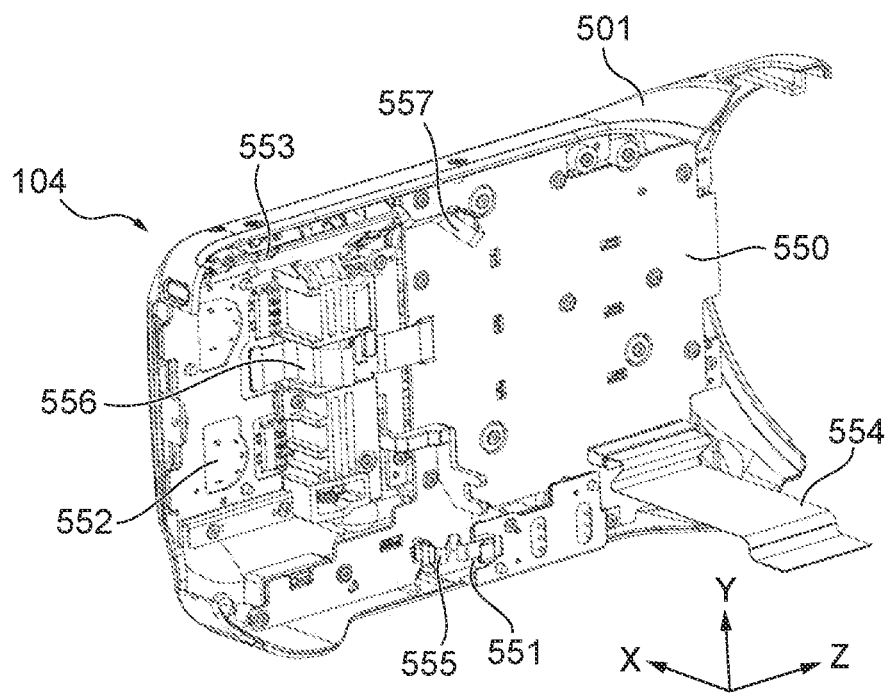
FIG. 75 is a perspective view showing an internal configuration of the operation system arrangement section.

FIG. 75 is a perspective view showing an internal configuration of the operation system arrangement section 104. In the operation system arrangement section 104, the four boards of a toggle switch board 551, an operation section audio board 552, a power board 553, and the operation section main board 550 are fixed to the right-side cover 501 directly or using a holding member. The toggle switch board 551, the operation section audio board 552, and the power board 553 are connected to the operation section main board 550 via flexible circuit boards 555, 556, and 557, respectively. The operation section main board 550 is connected to the control circuit board 125 (not shown in FIG. 75) via a flexible circuit board 554. On the operation section audio board 552, a switch group corresponding to the operation members associated with sound recording, such as the audio dial 510, is mounted. Thus, the four boards are configured such that the number of them is smallest, by taking the arrangement and the costs of the operation members into consideration.

Figure 76:
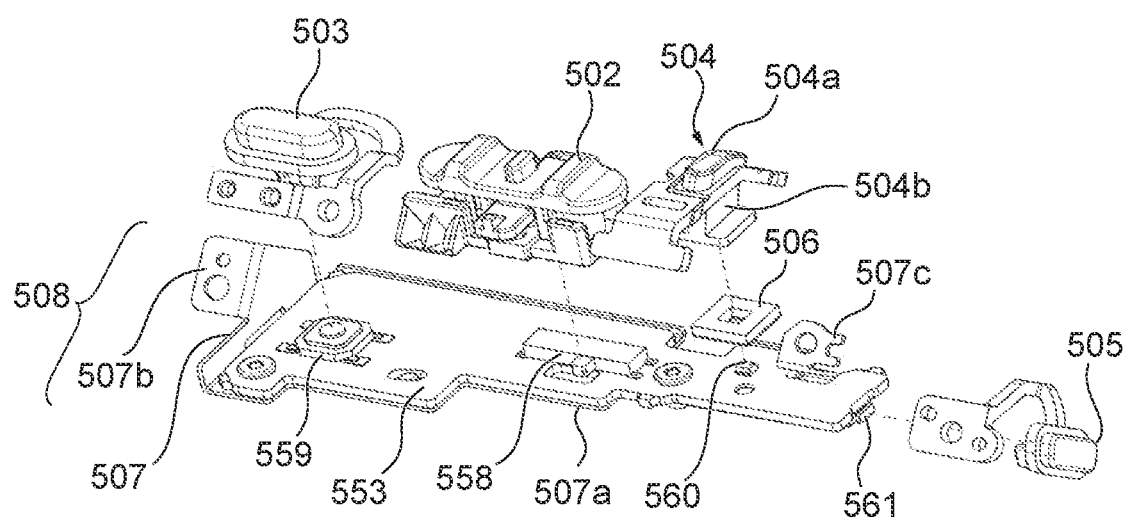
FIG. 76 is an exploded perspective view of a power board.

FIG. 76 is an exploded perspective view of the power board 553. Note that in FIG. 76, components unnecessary for the explanation are omitted from illustration. On the power board 553, a first tact switch 559, a slide switch 558, and a second tact switch 561 are mounted in association with the media key 503, the power key 502, and the select key 505 held on the right-side cover 501, respectively. Further, when an LED 560 mounted on the power board 553 is lighted, the light emitted from the LED 560 passes through a light guiding portion 504b of the power lamp 504 and illuminates the light emitting surface 504a. Note that the light guiding portion 504b is formed of a light transmissive material. A blinding member 506 formed of an elastic material is disposed in a state crushed by the power lamp 504 and prevents the light of the LED 560 from leaking to the surroundings.

The power board 553 is fixed to a board holding surface 507a of a power board-holding member 507 with screws, not shown, and the power board-holding member 507 is fastened to the right-side cover 501 (see FIG. 74) via fixing surfaces 507b and 507c thereof with screws, not shown. The fixing surfaces 507b and 507c are formed such that they are not orthogonal but inclined through a predetermined angle with respect to the board holding surface 507a, and with this, the power board 553 is held on the surfaces inclined with respect to the right-side cover 501. In the following description, the power board-holding member 507 in a state holding the power board 553 is referred to as a power board unit 508.

Figure 77:
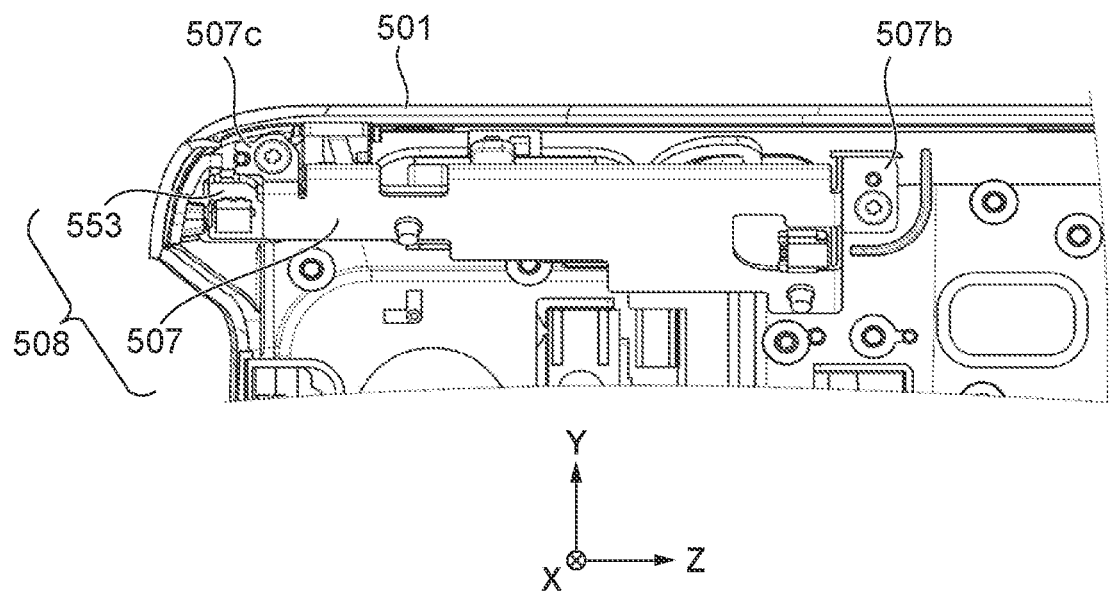
FIG. 77 is a side view of a power board unit in a state fixed to a right-side cover.

FIG. 77 is a side view showing a state of the power board unit 508 fixed to the right-side cover 501 (as viewed from the –X side). The power board unit 508 is fixed to the right-side cover 501 with screws, not shown, in the X direction via the fixing surfaces 507b and 507c of the power board-holding member 507. Therefore, the power board 553 is held on the inclined surface as described above.

Figure 78:
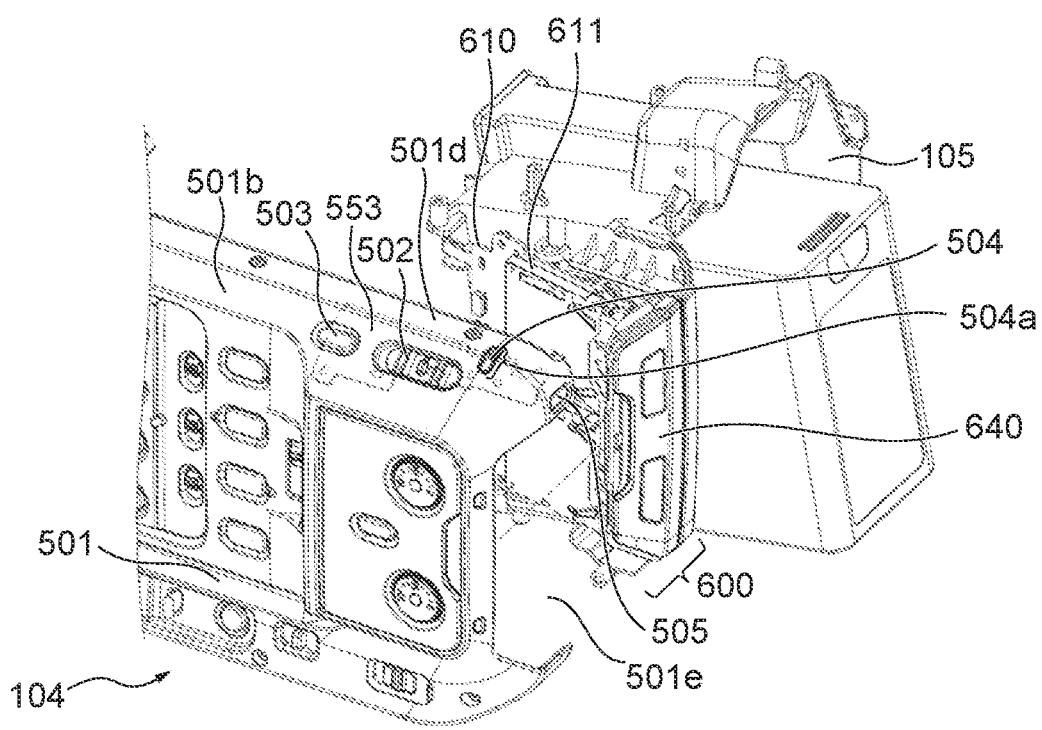
FIG. 78 is an exploded perspective view showing a positional relationship between a medium slot section, the battery chamber, and the operation system arrangement section.

FIG. 78 is an exploded perspective view showing a positional relationship between the medium slot section 600, the battery chamber 105, and the operation system arrangement section 104. The recording media protection cover 640 is disposed in the opening 501e of the right-side cover 501, and a recording medium slot board 610 on which the recording medium slots 611 are mounted is disposed directly under the power board 553.

Figure 79:
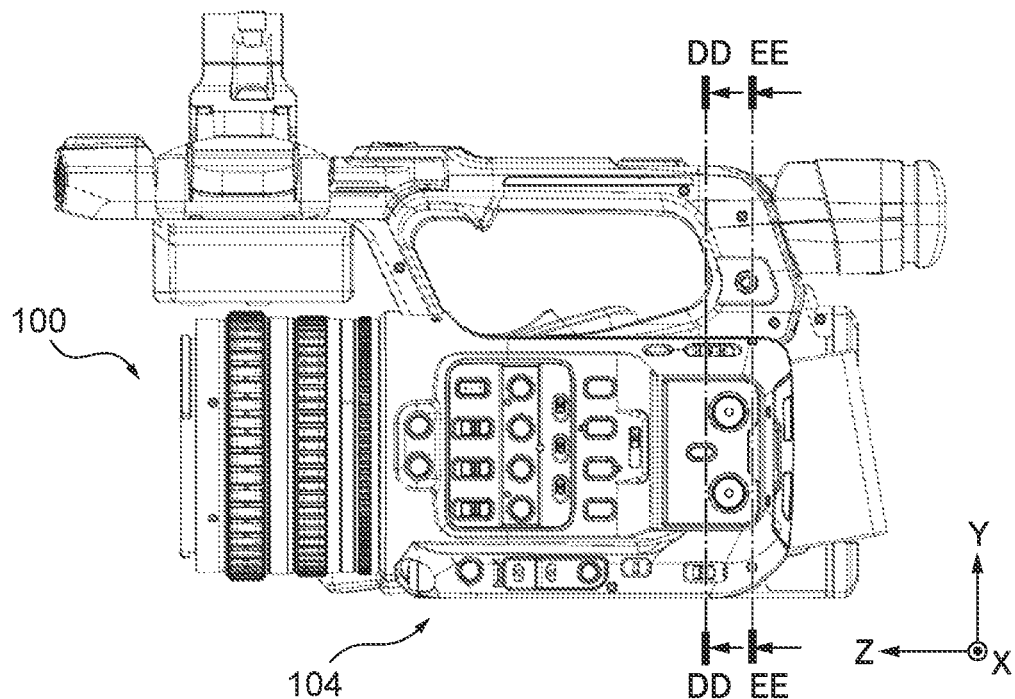
FIG. 79 is a side view of the operation system arrangement section.
Figure 80A:
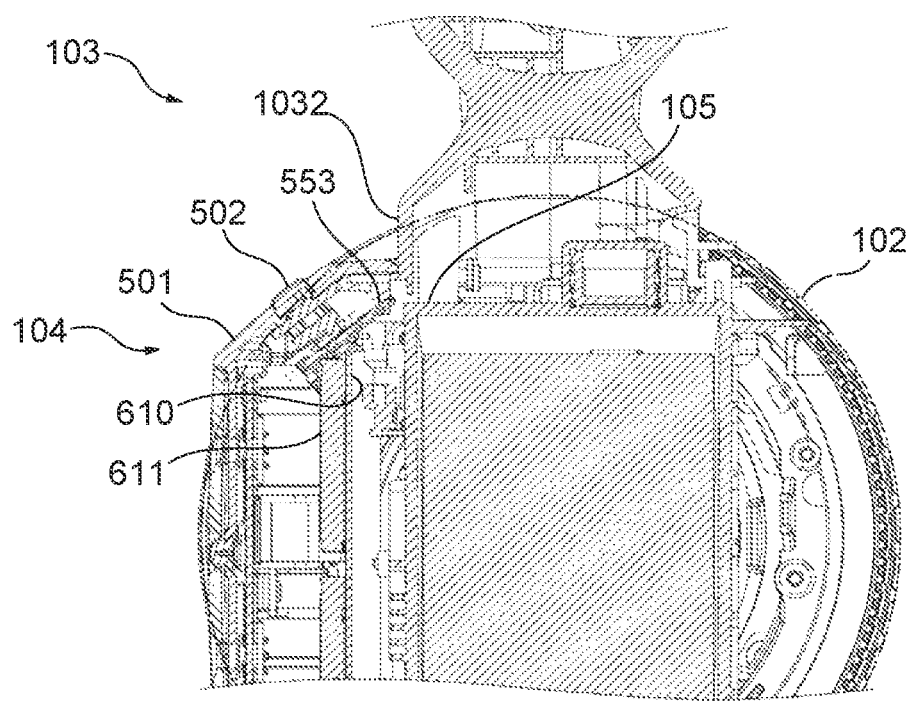
FIGS. 80A and 80B are cross-sectional views taken along DD-DD and EE-EE in FIG. 79, respectively.
Figure 80B:
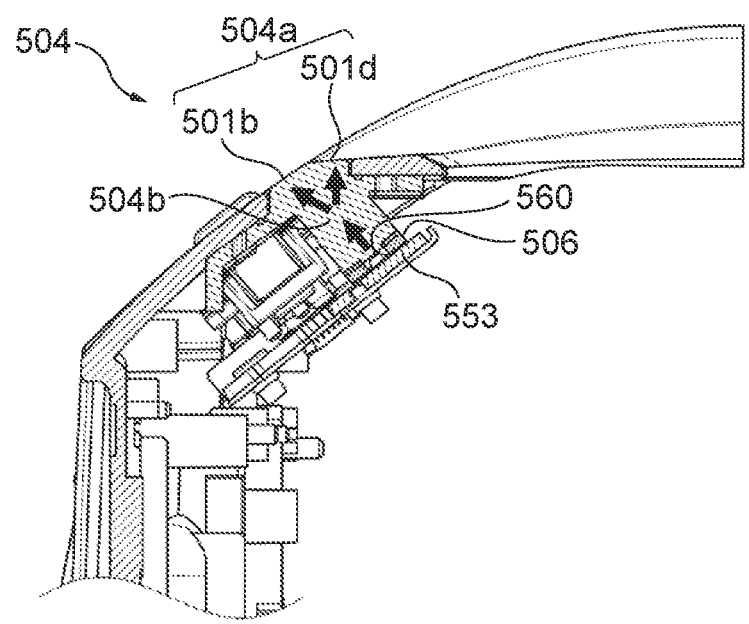

FIG. 79 is a side view of the operation system arrangement section 104. FIG. 80A is a cross-sectional view taken along DD-DD in FIG. 79. FIG. 80B is a cross-sectional view taken along EE-EE in FIG. 79. Note that in FIGS. 80A and 80B, components unnecessary for the explanation are omitted from illustration.

The power board 553 is arranged in the +X direction such that the handle rear leg portion 1032 forming the handle 103 and the battery chamber 105 are avoided, and, as described above, on the inclined surface directly above the recording medium slot board 610 on which the recording medium slots 611 are mounted. A two-dot-chain line in FIG. 80A indicates the outer shape of the operation ring 102, and the power board 553 can be disposed within the outer shape of the operation ring 102 by disposing the power board 553 in the inclined state. As a result, the right-side cover 501 can be formed without excessively increasing its shape from the outer shape of the operation ring 102 (by reducing an amount of expansion off), and hence size reduction of the body 100 is realized. Further, the power key 502, the media key 503 (see FIG. 74), and the power lamp 504 (see FIG. 74) can be arranged on the upper side of the operation system arrangement section 104.

Most of light emitted from the LED 560 mounted on the power board 553 advances inside the light guiding portion 504b of the power lamp 504 as shown in FIG. 80B. At this time, since the power board 553 is disposed in the inclined state as described above, the light advances in directions indicated by arrows in FIG. 80B. Thus, it is possible to efficiently guide the light to both of the outer shape surfaces 501b and 501d, and the photographer can confirm blinking of the light emitting surface 504a from a wide direction ranging from the X direction to the Y direction.

Thus, although a variety of measures for size reduction have been taken in the image capturing apparatus 1000 as described above, the body 100 is also reduced in size by forming the outer shape of the operation system arrangement section 104 into a shape following the outer shape of the operation ring 102 and arranging the variety of operation members therein.

<Description of the Medium Slot Section 600>

Figure 81:
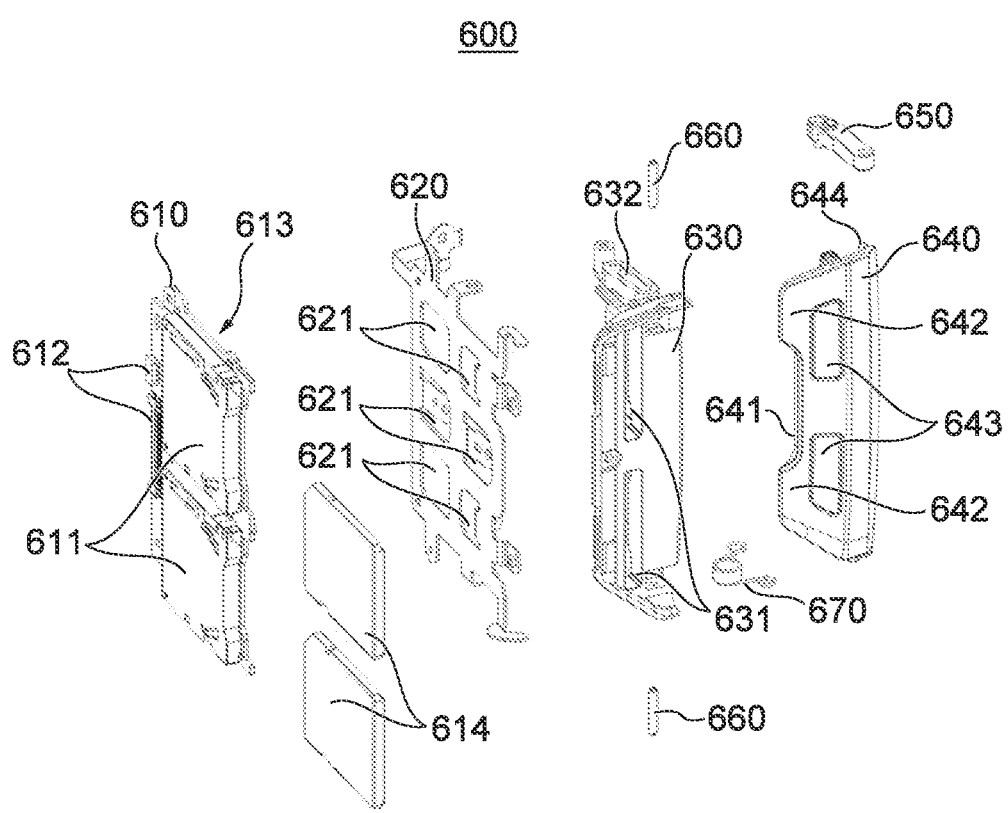
FIG. 81 is an exploded perspective view showing the configuration of the medium slot section.

FIG. 81 is an exploded perspective view showing the configuration of the medium slot section 600. The medium slot section 600 includes the recording medium slot board 610, an inclined fastening member 620, an insertion slot member 630, the recording media protection cover 640, a cover detection intermediation member 650, cover rotating shafts 660, and a cover opening/closing elastic member 670.

On the recording medium slot board 610, not only the recording medium slots 611 in and from which recording media 614 are inserted and removed, but also connection connectors 612 and an opening/closing detection switch 613 are mounted. The opening/closing detection switch 613 is mounted on a surface opposite from the surface on which the recording medium slots 611 are mounted. The recording medium slot board 610 is electrically connected to the control circuit board 125 by internal wiring (not shown). Moving image data photographed through the photographic lens 101 is written into one of the recording media 614, and further, the moving image data stored in the recording medium 614 is read out.

The inclined fastening member 620 is fastened to the recording medium slot board 610, the insertion slot member 630, and the battery chamber 105, with screws, not shown. The insertion slot member 630 is a member for guiding insertion of recording media into the recording medium slots 611. The insertion slot member 630 includes recording media insertion slots 631 into which the photographer inserts the recording media 614 and an intermediation member-guiding groove 632 for restricting rotation of the cover detection intermediation member 650.

The recording media protection cover 640 physically protects recording media in and from which moving image data is written and read. The recording media protection cover 640 includes finger catching portions 641 and 642, windows 643, and an intermediation member-guiding shaft 644. The finger catching portion 641 is a portion which is operated by the photographer when opening the recording media protection cover 640. The finger catching portion 642 is a portion which is operated by the photographer when closing the recording media protection cover 640. The windows 643 are formed of a light transmissive material, and the photographer can visually recognize whether or not the recording media 614 has been inserted from outside the recording media protection cover 640 through the windows 643. The intermediation member-guiding shaft 644 restricts rotation of the cover detection intermediation member 650.

The cover rotating shafts 660 are inserted in the insertion slot member 630 and the recording media protection cover 640. The recording media protection cover 640 can be rotated about the cover rotating shaft 660 through a predetermined angle. The cover detection intermediation member 650 is engaged with the intermediation member-guiding groove 632 of the insertion slot member 630 and the intermediation member-guiding shaft 644 of the recording media protection cover 640, and is rotated along a predetermined locus according to opening/closing of the recording media protection cover 640. The cover opening/closing elastic member 670 is engaged with the insertion slot member 630 and the recording media protection cover 640, and urges the recording media protection cover 640 to a closed state or an open state with a predetermined load.

Figure 82A:
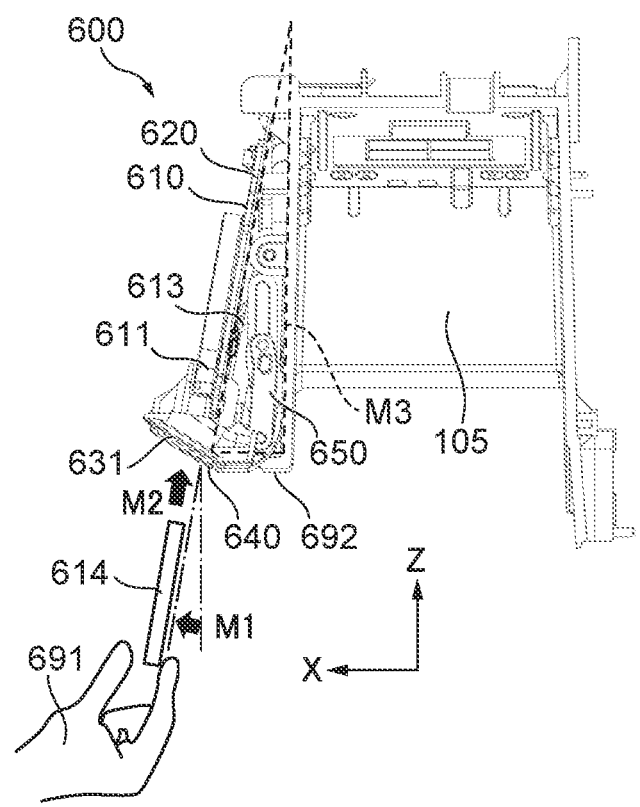
FIGS. 82A and 82B are top views showing the internal structure of the medium slot section.
Figure 82B:
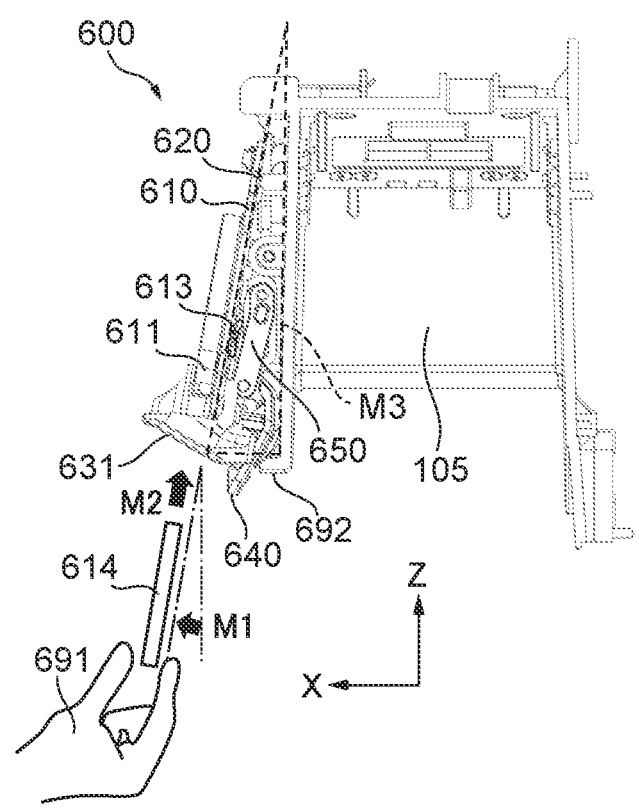

Next, characterizing features of the arrangement of the recording medium slot board 610 will be described. FIGS. 82A and 82B are top views showing the internal structure of the medium slot section 600. In FIG. 82A, the recording media protection cover 640 is in the closed state, and the recording media insertion slots 631 are covered by the recording media protection cover 640. On the other hand, in FIG. 82B, the recording media protection cover 640 is in the open state, and the recording media insertion slots 631 are exposed.

The recording medium slot board 610 and the inclined fastening member 620 are arranged adjacent to the battery chamber 105 such that they are inclined with respect to the Z direction parallel to the axis H by an angle M1 (e.g. 10 degrees in a clockwise direction).

Here, the operation system arrangement section 104 and the battery chamber 105 are arranged on the surface of the body 100 on the +X side and the surface of the same on the −Z side, respectively, and hence the photographer is assumed to operate the image capturing apparatus 1000 from the −Z side or the +X side. In this case, since the recording medium slot board 610 is inclined by the angle M1, the photographer can insert/remove a recording medium 614 while visually recognizing the medium slot section 600 from any of the −Z side and +X side. Thus, the operability associated with insertion/removal of the recording media 614 is increased.

Further, the direction of inserting each recording medium 614 into an associated one of the recording medium slots 611 is a direction indicated by an arrow M2 parallel to the recording medium slot board 610. The recording medium slot board 610 forms the angle M1 with respect to the axis H (Z direction), and hence the recording media protection cover 640 in the open state shown in FIG. 82B is in a state sufficiently retreated from a photographer's finger 691 which inserts/removes the recording media 614. With this, it is possible to increase the operability when inserting/removing the recording media 614.

Incidentally, since the recording medium slot board 610 forms the angle M1 with respect to the axis H, a substantially triangular space M3 is formed between the recording medium slot board 610 and the battery chamber 105. The provision of the space M3 provides the following advantages: In the open state shown in FIG. 81B, most of the recording media protection cover 640 is received into the space M3, and an amount of protrusion from an appearance surface 692 is less, compared with a general hinged door.

With this, the recording media protection cover 640 in the open state is in the state sufficiently retreated from the photographer's finger 691 which inserts/removes the recording media 614, and hence the photographer can easily insert/remove the recording media 614. Further, even when an external accessory, such as a rig or a gimbal, is mounted such that the external accessory surrounds the body 100, it is possible to prevent the recording media protection cover 640 in the open state from carelessly interfering with the external accessory.

Figure 83:
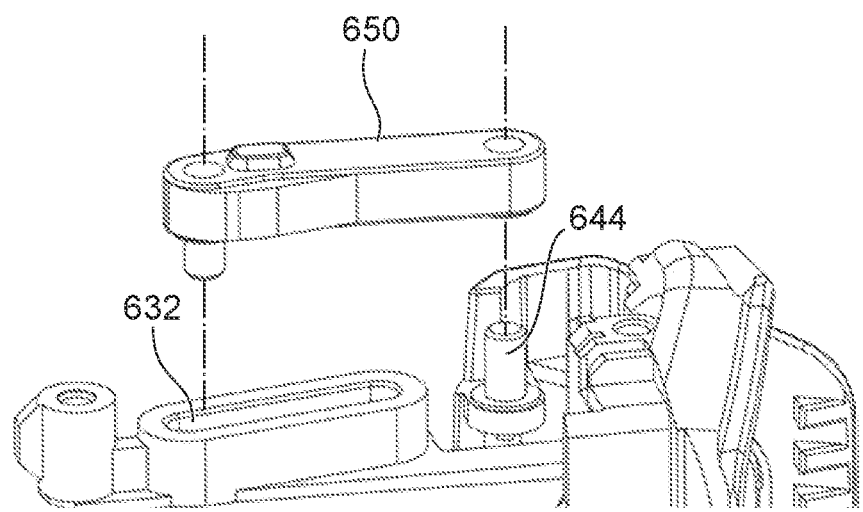
FIG. 83 is a perspective view of a cover detection intermediation member.

FIG. 83 is a perspective view of the cover detection intermediation member 650. The cover detection intermediation member 650 is disposed in the space M3 appearing in FIGS. 82A and 82B, and is rotated along a predetermined locus according to opening/closing of the recording media protection cover 640, as a link mechanism formed by the intermediation member-guiding groove 632 and the intermediation member-guiding shaft 644. Here, as is clear from FIGS. 82A and 82B, the cover detection intermediation member 650 changes the push-in state of the opening/closing detection switch 613 according to opening/closing of the recording media protection cover 640. At this time, in a case where the recording media protection cover 640 is in the closed state, the opening/closing detection switch 613 is not pushed in and hence is not electrically connected, whereas if the recording media protection cover 640 is in the open state, the opening/closing detection switch 613 is pushed in and brought into conduction. Thus, the opened/closed state of the recording media protection cover 640 is electrically detected.

As shown in FIGS. 82A and 82B, the space M3 is a space sandwiched between the inclined fastening member 620 and the battery chamber 105. The inclined fastening member 620 is formed with a plurality of openings 621. Therefore, heat generated in the recording medium slot board 610 when moving image data is read/written from/into the recording media 614 is dissipated to the space M3 through the openings 621 of the inclined fastening member 620. Further, the inclined fastening member 620 is a sheet metal member excellent in thermal conductivity. Therefore, heat generated in the recording medium slot board 610 is transferred to the inclined fastening member 620, and is also dissipated from the inclined fastening member 620 to the space M3. Thus, it is possible to suppress increase in temperature of the recording medium slot board 610.

Figure 84:
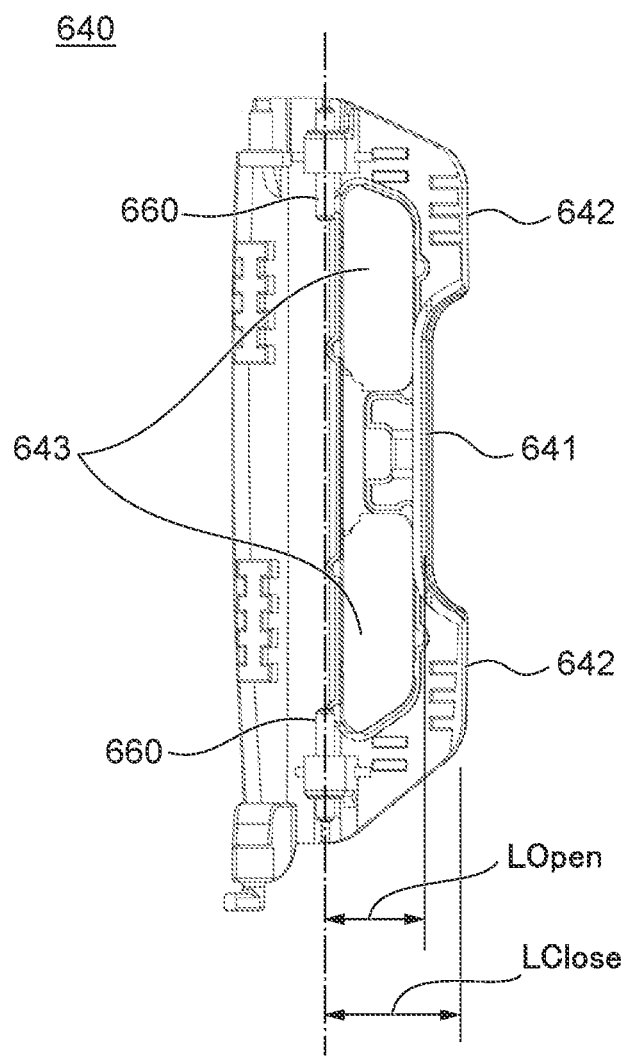
FIG. 84 is a perspective view of a recording media protection cover.

Next, the operation for opening/closing the recording media protection cover 640 will be described. FIG. 84 is a perspective view of the recording media protection cover 640. The finger catching portion 641 used for the opening operation has a shape formed by cutting a portion of the finger catching portion 642 used for the closing operation.

Figure 85A:
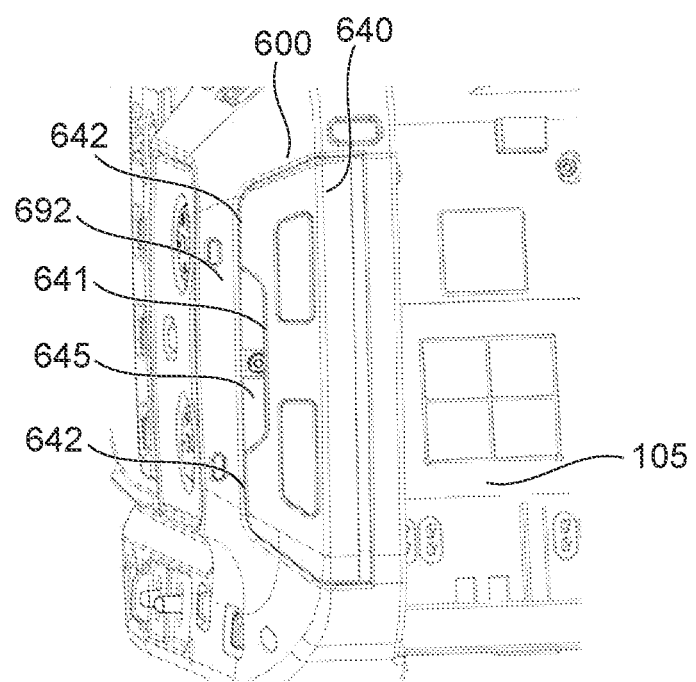
FIGS. 85A and 85B are perspective views showing examples of postures of the medium slot section with respect to the battery chamber.
Figure 85B:
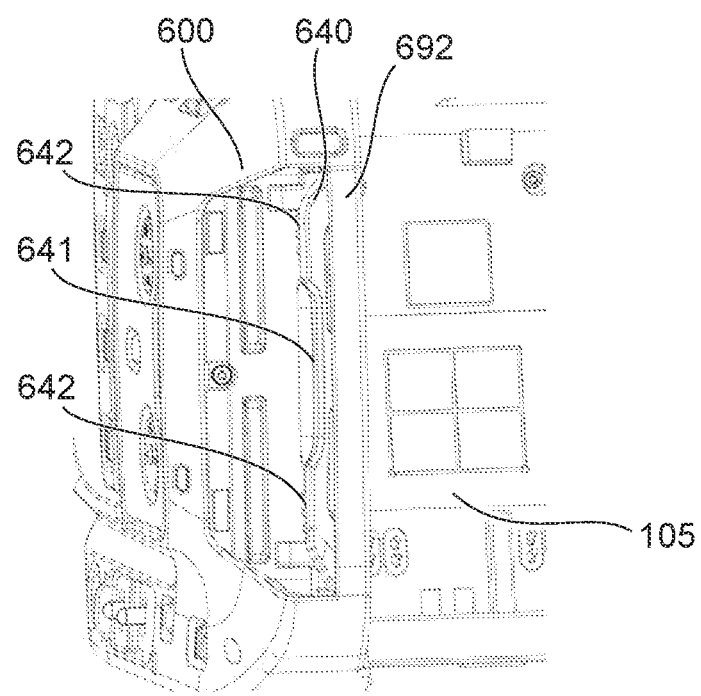

FIGS. 85A and 85B are perspective views showing examples of postures of the medium slot section 600 with respect to the battery chamber 105. FIG. 85A shows the recording media protection cover 640 in a closed state, whereas FIG. 85B shows the same in an open state.

In the state in which the recording media protection cover 640 is closed, as shown in FIG. 85A, the finger catching portion 641 forms a recess-shaped portion 645 while sealing between the recording media insertion slots 631 and the appearance surface 692. With this, the photographer can open the recording media protection cover 640 by hooking the finger on the finger catching portion 641 in a position before being opened, through the recess-shaped portion 645. Note that in the state in which the recording media protection cover 640 is closed, the finger catching portion 642 forms substantially the same surface as the appearance surface 692, and hence it is not easy to hook a finger on the finger catching portion 642.

On the other hand, in the state in which the recording media protection cover 640 is opened, as shown in FIG. 84B, most of the recording media protection cover 640 is received inside the space M3, and the finger catching portion 642 protrudes from the appearance surface 692. With this, the photographer can easily close the recording media protection cover 640 by hooking the finger on the finger catching portion 642. Note that in the state in which the recording media protection cover 640 is open, the finger catching portion 641 is received inside the appearance surface 692 or slightly protrudes from the appearance surface 692, and hence it is not easy to hook a finger on the finger catching portion 641.

When opening/closing the recording media protection cover 640, the photographer is required to apply the operation force against the urging force of the cover opening/closing elastic member 670. Here, as shown in FIG. 84, when a comparison is made between a distance LOpen from the cover rotating shaft 660 to the finger catching portion 641 and a distance LClose from the cover rotating shaft 660 to the finger catching portion 642, a relationship expressed by LOpen<LClose holds. Further, let it be assumed that the moment about the cover rotating shaft 660, which is required to open/close the recording media protection cover 640, is the same when the recording media protection cover 640 is opened and closed. In this case, using an operation force FOpen required for the opening operation and an operation force FClose required for the closing operation, a relationship expressed by LOpen×FOpen=LClose×FClose holds. In other words, a relationship expressed by FOpen>FClose is obtained, and the operation force required to open the recording media protection cover 640 is larger than the operation force required to close the recording media protection cover 640.

The operation forces required to open and close the recording media protection cover 640 is provided with a difference as described above for the following reason: Considering the roll of the recording media protection cover 640 for protecting the recording media 614, it is not preferable that the recording media protection cover 640 is easily opened e.g. by an impact applied from the outside or unintended hooking. On the other hand, it is not a problem that the recording media protection cover 640 which has been opened is easily closed. Therefore, in the medium slot section 600, the finger catching portion 641 used for the opening operation and the finger catching portion 642 used for the closing operation are separately provided, whereby the operability obtained when opening/closing the recording media protection cover 640 is increased while preventing the recording media protection cover 640 from being carelessly opened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-028815, filed Feb. 25, 2021, which is hereby incorporated by reference herein in its entirety.

What is claimed is:

1. An image capturing apparatus comprising:
an imaging optical system;
an image sensor that converts an optical image formed by the imaging optical system to image signals;
a heat dissipation section configured to discharge heat generated in the image sensor to an outside; and
a battery mounting section to and from which a battery can be mounted and removed,
wherein the imaging optical system, the image sensor, the heat dissipation section, and the battery mounting section are arranged on an extension line of an axis of the imaging optical system in the mentioned order,
wherein the battery mounting section has an upper surface tilted forward in a direction in which the image sensor is disposed with respect to the axis by a predetermined angle, and
wherein as viewed from an upper surface side of the image capturing apparatus, a part which is close to the heat dissipation section, of an upper end portion of the battery mounting section is placed so as to overlap the heat dissipation section.

2. The image capturing apparatus according to claim 1, wherein a control circuit board that controls the operation of the image capturing apparatus is disposed on a side of the imaging optical system, the image sensor, the heat dissipation section, and the battery mounting section.

3. The image capturing apparatus according to claim 2, wherein out of components mounted on the control circuit board, a component which is large in protruding amount from a mounting surface of the control circuit board is inserted in a space formed between the heat dissipation section and the battery mounting section in an optical axis direction of the imaging optical system.

4. The image capturing apparatus according to claim 1, wherein the imaging optical system, the image sensor, the heat dissipation section, and the battery mounting section form a body of the image capturing apparatus,
the image capturing apparatus further comprising a handle mounted on the body,
wherein the handle includes:
a front leg portion that extends upward from a top surface of the body,
a rear leg portion that extends upward from the top surface of the body, and
a grasping portion that connects between the front leg portion and the rear leg portion substantially in parallel to the optical axis direction of the imaging optical system with a predetermined spacing from the top surface of the body.

5. The image capturing apparatus according to claim 4, further comprising a wireless communication section disposed in the vicinity of the rear leg portion, and
wherein the wireless communication section includes:
a first antenna substantially linearly arranged along a first direction on a mounting surface of a wireless communication board, and
a substantially linear second antenna erected on the mounting surface of the wireless communication board along a second direction substantially orthogonal to the first direction, and
wherein at least one of the first direction and the second direction advances toward a space formed by the top surface of the body, the front leg portion, the rear leg portion, and the grasping portion.

6. The image capturing apparatus according to claim 5, further comprising an electronic viewfinder mounted on the rear leg portion, and
wherein at least one of the first direction and the second direction advances toward a space below the electronic viewfinder.

7. The image capturing apparatus according to claim 1, further comprising an operation ring that is disposed such that the operation ring is rotatable about the axis of the imaging optical system, and operates a predetermined optical element included in the imaging optical system, and
an operation section for operating the image capturing apparatus, and
wherein an amount of expansion off of the operation section from an outer shape of the operation ring is small when the image capturing apparatus is viewed from a direction parallel to the axis.

8. An image capturing apparatus comprising:
a body including an image sensor and a wireless communication section; and
a handle mounted on the body,
wherein the handle includes:
a front leg portion that extends upward from a top surface of the body,
a rear leg portion that extends upward from the top surface of the body, and
a grasping portion that connects between the front leg portion and the rear leg portion substantially in parallel to a direction orthogonal to an imaging surface of the image sensor with a predetermined spacing from the top surface of the body, and
wherein the wireless communication section includes:
a first antenna substantially linearly arranged along a first direction on a mounting surface of a wireless communication board, and
a substantially linear second antenna erected on the mounting surface of the wireless communication board along a second direction substantially orthogonal to the first direction, and
wherein at least one of the first direction and the second direction advances toward a space formed by the top surface of the body, the front leg portion, the rear leg portion, and the grasping portion.

9. The image capturing apparatus according to claim 8, wherein the wireless communication section is arranged in the vicinity of the rear leg portion.

10. The image capturing apparatus according to claim 8, further comprising an electronic viewfinder mounted on the rear leg portion, and
wherein at least one of the first direction and the second direction advances toward a space below the electronic viewfinder.

11. The image capturing apparatus according to claim 10, wherein the electronic viewfinder is rotatable in a direction in which a space below the electronic viewfinder increases.

* * * * *